US009111207B2

(12) United States Patent  (10) Patent No.: US 9,111,207 B2
Suzuki                          (45) Date of Patent: *Aug. 18, 2015

(54) TERMINAL APPARATUS INTERACTING WITH A FUNCTION EXECUTING APPARATUS TO PERFORM PRINT AND SCAN FUNCTIONS USING VARIOUS COMMUNICATION SCHEMES

(71) Applicant: Takanobu Suzuki, Nagoya (JP)

(72) Inventor: Takanobu Suzuki, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/191,474

(22) Filed: Feb. 27, 2014

(65) Prior Publication Data

US 2014/0240772 A1    Aug. 28, 2014

(30) Foreign Application Priority Data

Feb. 28, 2013   (JP) ................................ 2013-040084

(51) Int. Cl.
*G06F 3/12* (2006.01)
*H04B 5/00* (2006.01)
(Continued)

(52) U.S. Cl.
CPC .......... *G06K 15/4045* (2013.01); *G06F 3/1204* (2013.01); *G06F 3/1236* (2013.01);
(Continued)

(58) Field of Classification Search
CPC .......... H04N 1/00225; H04N 1/00244; H04N 1/00307; H04N 1/00408; H04N 1/00413; H04N 1/00416; H04N 1/00421; H04N 1/00432; H04N 1/00474; H04N 1/00973; H04N 2201/0036; H04N 2201/0039; H04N 2201/0041; H04N 2201/0044; H04N 2201/0055; H04N 2201/0096; H04N 1/00103; H04N 1/00204; H04N 1/00915; H04N 2201/0048; H04N 2201/007; H04W 4/00; H04W 4/02; H04W 16/14; H04W 48/18; H04W 84/12; H04W 4/008; H04W 76/022; H04M 1/7253; H04M 2250/02; H04M 2250/04; H04M 2250/06
USPC ............ 358/1.15; 455/41.2, 67.11, 450, 41.3, 455/550.1; 370/338, 445
See application file for complete search history.

(56) References Cited

U.S. PATENT DOCUMENTS 6,636,738 B1 * 10/2003 Hayashi ........................ 455/450
8,159,706 B2 * 4/2012 Kato ............................. 358/1.15
(Continued)

FOREIGN PATENT DOCUMENTS

JP   2007-096445 A   4/2007
JP   2007-166538 A   6/2007
JP   2011-146991 A   7/2011

OTHER PUBLICATIONS

U.S. Appl. No. 14/191,476, filed Feb. 27, 2014.
(Continued)

*Primary Examiner* — Benny Q Tieu
*Assistant Examiner* — Juan M Guillermety
(74) *Attorney, Agent, or Firm* — Banner & Witcoff, Ltd.

(57) ABSTRACT

A terminal apparatus may receive first information relating to a first function executing apparatus from the first function executing apparatus. The first function executing apparatus may be configured to execute a print function. The terminal apparatus may cause a display mechanism of the terminal apparatus to display a first image indicating M1 items of communication schemes by using the first information. Each of the M1 items of communication schemes may be a communication scheme available for the first function executing apparatus to receive print data.

24 Claims, 25 Drawing Sheets

(51) Int. Cl.

| | | |
|---|---|---|
| *H04B 1/18* | (2006.01) | |
| *G06K 15/00* | (2006.01) | |
| *H04N 1/00* | (2006.01) | |
| *H04W 84/12* | (2009.01) | |
| *H04W 76/00* | (2009.01) | |

(52) U.S. Cl.
CPC .......... *G06F3/1292* (2013.01); *H04N 1/00228* (2013.01); *H04N 1/00233* (2013.01); *H04N 1/00244* (2013.01); *H04N 1/00278* (2013.01); *H04N 1/00281* (2013.01); *H04W 76/00* (2013.01); *H04W 84/12* (2013.01); *H04N 2201/0015* (2013.01); *H04N 2201/0044* (2013.01); *H04N 2201/0055* (2013.01); *H04N 2201/0094* (2013.01)

(56) References Cited

U.S. PATENT DOCUMENTS

| | | | | |
|---|---|---|---|---|
| 8,625,488 | B1* | 1/2014 | Gogate et al. | 370/328 |
| 8,665,480 | B2* | 3/2014 | Wada et al. | 358/1.15 |
| 2002/0051197 | A1* | 5/2002 | Minegishi | 358/1.15 |
| 2007/0041036 | A1 | 2/2007 | Nakayama | |
| 2007/0280122 | A1 | 12/2007 | Ito | |
| 2009/0092106 | A1 | 4/2009 | Nakayama | |
| 2010/0081385 | A1 | 4/2010 | Lin et al. | |
| 2010/0149602 | A1* | 6/2010 | Tamai et al. | 358/403 |
| 2011/0170686 | A1 | 7/2011 | Goto | |
| 2011/0177780 | A1 | 7/2011 | Sato et al. | |
| 2011/0317211 | A1* | 12/2011 | Yamada et al. | 358/1.15 |
| 2012/0081745 | A1* | 4/2012 | Asai | 358/1.15 |
| 2012/0236358 | A1* | 9/2012 | Huang | 358/1.15 |
| 2012/0243041 | A1* | 9/2012 | Sakurai | 358/1.15 |
| 2013/0229673 | A1 | 9/2013 | Nakayama et al. | |
| 2013/0250354 | A1* | 9/2013 | Kato et al. | 358/1.15 |
| 2014/0366101 | A1* | 12/2014 | Murata | 726/4 |

OTHER PUBLICATIONS

U.S. Appl. No. 14/191,510, filed Feb. 27, 2014.
U.S. Appl. No. 14/191,513, filed Feb. 27, 2014.
Jul. 30, 2014—(US) Non-Final Office Action—U.S. Appl. No. 14/191,476.
Aug. 19, 2014—(US) Non-Final Office Action—U.S. Appl. No. 14/191,510.
Jul. 24, 2014—(EP) Extended Search Report—App 14157087.9.
Aug. 20, 2014—(US) Non-Final Office Action—U.S. Appl. No. 14/191,513.

\* cited by examiner

FIG. 2 (Print Function Which MFP is capable of Executing)

(First Embodiment)

(First and Second Embodiments)

FIG. 8
(First Embodiment)
(Case A)
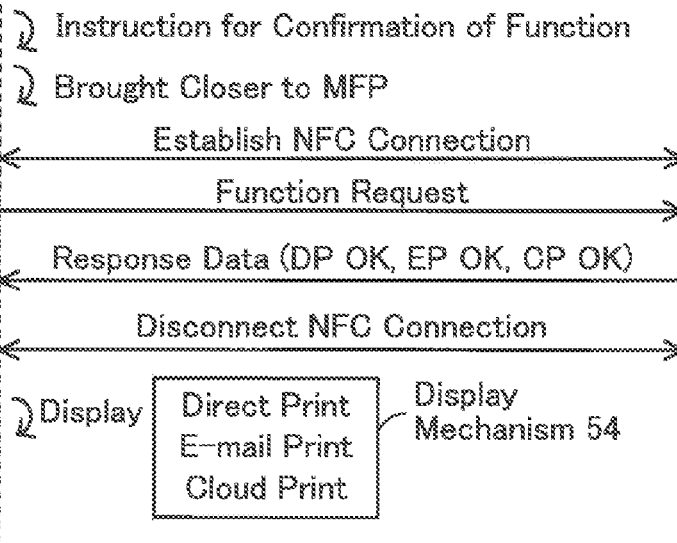
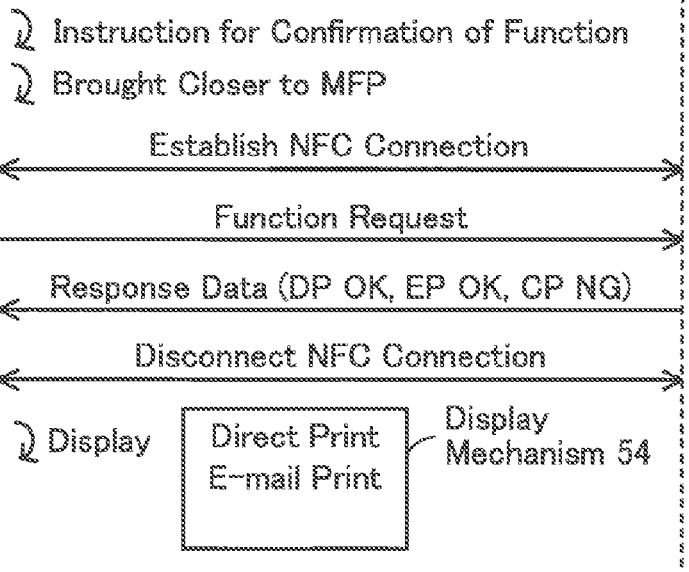

(Second Embodiment)
(Scan Function Which MFP is Capable of Executing)

(Second Embodiment)

(Scan Function Which MFP is Capable of Executing)

(Second Embodiment)

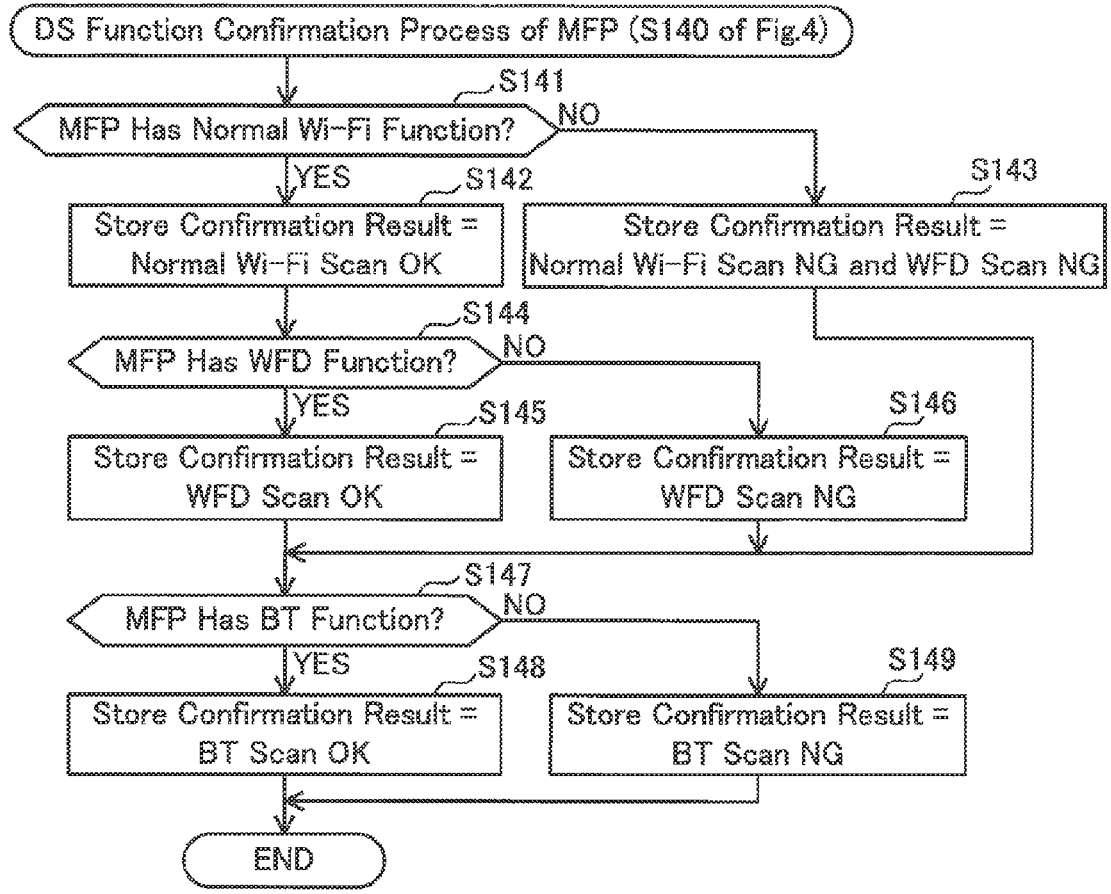
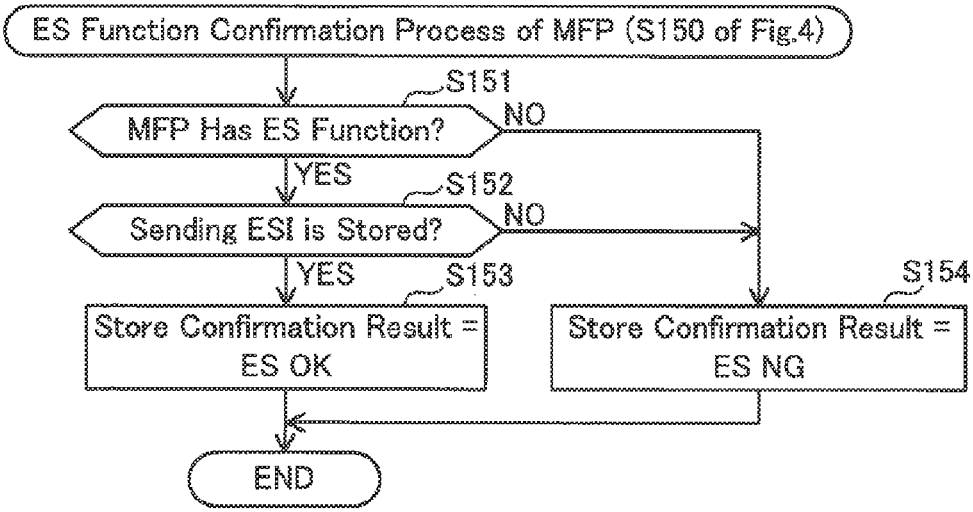

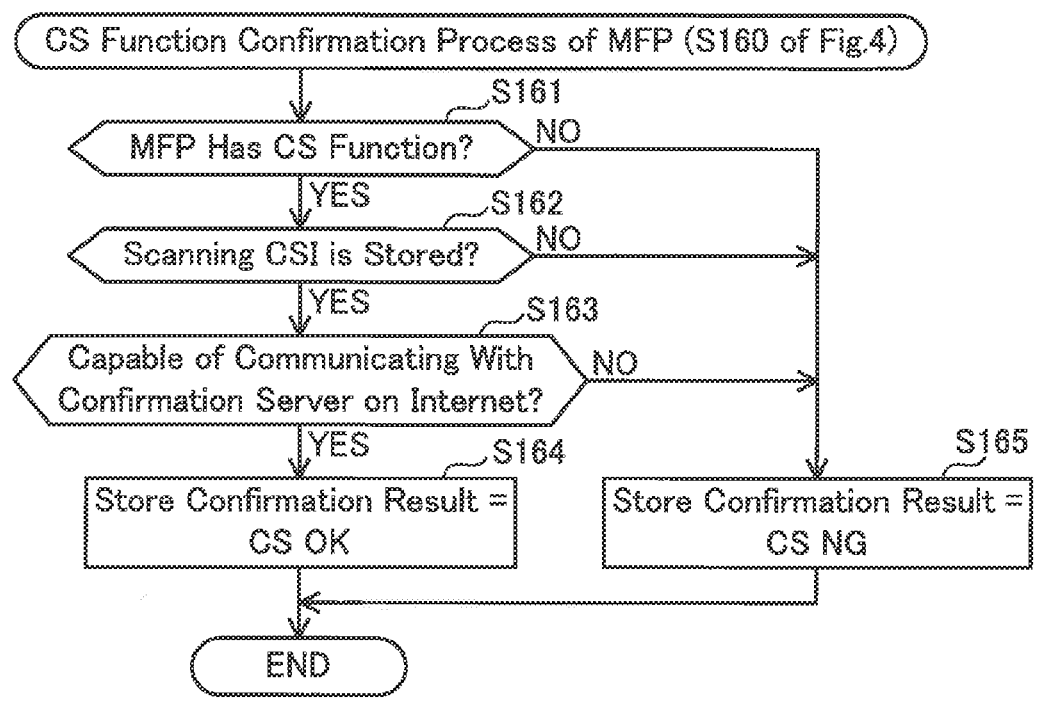
FIG.14 (Second Embodiment)

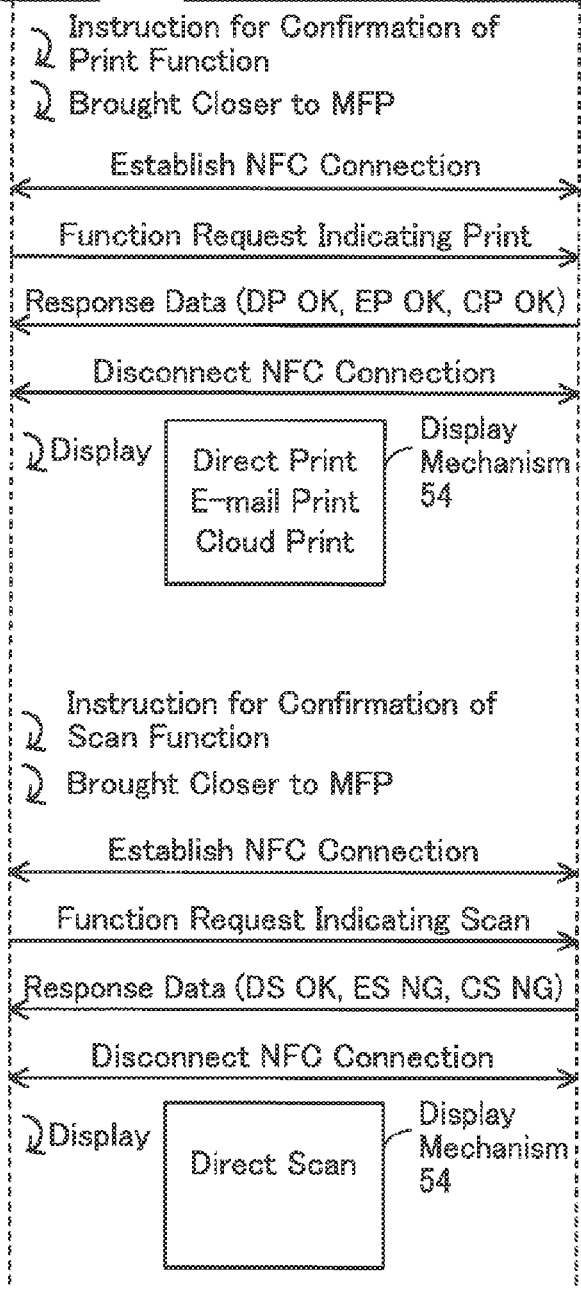

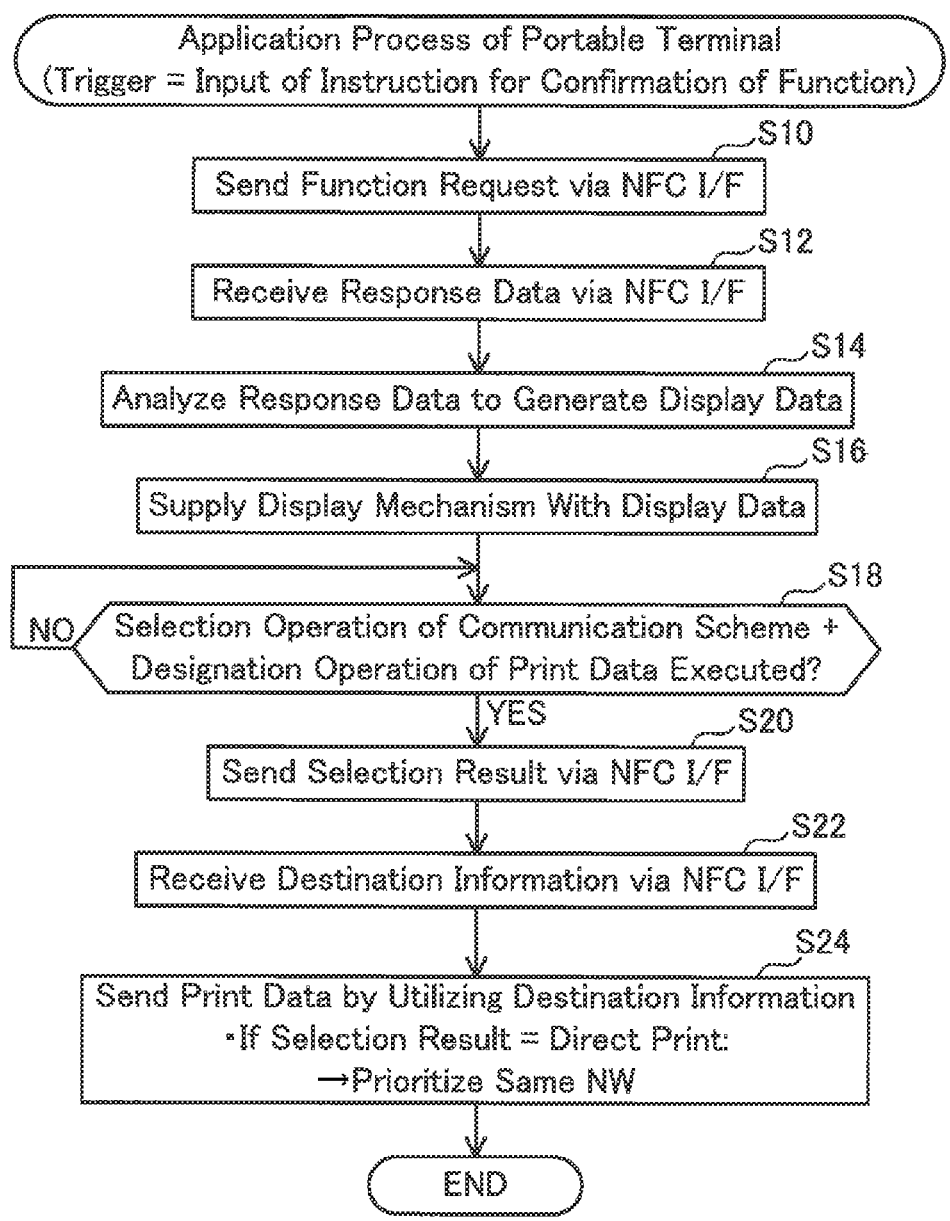

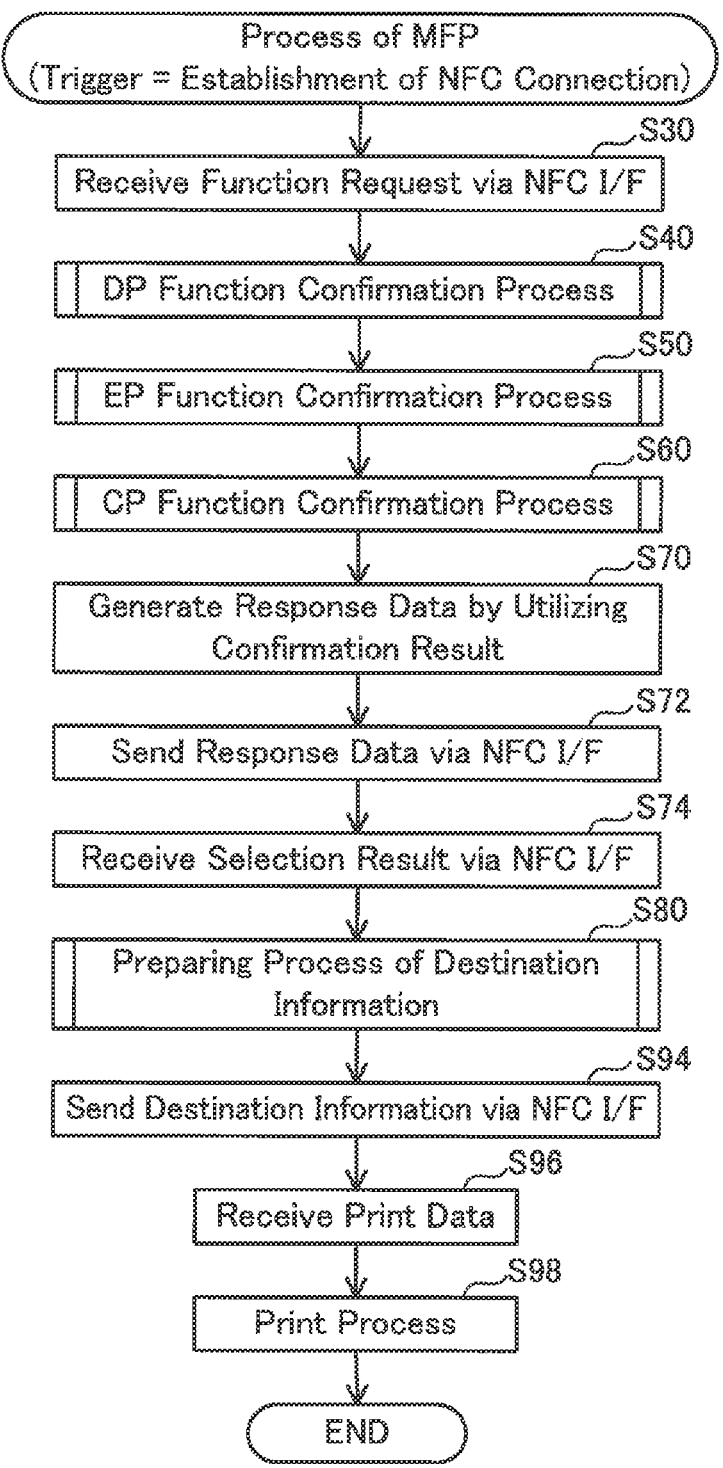

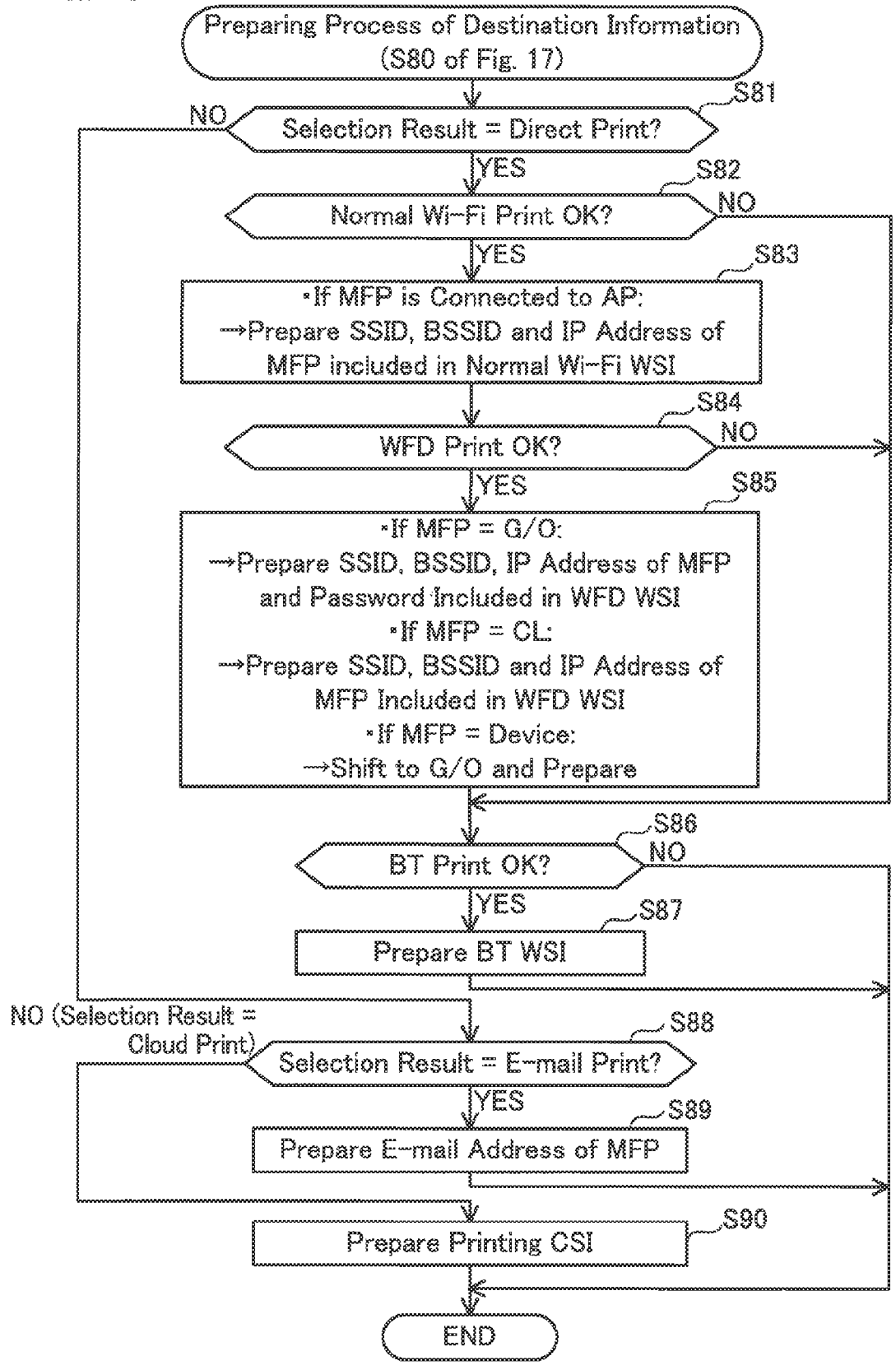
FIG.18 (Third Embodiment)

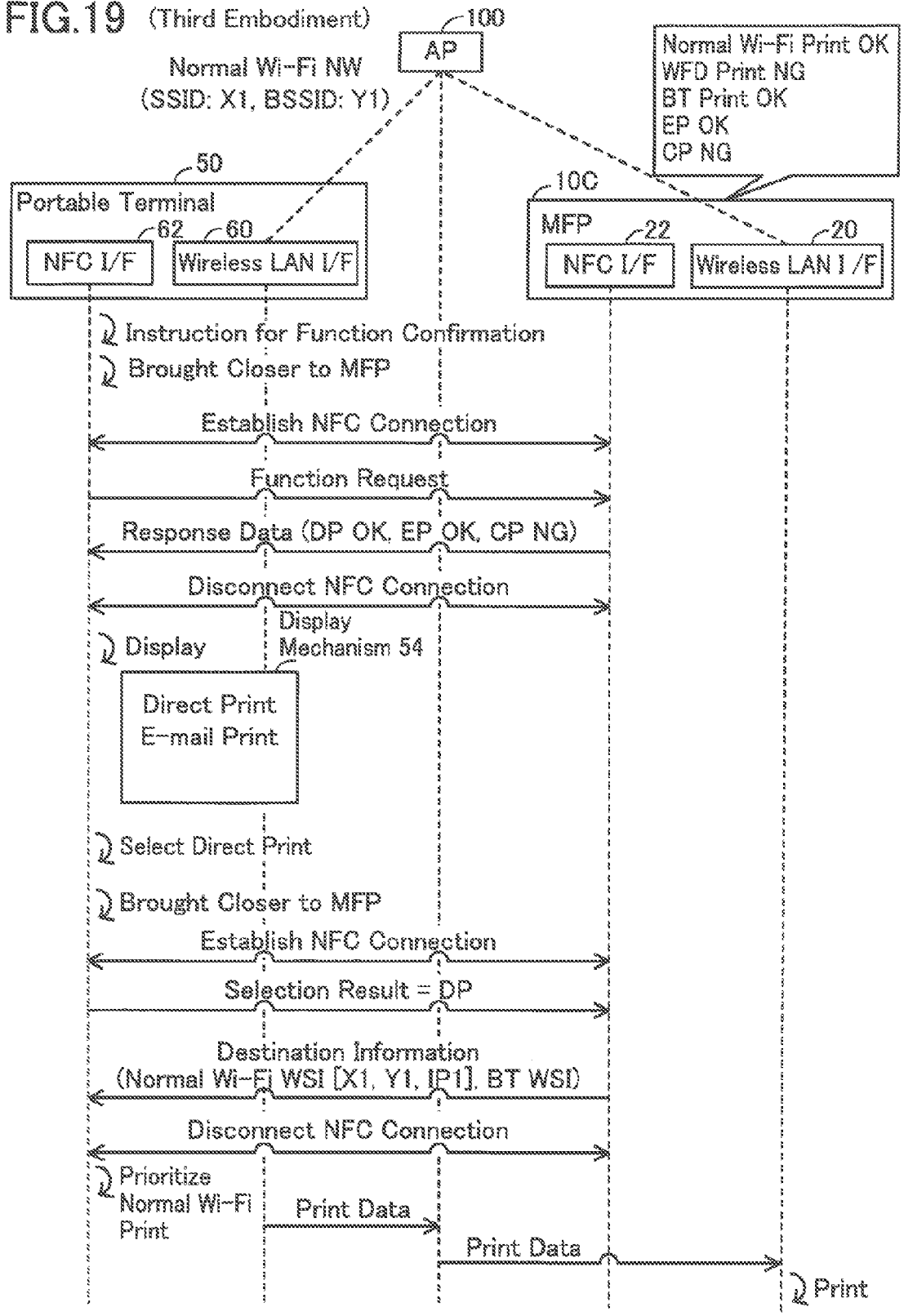

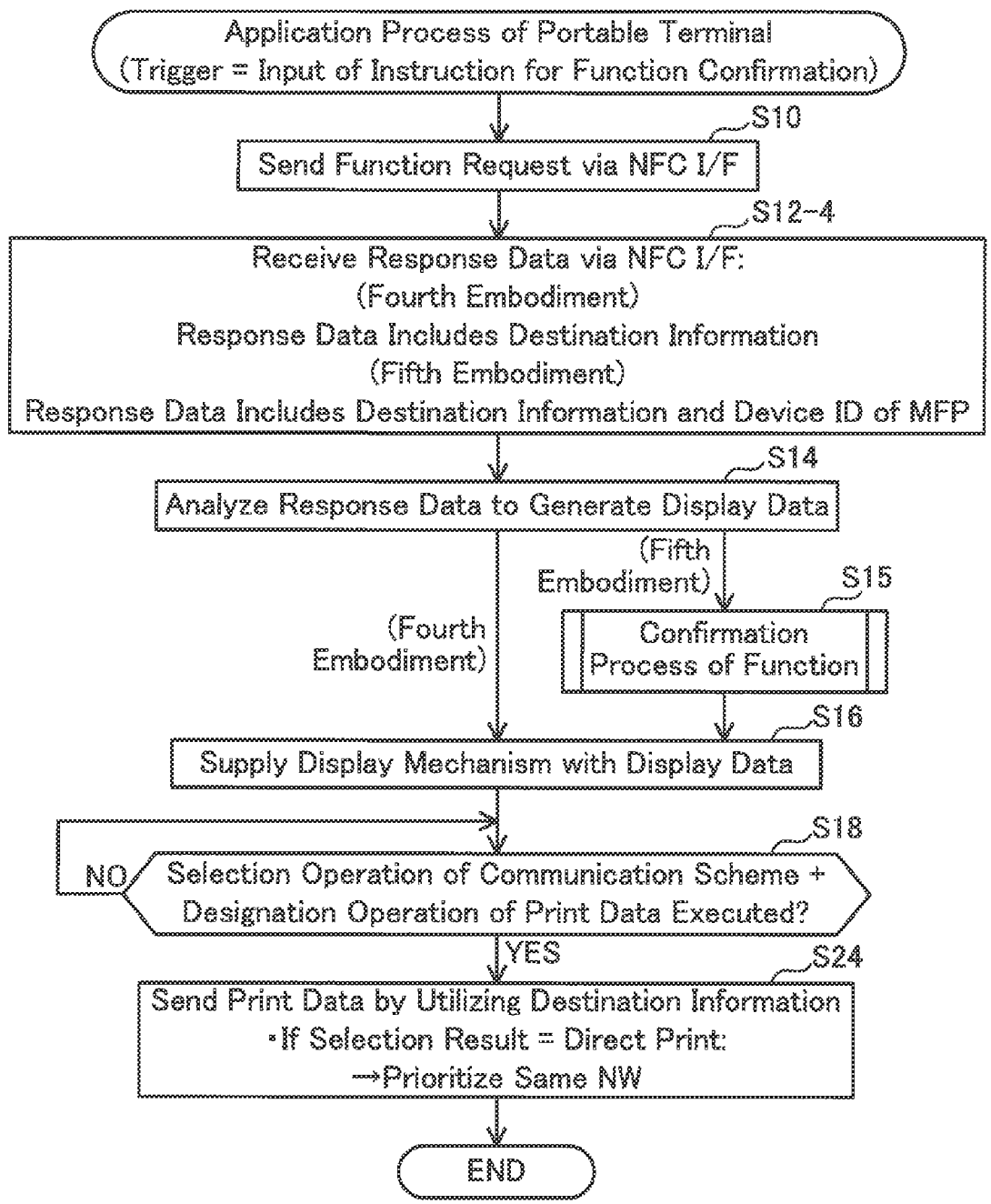

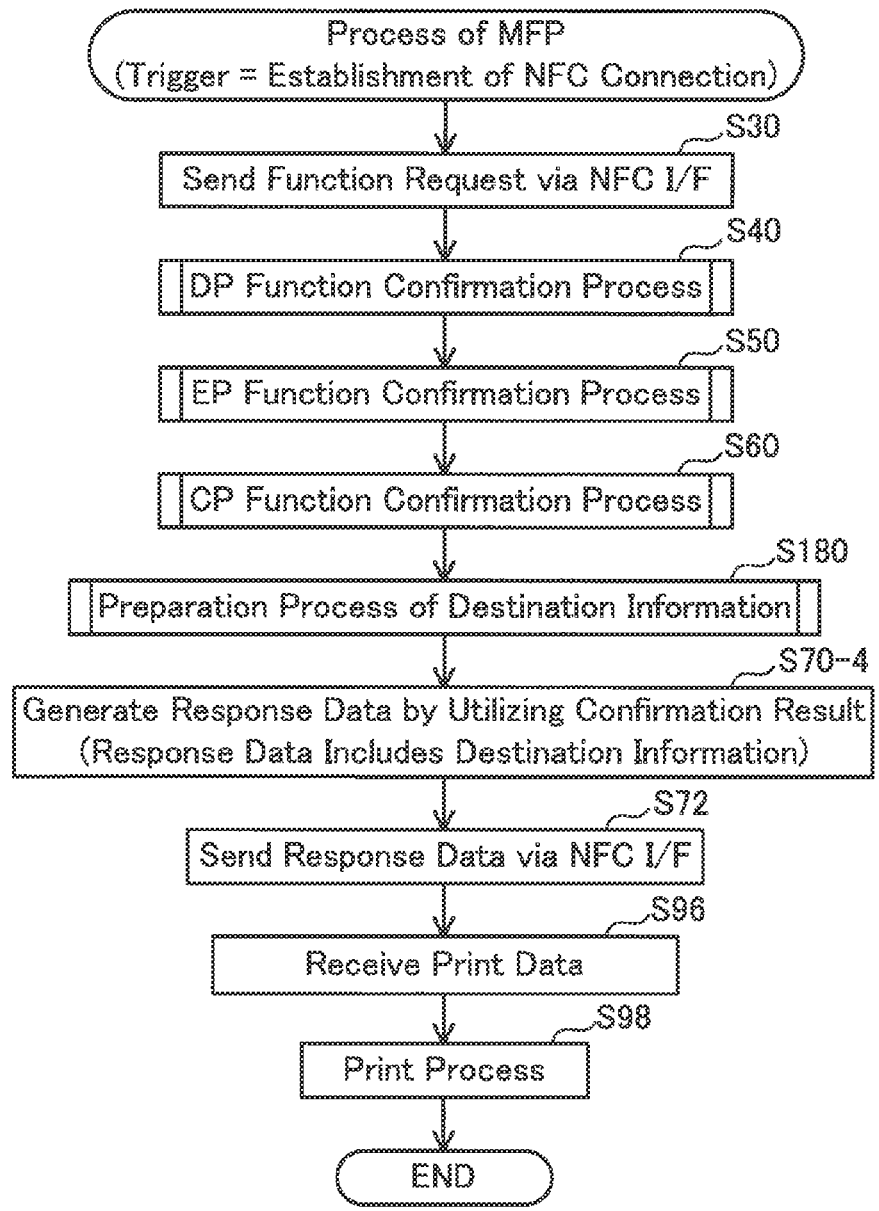

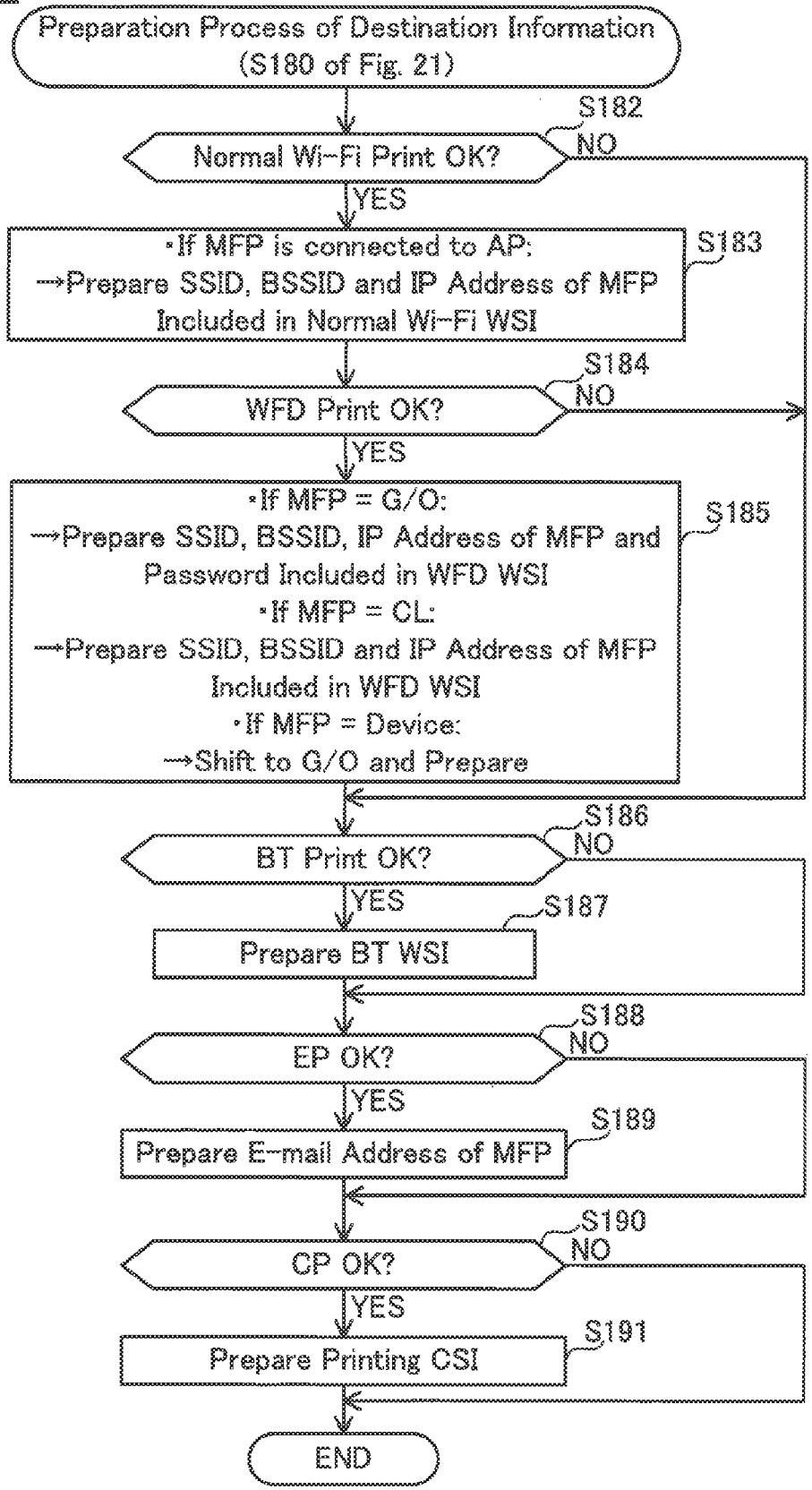

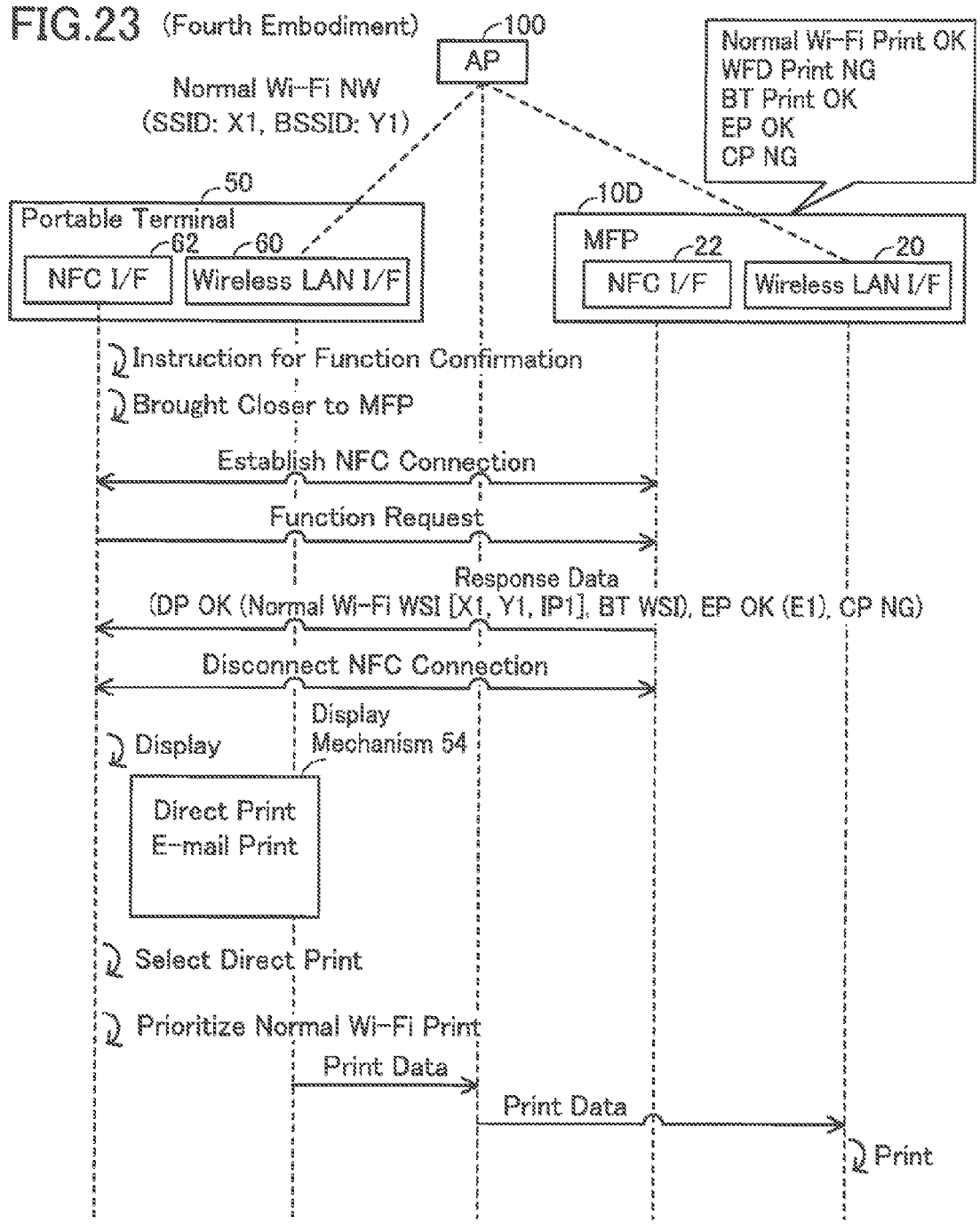

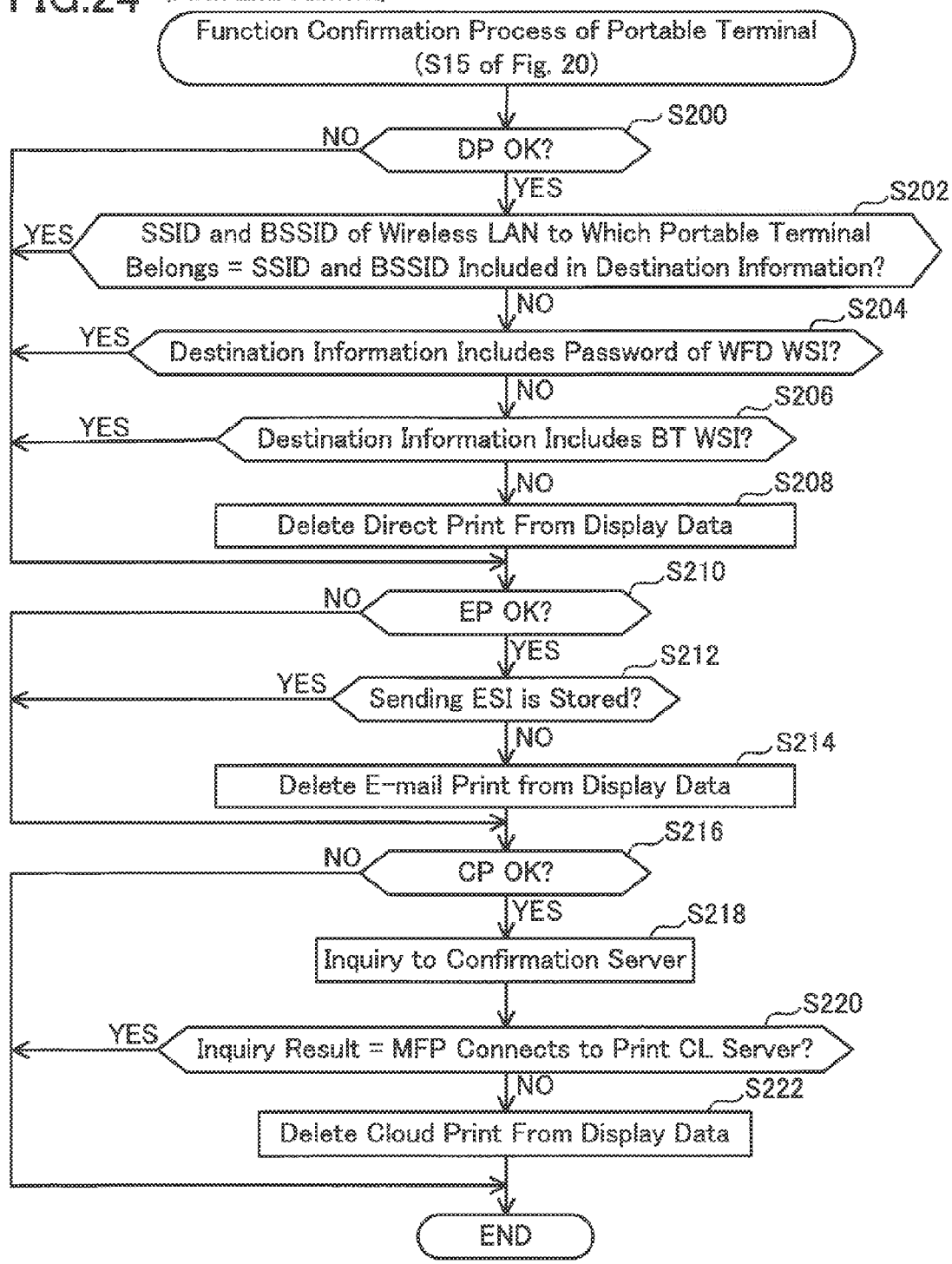

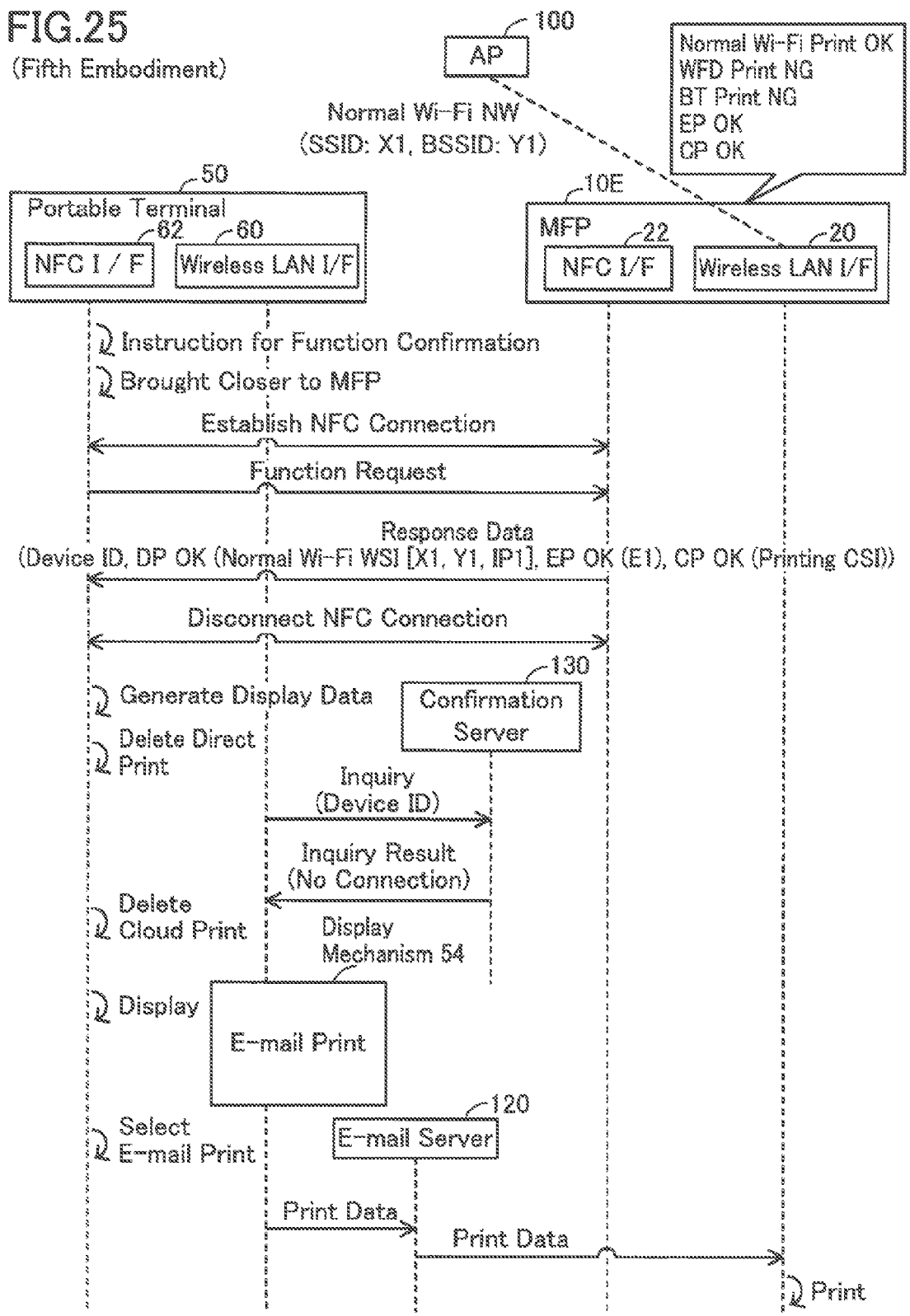

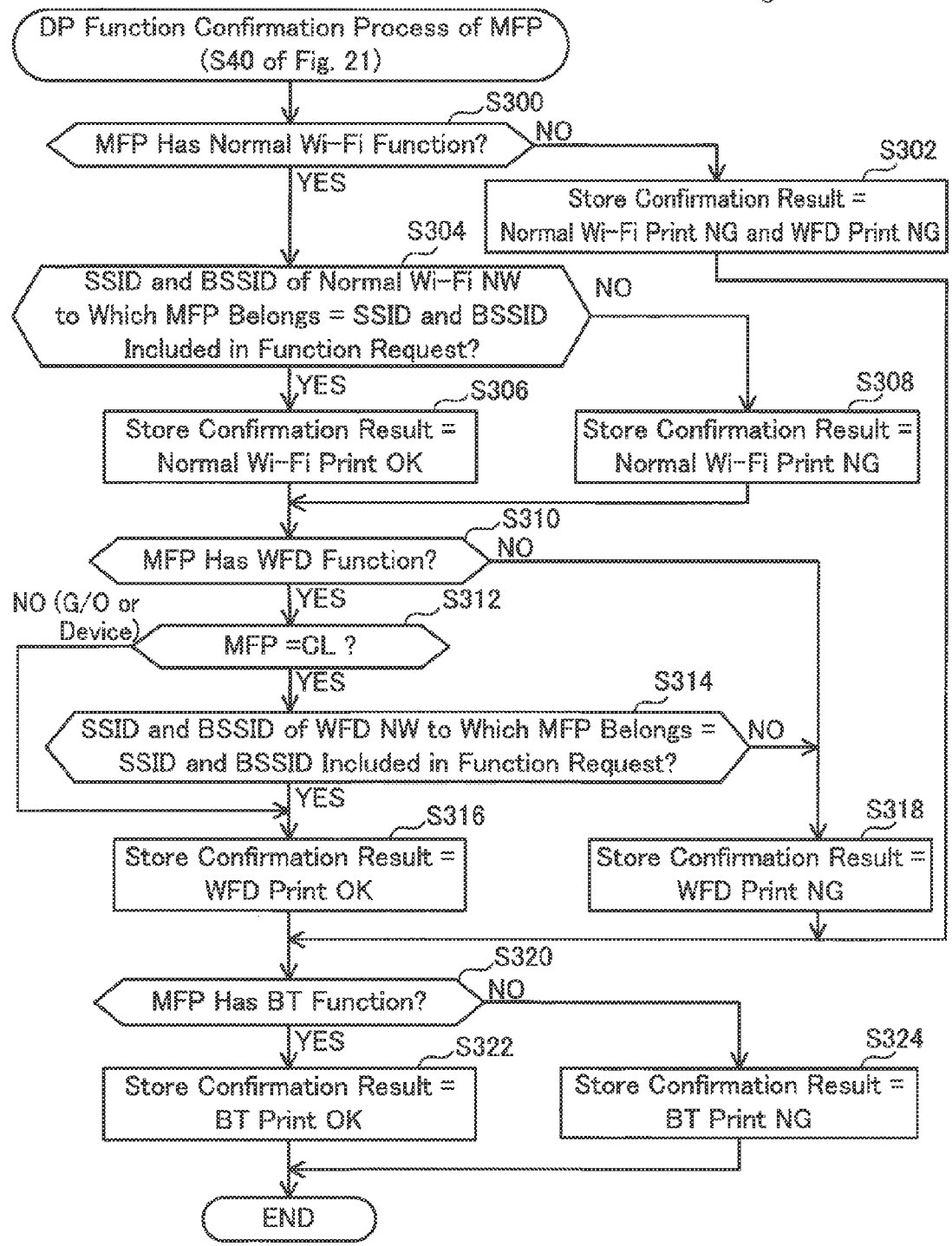

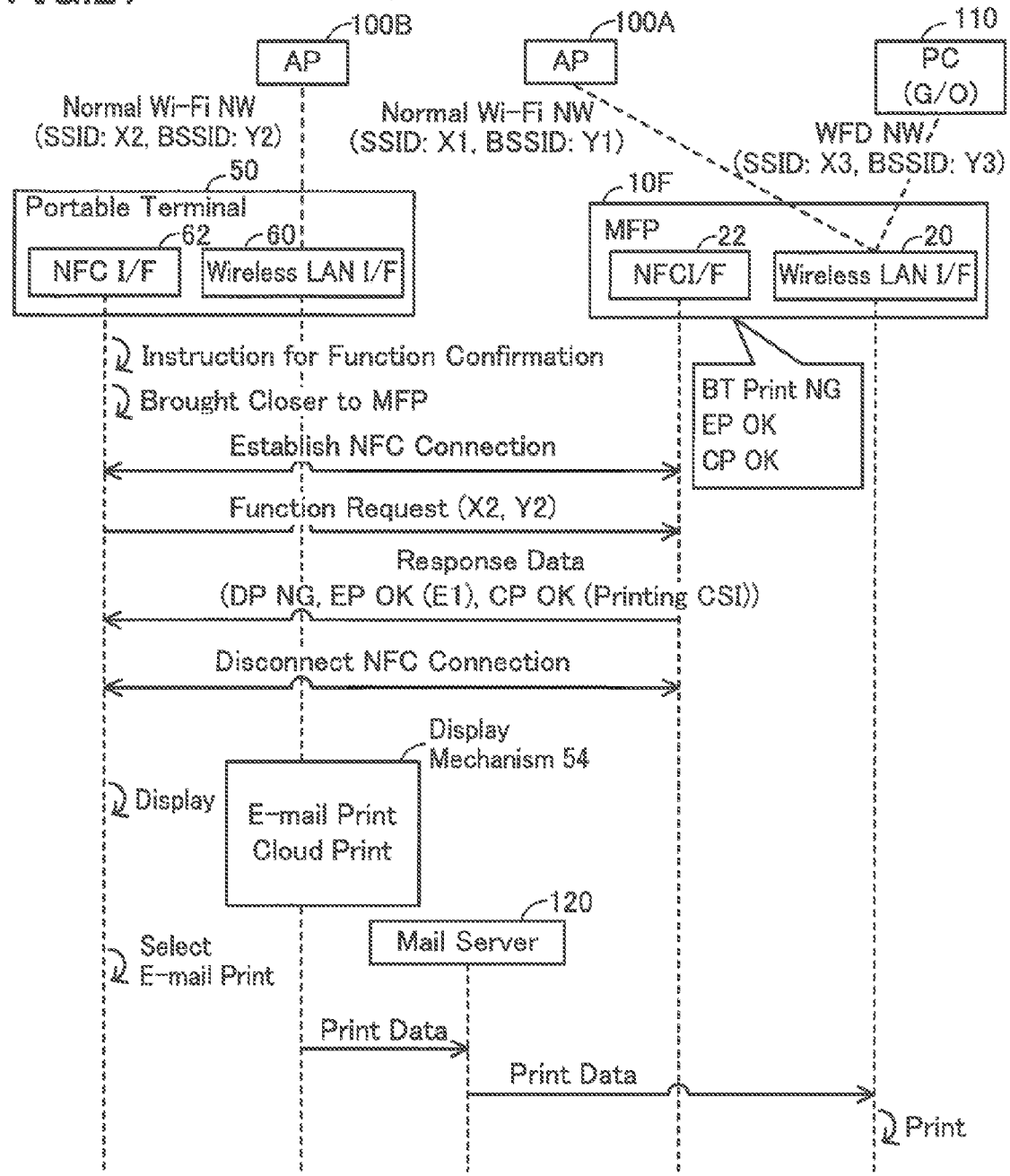

US 9,111,207 B2

TERMINAL APPARATUS INTERACTING WITH A FUNCTION EXECUTING APPARATUS TO PERFORM PRINT AND SCAN FUNCTIONS USING VARIOUS COMMUNICATION SCHEMES

CROSS-REFERENCE TO RELATED APPLICATIONS

This application claims priority to Japanese Patent Application No. 2013-040084, filed on Feb. 28, 2013, the contents of which are hereby incorporated by reference into the present application.

TECHNICAL FIELD

The present specification discloses a function executing apparatus capable of executing a print function, and a terminal apparatus capable of communicating with the function executing apparatus.

DESCRIPTION OF RELATED ART

A telephone system provided with a plurality of wireless telephones and a telephone control apparatus is known. Upon detecting a channel number which a wireless LAN base station has started to use, the telephone control apparatus notifies the each wireless telephone of the channel number. The each wireless telephone uses the notified channel number.

SUMMARY

A technique which may increase user convenience is taught in the present specification.

One aspect disclosed in the present specification may be a terminal apparatus. The terminal apparatus may comprise: a processor; and a memory storing computer-readable instructions therein. The computer-readable instructions, when executed by the processor, may cause the terminal apparatus to perform: receiving first information relating to a first function executing apparatus from the first function executing apparatus, the first function executing apparatus being configured to execute a print function; and causing a display mechanism of the terminal apparatus to display a first image indicating M1 items of communication schemes by using the first information, the M1 being an integer of one or more, each of the M1 items of communication schemes being a communication scheme available for the first function executing apparatus to receive print data.

One aspect disclosed in the present specification may be a function executing apparatus configured to execute a print function. The function executing apparatus may comprise: a processor; and a memory storing computer-readable instructions therein. The computer-readable instructions, when executed by the processor, may cause the function executing apparatus to perform: specifying M1 items of communication schemes among a plurality of communication schemes, the M1 being an integer of one or more, each of the M1 items of communication schemes being a communication scheme available for the function executing apparatus to receive print data; and sending first information indicating the M1 items of communication schemes to a terminal apparatus.

Moreover, a control method, a computer program, and a non-transitory computer-readable storage medium that stores the computer program, all for realizing the terminal apparatus and the function executing apparatus respectively, are also novel and useful. Further, a communication system comprising the terminal apparatus and the function executing apparatus is also novel and useful.

BRIEF DESCRIPTION OF THE DRAWINGS

FIG. 8 shows a sequence view of processes executed by devices of the first embodiment.
FIG. 12 shows a flowchart of a DS function confirmation process.
FIG. 13 shows a flowchart of an ES function confirmation process.
FIG. 14 shows a flowchart of a CS function confirmation process.
FIG. 15 shows a sequence view of processes executed by devices of the second embodiment.
FIG. 16 shows a flowchart of an application process of a portable terminal of a third embodiment.
FIG. 17 shows a flowchart of a process of an MFP of the third embodiment.
FIG. 18 shows a flowchart of a preparing process of destination information of the third embodiment.
FIG. 19 shows a sequence view of processes executed by devices of the third embodiment.
FIG. 20 shows an application process of a portable terminal of a fourth and fifth embodiments.
FIG. 21 shows a process of an MFP of the fourth embodiment.
FIG. 22 shows a preparing process of destination information of the fourth embodiment.
FIG. 23 shows a sequence view of processes executed by devices of the fourth embodiment.
FIG. 24 shows a flowchart of a function confirmation process of a portable terminal of the fifth embodiment.
FIG. 25 shows a sequence view of processes executed by devices of the fifth embodiment.
FIG. 26 shows a flowchart of a DP function confirmation process of an MFP of a sixth embodiment.
FIG. 27 shows a sequence view of processes executed by devices of the sixth embodiment.

Figure 1:
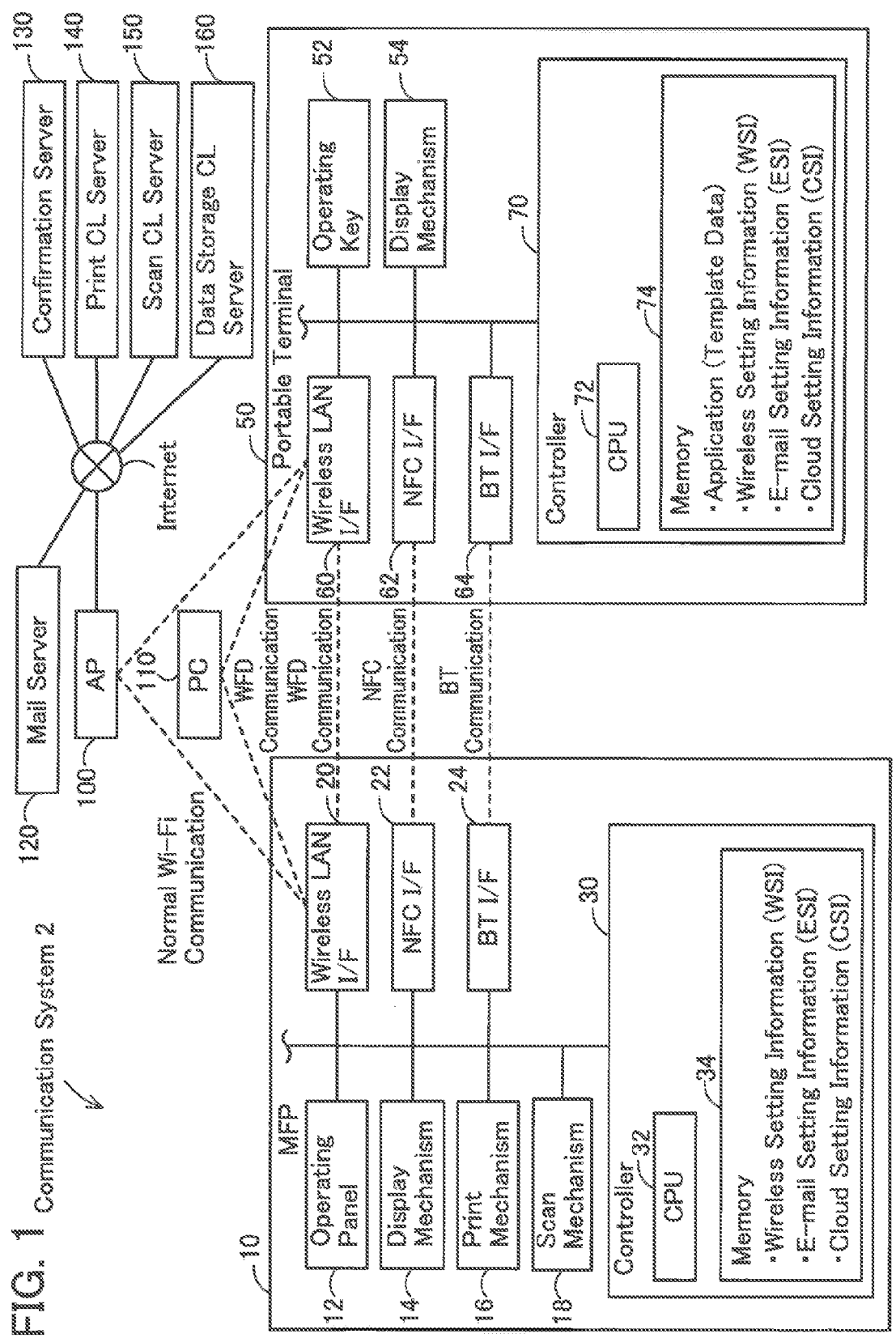
FIG. 1 shows the structure of a communication system.

EMBODIMENT (First Embodiment)
(Structure of Communication System 2)
As shown in FIG. 1, a communication system 2 comprises a multi-function peripheral (called "MFP (abbreviation of Multi-Function Peripheral)" below) 10, a portable terminal 50, an access point (called "AP (abbreviation of Access Point)" below) 100, a PC (abbreviation of Personal Computer) 110, a mail server 120, a confirmation server 130, a print CL server 140, a scan CL server 150, and a data storage CL server 160.

(Structure of MFP 10)

The MFP 10 is a peripheral device (e.g., a peripheral device of the PC 110) capable of executing multiple functions including a print function and a scan function. The MFP 10 comprises an operating panel 12, a display mechanism 14, a print mechanism 16, a scan mechanism 18, a wireless LAN (abbreviation of Local Area Network) interface 20, an NFC (abbreviation of Near Field Communication) interface 22, a BT (abbreviation of Blue Tooth (registered trademark)) interface 24, and a controller 30. The units 12 to 30 are connected with a bus line (reference number omitted). Below, interface is referred to as "I/F".

The operating panel 12 comprises a plurality of keys. A user can give various instructions to the MFP 10 by operating the operating panel 12. The display mechanism 14 is a display for showing various types of information. The print mechanism 16 is a print mechanism such as an ink jet method, laser method. The scan mechanism 18 is a scan mechanism such as a CCD or CIS.

The wireless LAN I/F 20 is an interface for executing a wireless communication, and is physically one interface (i.e., one IC chip). However, a MAC address (called "WFD MAC" below) used in wireless communication (called "WFD communication" below) according to a WFD (abbreviation of Wi-Fi Direct) scheme, and a MAC address (called "normal Wi-Fi MAC" below) used in wireless communication (called "normal Wi-Fi communication" below) according to a normal Wi-Fi scheme both be assigned to the wireless LAN I/F 20.

Specifically, a normal Wi-Fi MAC is assigned in advance to the wireless LAN I/F 20. By using the normal Wi-Fi MAC, the controller 30 generates a WFD MAC which is different from the normal Wi-Fi MAC, and assigns the WFD MAC to the wireless LAN I/F 20. Consequently, the controller 30 can simultaneously execute both a normal Wi-Fi communication using the normal Wi-Fi MAC, and a WFD communication using the WFD MAC. The WFD communication and the normal Wi-Fi communication will be described in detail later.

The NFC I/F 22 is an interface for executing NFC communication. NFC communication is a wireless communication according to an NFC scheme for so-called short distance wireless communication. The NFC scheme is a wireless communication scheme based on e.g., international standards ISO/IEC21481 or 18092.

The BT I/F 24 is an interface for executing BT communication. BT communication is a wireless communication according to a BT scheme for a so-called short distance wireless communication. The BT scheme is a wireless communication scheme based on e.g., standard IEEE802.15.1. A chip configuring the wireless LAN I/F 20, a chip configuring the NFC I/F 22, and a chip configuring the BT I/F 24 are physically different. Moreover, in the present embodiment, each of the three I/Fs are configured as different chips. However, in a variant, the wireless LAN I/F 20, the NFC I/F 22, and the BT I/F 24 may be configured as one chip, or two of the three I/Fs may be configured as one chip.

A communication speed (e.g., maximum communication speed is 11 to 600 Mbps) of a wireless communication (i.e., normal Wi-Fi communication and WFD communication) using the wireless LAN I/F 20 is faster than a communication speed (e.g., maximum communication speed is 24 Mbps) of a wireless communication via the BT I/F 24 (i.e., BT communication). The communication speed of a wireless communication via the BT I/F 24 (i.e., BT communication) is faster than a communication speed (e.g., maximum communication speed is 100 to 424 Kbps) using the NFC I/F 22. That is, the communication speed of the wireless communication is fastest for the wireless LAN I/F 20, second fastest for the BT I/F 24, and slowest for the NFC I/F 22.

Frequency of a carrier wave in a wireless communication via the wireless LAN I/F 20 is, e.g., 2.4 GHz band or 5.0 GHz band. Frequency of a carrier wave in a wireless communication via the NFC I/F 22 is, e.g., 13.56 MHz band. Frequency of a carrier wave in a wireless communication via the BT I/F 24 is, e.g., 2.4 GHz band. That is, the frequency of the carrier wave is different for the wireless LAN I/F 20 and the NFC I/F 22, and is different for the NFC I/F 22 and the BT I/F 24. Further, in a case where the frequency of the carrier wave of the wireless LAN I/F 20 is 5.00 Hz band, the frequency of the carrier wave differs between the wireless LAN I/F 20 and the BT I/F 24.

A maximum distance (e.g., approximately 100 m) across which the MFP 10 can execute a wireless communication with a communication destination device (e.g., the portable terminal 50) via the wireless LAN I/F 20 is greater than a maximum distance (e.g., approximately several tens of meters) across which the MFP 10 can execute a wireless communication with a communication destination device (e.g., the portable terminal 50) via the BT I/F 24. Further, a maximum distance (e.g., approximately several tens of meters) across which the MFP 10 can execute a wireless communication with a communication destination device (e.g., the portable terminal 50) via the BT I/F 24 is greater than a maximum distance (e.g., approximately 10 cm) across which the MFP 10 can execute a wireless communication with a communication destination device via the NFC I/F 22. That is, the communicable range of the wireless communication is greatest for the wireless LAN I/F 20, second greatest for the BT I/F 24, and smallest for the NFC I/F 22.

The controller 30 comprises a CPU 32 and a memory 34. The CPU 32 executes various processes according to a program stored in the memory 34. Further, the memory 34 can store wireless setting information (called "WSI (abbreviation of Wireless Setting Information)" below) for the MFP 10 to execute various types of communication (i.e., WFD communication, normal Wi-Fi communication, BT communication), E-mail setting information (called "ESI (abbreviation of E-mail Setting Information)" below) for the MFP 10 to execute E-mail (abbreviation of Electronic Mail) communication, and cloud setting information (called "CSI (abbreviation of Cloud Setting Information)" below) for the MFP 10 to execute communication with a cloud server (called "cloud communication" below). Moreover, the E-mail communication or cloud communication may be executed via the wireless LAN I/F 20, or may be executed via another I/F, which is not shown (e.g., a wired LAN I/F, etc.).

(Structure of Portable Terminal 50)

The portable terminal 50 is a portable terminal apparatus such as a mobile phone (e.g., a Smart Phone), PDA, notebook PC, tablet PC, portable music playback device, portable video playback device, etc. The portable terminal 50 comprises an operating key 52, a display mechanism 54, a wireless LAN I/F 60, an NFC I/F 62, a BT I/F 64, and a controller 70. The units 52 to 70 are connected to a bus line (reference number omitted).

The user can give various instructions to the portable terminal 50 by operating the operating key 52. The display mechanism 54 is a display for displaying various types of information. The I/Fs 60, 62, 64 are the same as the I/Fs 20, 22, 24 of the MFP 10. Consequently, the differences between the I/Fs 60, 62, 64 are the same as the differences between the I/Fs 20, 22, 24.

The controller 70 comprises a CPU 72 and a memory 74. The CPU 72 executes various processes according to a program stored in the memory 74. The memory 74 stores an application (called "MFP application" below) for causing the MFP 10 to execute a function (e.g., print function, scan function, etc.). The MFP application may, e.g., be installed on the portable terminal 50 from a server provided by a vendor of the MFP 10, or may be installed on the portable terminal 50 from a media shipped together with the MFP 10.

Further, the memory 74 can store WSI for the portable terminal 50 to execute various types of communication (WFD communication, normal Wi-Fi communication, BT communication), ESI for the portable terminal 50 to execute E-mail communication, and CSI for the portable terminal 50 to execute cloud communication. Moreover, the E-mail communication or the cloud communication may be executed via the wireless LAN I/F 60, or may be executed via another I/F, which is not shown (e.g., a wired LAN I/F, an I/F for connecting to a cellular network (e.g., 3G, 4G), etc.).

(Structure of Other Apparatuses 100 to 160)

The AP 100 is a standard access point called a wireless access point, wireless LAN router, etc., and is different from a WFD scheme G/O device (to be described). The AP 100 can form a normal Wi-Fi network (to be described). The AP 100 comprises a router function that is connected to the Internet and that relays communication between the Internet and the normal Wi-Fi network formed by the AP 100. Moreover, below, a network may be described as "NW".

The PC 110 is a known computer that operates according to an OS program. The PC 110 can execute a WFD communication according to the WFD scheme.

The servers 120 to 160 are connected with the Internet. The mail server 120 includes an SMTP (abbreviation of Simple Mail Transfer Protocol) server, and a POP (abbreviation of Post Office Protocol) server. The mail server 120 relays the communication of electronic mail in a case where sending of electronic mail from one communication device (e.g., the portable terminal 50) to another communication device (e.g., the MFP 10) is to be executed.

The confirmation server 130, the print CL (abbreviation of Cloud) server 140, and the scan CL server 150 are each servers provided by e.g., the vendor of the MFP 10. The confirmation server 130 sends a response signal to the MFP 10 in case of receiving a signal from the MFP 10. Further, in case of receiving a signal from the portable terminal 50, the confirmation server 130 sends a response signal to the portable terminal 50. In a case where sending of print data from a communication device (e.g., the portable terminal 50) to the MFP 10 is to be executed, the print CL server 140 relays the communication of the print data. The scan CL server 150, in a case where sending of scan data from the MFP 10 to a communication device (e.g., the portable terminal 50) is to be executed, relays the communication of the scan data.

The data storage CL server 160 is a known server such as, e.g., FACEBOOK (registered trademark), GOOGLE DOCS (registered trademark), PICASA (registered trademark), etc. The data storage CL server 160 receives scan data from the MFP 10, and stores the scan data.

Figure 2:
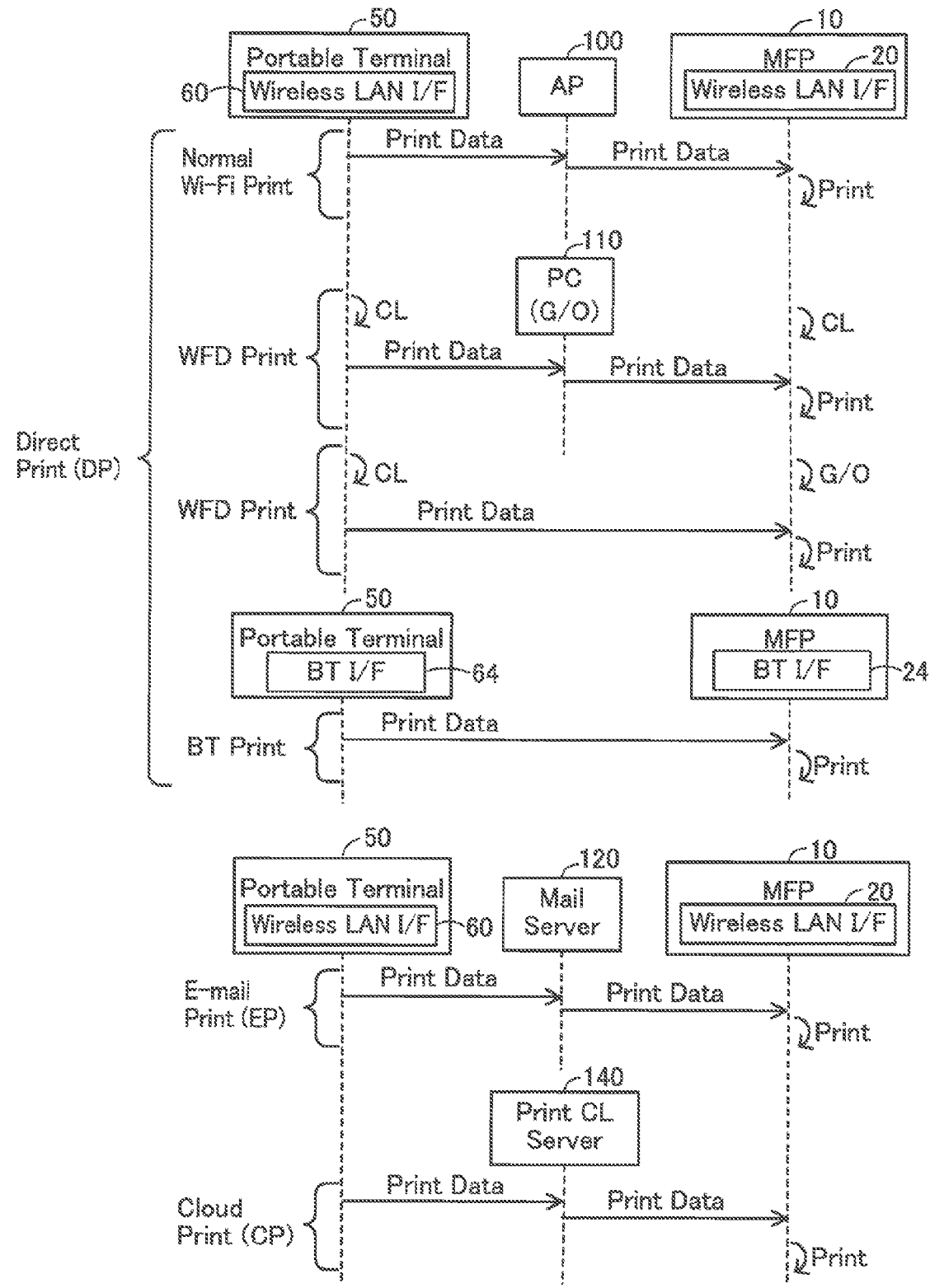
FIG. 2 shows a view for describing a print function which an MFP is capable of executing.

(Print Function which MFP 10 is Capable of Executing; FIG. 2)

Next, print functions which the MFP 10 is capable of executing will be described with reference to FIG. 2. The print functions are classified into direct print (called "DP" below), E-mail print (called "EP" below), and cloud print (called "CP" below).

(DP)

In DP, the sending of print data from the portable terminal 50 to the MFP 10 is executed not via the Internet. DP is classified into normal Wi-Fi print, WFD print, and BT print.

(Normal Wi-Fi Print)

In normal Wi-Fi print, the communication of print data is executed by using a normal Wi-Fi NW formed in accordance with a normal Wi-Fi scheme. The normal Wi-Fi scheme is a wireless communication scheme defined by Wi-Fi Alliance, and is a wireless communication scheme for executing a wireless communication via the AP 100.

FIG. 2 shows a normal Wi-Fi NW that includes the MFP 10, the portable terminal 50, and the AP 100. In a state where this type of normal Wi-Fi NW has been formed, the wireless LAN I/F 20 of the MFP 10 can receive print data from the wireless LAN I/F 60 of the portable terminal 50, via the AP 100, by using the normal Wi-Fi NW.

The MFP 10 and the portable terminal 50 each store WSI for belonging to the normal Wi-Fi NW (i.e., WSI for executing a normal Wi-Fi communication (called "normal Wi-Fi WSI" below)). The normal Wi-Fi WSI includes an SSID, BSSID, authentication scheme, encryption scheme, password, etc. The SSID is identification information for identifying the normal Wi-Fi NW, and is generated by the AP 100. The BSSID is identification information for identifying the AP 100 (i.e., a MAC address of the AP 100). The normal Wi-Fi WSI of the MFP 10 further includes an IP address of the MFP 10, and the normal Wi-Fi WSI of the portable terminal 50 further includes an IP address of the portable terminal 50. Moreover, in normal Wi-Fi print, the MFP 10 and the portable terminal 50 execute the communication of print data by using, e.g., a communication protocol such as LPR (abbreviation of Line PRinter daemon protocol).

(WFD Print)

In WFD print, the communication of print data is executed by using a WFD NW formed in accordance with a WFD scheme. The WFD scheme is a wireless communication scheme described in the standard document "Wi-Fi Peer-to-Peer (P2P) Technical Specification Version 1.1", created by Wi-Fi Alliance.

Below, an apparatus capable of executing an operation in accordance with the WFD scheme, such as the MFP 10, the portable terminal 50, etc. is called a "WFD-compatible device". In the WFD standard document, three states are defined as the states of the WFD-compatible device: Group Owner state (called "G/O state" below), client state (called "CL state" below), and device state. The WFD-compatible device is capable of selectively operating in one state among the three states.

When a pair of WFD-compatible devices that are in the device state are to newly form a wireless network, the pair of WFD-compatible devices usually execute a wireless communication called G/O negotiation. In the G/O negotiation, it is determined that one of the pair of WFD-compatible devices will assume the G/O state (i.e., become a G/O device), and that the other of the pair of WFD-compatible devices will assume the CL state (i.e., become a CL device). Then the pair of WFD-compatible devices establishes a connection and forms the wireless network.

Below, a wireless network formed in accordance with a procedure (e.g., G/O negotiation) of the WFD scheme is called a "WFD NW". At a stage where the WFD NW has been newly formed by means of G/O negotiation, only one G/O device and one CL device belong to the WFD NW. However, the G/O device can establish a connection with another device, and cause the other device to newly participate in the WFD NW as a CL device. In this case, a state is formed in which two or more CL devices belong to the WFD NW. That is, one G/O device and one or more CL devices can be present in the WFD NW. The G/O device manages the one or more CL devices. Specifically, the G/O device registers the MAC address of each of the one or more CL devices in a management list in the memory of the G/O device. The G/O device is capable of executing, not via another device, a wireless communication of target data with the CL device registered in the management list. Further, the G/O device is capable of relaying a wireless communication of target data (e.g., print data, scan data, etc.) between the plurality of CL devices. In other words, the pair of CL devices are capable of executing a wireless communication of the target data via the G/O device.

FIG. 2 shows an example of the WFD NW in which the PC 110 is a G/O device, and the portable terminal 50 and the MFP 10 are CL devices. In a state where this type of WFD NW has been formed, the wireless LAN I/F 20 of the MFP 10, which is a CL device, can use the WFD NW to receive print data via the PC 110, which is a G/O device, from the wireless LAN I/F 60 of the portable terminal 50, which is a CL device.

FIG. 2 further shows an example of the WFD NW in which the MFP 10 is a G/O device and the portable terminal 50 is a CL device. In a state where this type of WFD NW has been formed, the wireless LAN I/F 20 of the MFP 10, which is a G/O device, can use the WFD NW to receive print data from the wireless LAN I/F 60 of the portable terminal 50, which is a CL device, not via another device.

The MFP 10 and the portable terminal 50 each store WSI for belonging to the WFD NW (i.e., WSI for executing WFD communication (called "WFD WSI" below)). The WFD WSI includes an SSID, BSSID, authentication scheme, encryption scheme, password, etc. The SSID is identification information for identifying the WFD NW, and is generated by the G/O device. The BSSID is identification information for identifying the G/O device (i.e., a MAC address of the G/O device). The WFD WSI of the MFP 10 further includes the IP address of the MFP 10, and the WFD WSI of the portable terminal 50 further includes the IP address of the portable terminal 50. Moreover, in WFD print, the MFP 10 and the portable terminal 50 execute the communication of print data by using a communication protocol such as LPR.

(BT print)

In BT print, the communication of print data is executed by using a BT NW formed in accordance with the BT scheme. FIG. 2 shows a BT NW that includes the MFP 10 and the portable terminal 50. In a state where this type of the BT NW has been formed, the BT I/F 24 of the MFP 10 can use the BT NW to receive print data from the BT I/F 64 of the portable terminal 50, not via another device.

The MFP 10 and the portable terminal 50 each store WSI for belonging to the BT NW (i.e., WSI for executing BT communication (called "BT WSI" below)). The BT WSI includes a PIN code (i.e., a pairing code). Moreover, in the BT print, the MFP 10 and the portable terminal 50 execute a communication of print data by using a communication protocol such as, e.g., BPP (abbreviation of Basic Printing Profile), BIP (abbreviation of Basic Imaging Profile), OPP (abbreviation of Object Push Profile), etc.

(EP)

In EP, the sending of print data (i.e., an E-mail communication) from the portable terminal 50 to the MFP 10 is executed via the Internet. As shown in FIG. 2, the wireless LAN I/F 20 of the MFP 10 can receive print data from the wireless LAN I/F 60 of the portable terminal 50 via the mail server 120.

In order to execute the E-mail communication of print data, the MFP 10 and the portable terminal 50 each store ESI. That is, the portable terminal 50 stores at least sending ESI (i.e., SMTP setting information) for sending E-mail. Further, the MFP 10 stores at least receiving ESI (i.e., POP setting information) for receiving E-mail.

The SMTP setting information includes a URL (abbreviation of Uniform Resource Locator) of an SMTP server, user name, password, etc. The POP setting information includes a URL of a POP server, user name, password, etc. In the present embodiment, the SMTP server and the POP server are shown as the one mail server 120 but, in a variant, may be configured separately. In EP, the MFP 10 and the portable terminal 50 execute communication of print data by using the SMTP and POP communication protocols.

(CP)

In CP, the sending of print data (i.e., cloud communication) from the portable terminal 50 to the MFP 10 is executed via the Internet. As shown in FIG. 2, the wireless LAN I/F 20 of the MFP 10 can receive print data from the wireless LAN I/F 60 of the portable terminal 50 via the print CL server 140.

In order to execute the cloud communication of print data, the MFP 10 and the portable terminal 50 each store printing CSI. The printing CSI includes a URL (abbreviation of Uniform Resource Locator) of the print CL server 140, account information, authentication information (e.g., an access token), etc. In CP, the MFP 10 and the portable terminal 50 execute a communication of print data by using a communication protocol such as HTTP (abbreviation of Hyper Text Transfer Protocol).

Above DP, EP, CP are each print functions which the MFP 10 is capable of executing but, in other words, mean communication schemes for the MFP 10 to receive print data. That is, DP means a communication scheme which is a direct scheme (i.e., the normal Wi-Fi scheme, the WFD scheme, and the BT scheme). EP, CP mean communication schemes which are an E-mail scheme and a cloud scheme, respectively. That is, the MFP 10 can receive print data by using any of three communication schemes, namely direct scheme, E-mail scheme, and cloud scheme.

Figure 3:
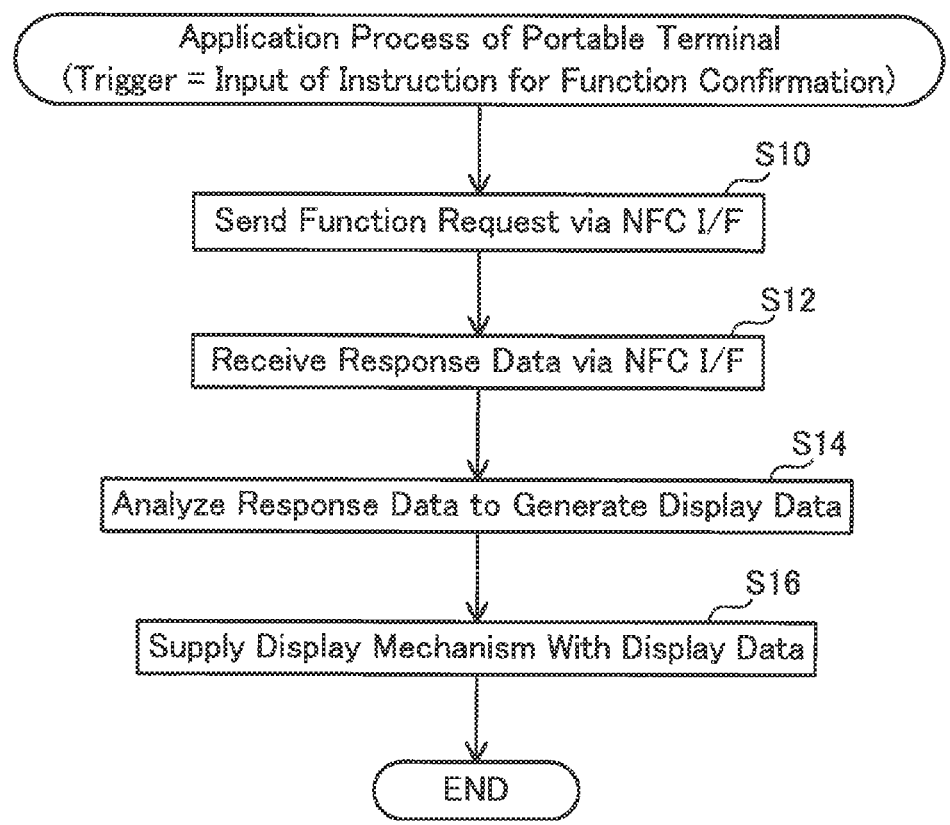
FIG. 3 shows a flowchart of an application process of a portable terminal of a first embodiment.

(Application Process of Portable Terminal 50; FIG. 3)

Next, the contents of a process realized by the MFP application installed on the portable terminal 50 will be described with reference to FIG. 3. In case of wanting to confirm which of the print functions DP, EP, and CP the MFP 10 is capable of executing, the user of the portable terminal 50 operates the operating key 52, activating the MFP application. Next, by operating the operating key 52, the user gives an instruction to the portable terminal 50 to confirm the print function. Next, in order to establish an NFC connection between the MFP 10 and the portable terminal 50, the user brings the portable terminal 50 closer to the MFP 10.

When the distance between the portable terminal 50 and the MFP 10 becomes less than a distance (e.g., 10 cm) across which NFC communication can be executed, an NFC connection is established between the MFP 10 and the portable terminal 50. In this case, in S10, the CPU 72 sends a function request to the MFP 10 via the NFC I/F 62 by using the above NFC connection. The function request is a request to cause response data (to be described) to be sent to the MFP 10 (see S70, S72 of FIG. 4).

In S12, the CPU 72 receives the response data from the MFP 10 via the NFC I/F 62 by using the above NFC connection. In a case where the MFP 10 is capable of executing DP, the response data includes information indicating DP OK, and in a case where the MFP is not capable of executing DP, the response data includes information indicating DP NG. In a case where the MFP 10 is capable of executing EP, the response data includes information indicating EP OK, and in a case where the MFP is not capable of executing EP, the response data includes information indicating EP NG. In a case where the MFP 10 is capable of executing CP, the response data includes information indicating CP OK and in a case where the MFP is not capable of executing CP, the response data includes information indicating CP NG.

In S14, the CPU 72 analyzes the response data, and specifies OK or NG for each of DP, EP, and CP. The MFP application includes template data for generating display data. The template data has a data format which can be interpreted by the display mechanism 54. In a case where DP OK is specified, the CPU 72 writes characters indicating "direct print" in the template data and, in a case where DP NG is specified, does not write the characters indicating "direct print" in the template data. Similarly, in a case where EP OK (or CP OK) is specified, the CPU 72 writes characters indicating "E-mail print (or cloud print)" in the template data and, in a case where EP NG (or CP NG) is specified, does not write the characters indicating "E-mail print (or cloud print)" in the template data. When the aforementioned characters have been written in the template data, the display data is completed.

Next, in S16, the CPU 72 supplies the display data to the display mechanism 54. Consequently, the display mechanism 54 displays an image represented by the display data. The image includes characters indicating the print function which the MFP 10 is capable of executing (e.g., "direct print"), and does not include characters indicating the print function which the MFP 10 is not capable of executing (e.g., "E-mail print"). That is, the print functions which the MFP 10 is capable of executing are displayed by the display mechanism 54 in a state distinct from the print functions which the MFP 10 is not capable of executing. In other words, a communication scheme which the MFP 10 is capable of using to receive print data is displayed by the display mechanism 54 in a state distinct from a communication scheme which the MFP 10 is not capable of using to receive print data. By looking at the image displayed by the display mechanism 54, the user can learn the print function which the MFP 10 is capable of executing, i.e., the communication scheme which the MFP 10 is capable of using to receive print data.

Figure 4:
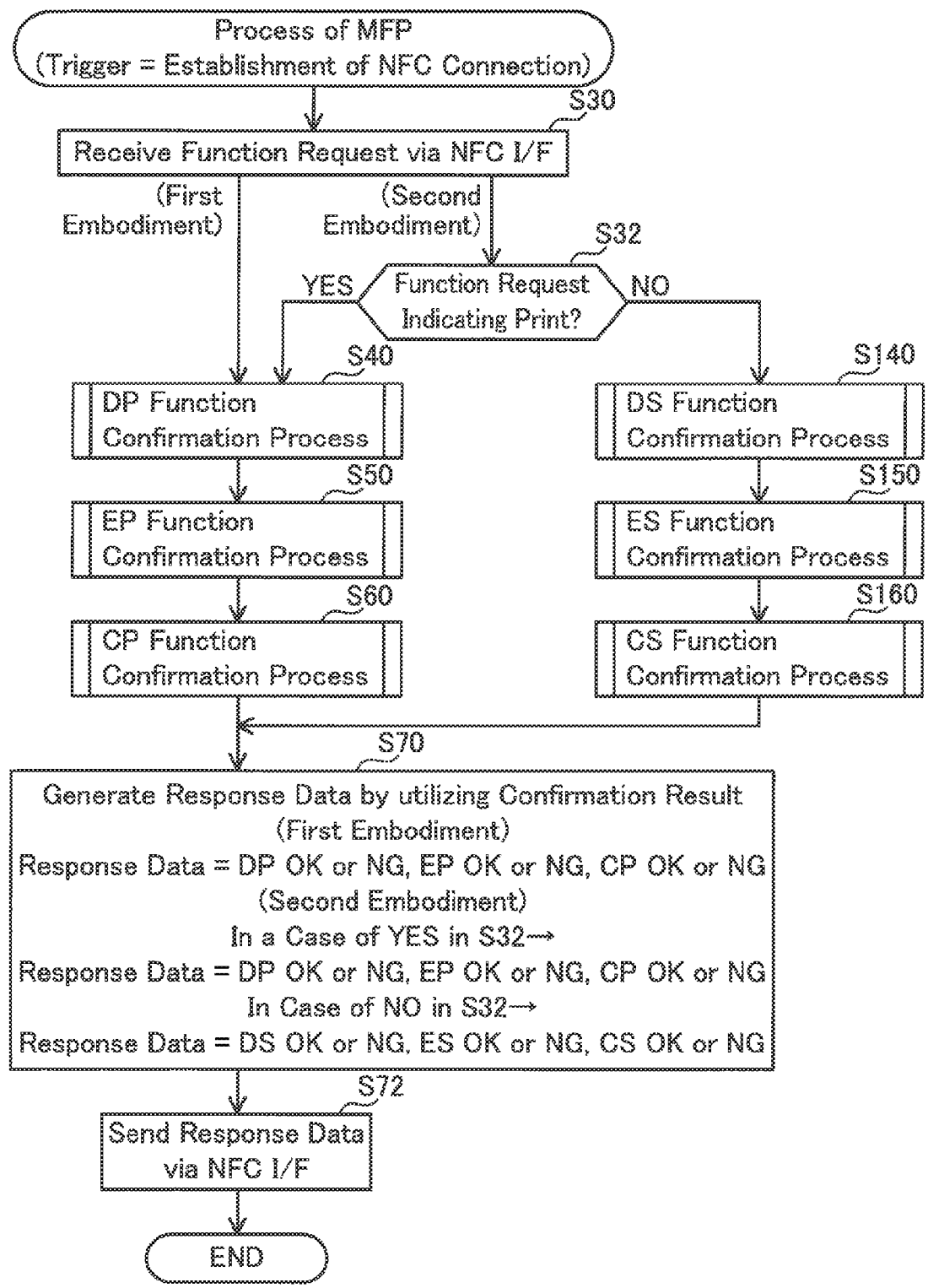
FIG. 4 shows a flowchart of a process of the MFP of first and second embodiments.

(Process of MFP 10; FIG. 4)

Next, contents of a process executed by the MFP 10 will be described with reference to FIG. 4. A process of FIG. 4 is started with establishment of an NFC connection between the MFP 10 and the portable terminal 50 as a trigger.

In S30, the CPU 32 receives a function request from the portable terminal 50 via the NFC I/F 22 (see S10 of FIG. 3). Next, in S40, S50, S60, the CPU 32 executes a DP function confirmation process (see FIG. 5), an EP function confirmation process (see FIG. 6), and a CP function confirmation process (see FIG. 7). In these processes, the CPU 32 specifies the print function, among DP, EP, and CP, which the MFP 10 is capable of executing. These processes will be described in detail later.

Next, in S70, the CPU 32 generates response data by using a confirmation result of S40 to S60. As will be described in detail later, in S40, information indicating OK or NG is stored in the memory 34 for each of normal Wi-Fi print, WFD print, and BT print. In S70, in a case where information indicating OK is being stored in the memory 34 for at least one of normal Wi-Fi print, WFD print, and BT print, the CPU 32 generates response data which includes information indicating DP OK.

Further, in a case where information indicating NO for all of normal Wi-Fi print, WFD print, and BT print is being stored in the memory 34, the CPU 32 generates response data which includes information indicating DP NO.

Further, as will be described in detail later, in S50, information indicating EP OK or EP NG is stored in the memory 34, and in S60, information indicating CP OK or CP NG is stored in the memory 34. In S70, in a case where information indicating EP OK (or CP OK) is being stored in the memory 34, the CPU 32 generates response data which includes information indicating EP OK (or CP OK) and, in a case where information indicating EP NG (or CP NG) is being stored in the memory 34, the CPU 32 generates response data which includes information indicating EP NG (or CP NG).

In S72, the CPU 32 sends the response data to the portable terminal 50 via the NFC I/F 22. According to this, by using the response data, the portable terminal 50 can cause the display mechanism 54 to display an image indicating the print function which the MFP 10 is capable of using (see S12 to S16 of FIG. 3). Moreover, the NFC connection used in the process of S72 is the NFC connection which became the starting of the process of S30 as the trigger.

Figure 5:
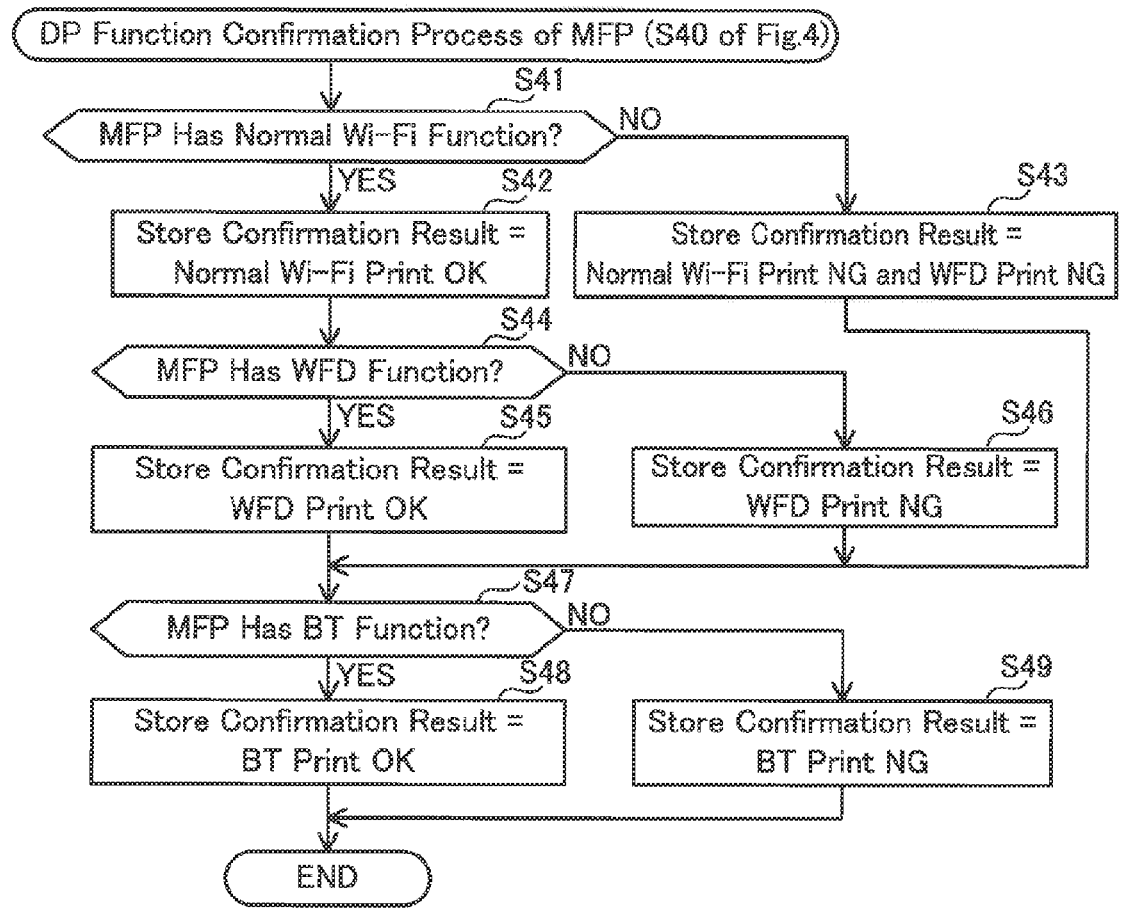
FIG. 5 shows a flowchart of a DP function confirmation process.

(DP Function Confirmation Process; FIG. 5)

The DP function confirmation process of S40 of FIG. 4 will be described with reference to FIG. 5. In S41, the CPU 32 determines whether the MFP 10 has the normal Wi-Fi function (i.e., whether the MFP 10 is comprising the wireless LAN I/F 20). In a case where the MFP 10 has the normal Wi-Fi function, the CPU 32 determines YES in S41 and, in S42, stores information indicating normal Wi-Fi print OK in the memory 34. Upon ending S42, processing proceeds to S44.

On the other hand, in a case where the MFP 10 does not have the normal Wi-Fi function, the CPU 32 determines NO in S41 and, in S43, stores information indicating normal Wi-Fi print NG, and information indicating WFD print NG in the memory 34. Wireless communication of the WFD scheme is a wireless communication having wireless communication of the normal Wi-Fi scheme as a prerequisite. Consequently, in the case where the MFP 10 does not have the normal Wi-Fi function (the case of NO in S41), the MFP 10 does not have the WFD function either (i.e., a program for executing a WFD communication is not being stored in the memory 34). Consequently, in S43, not only information indicating normal Wi-Fi print NG, but also information indicating WFD print NG is stored in the memory 34. Upon ending S43, processing proceeds to S47.

In S44, the CPU 32 determines whether the MFP 10 has the WFD function (i.e., whether a program for executing WFD communication is being stored in the memory 34). In a case where the MFP 10 has the WFD function, the CPU 32 determines YES in S44 and, in S45, stores information indicating WFD print OK in the memory 34. On the other hand, in a case where the MFP 10 does not have the WFD function, the CPU 32 determines NO in S44 and, in S46, stores information indicating WFD print NG in the memory 34. Upon ending S45 or S46, processing proceeds to S47.

In S47, the CPU 32 determines whether the MFP 10 has the BT function (i.e., whether the MFP 10 is comprising the BT I/F 24). In a case where the MFP 10 has the BT function, the CPU 32 determines YES in S47 and, in S48, stores information indicating BT print OK in the memory 34. On the other hand, in a case where the MFP 10 does not have the BT function, the CPU 32 determines NO in S47 and, in S49, stores information indicating BT print NG in the memory 34.

Figure 6:
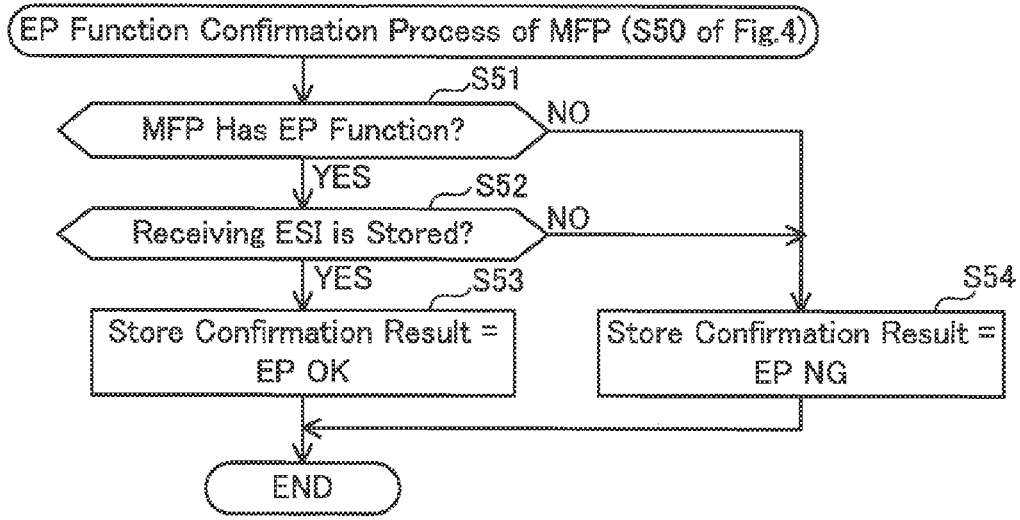
FIG. 6 shows a flowchart of an EP function confirmation process.

(EP Function Confirmation Process; FIG. 6)

The EP function confirmation process of S50 of FIG. 4 will be described with reference to FIG. 6. In S51, the CPU 32 determines whether the MFP 10 has the EP function (i.e., whether a program for receiving E-mail, and for executing printing in accordance with print data included in the E-mail, is being stored in the memory 34). In a case where the MFP 10 has the EP function, the CPU 32 determines YES in S51, and proceeds to S52. On the other hand, in a case where the MFP 10 does not have the EP function, the CPU 32 determines NO in S51 and, in 854, stores information indicating EP NG in the memory 34.

In S52, the CPU 32 determines whether the receiving ESI (i.e., the POP setting information), which is the ESI for the MFP 10 to receive E-mail, is being stored in the memory 34. In a case where the receiving ESI is being stored in the memory 34, the CPU 32 determines YES in S52 and, in S53, stores information indicating EP OK in the memory 34. On the other hand, in a case where the receiving ESI is not being stored in the memory 34, the CPU 32 determines NO in S52 and, in S54, stores information indicating EP NG in the memory 34.

Figure 7:
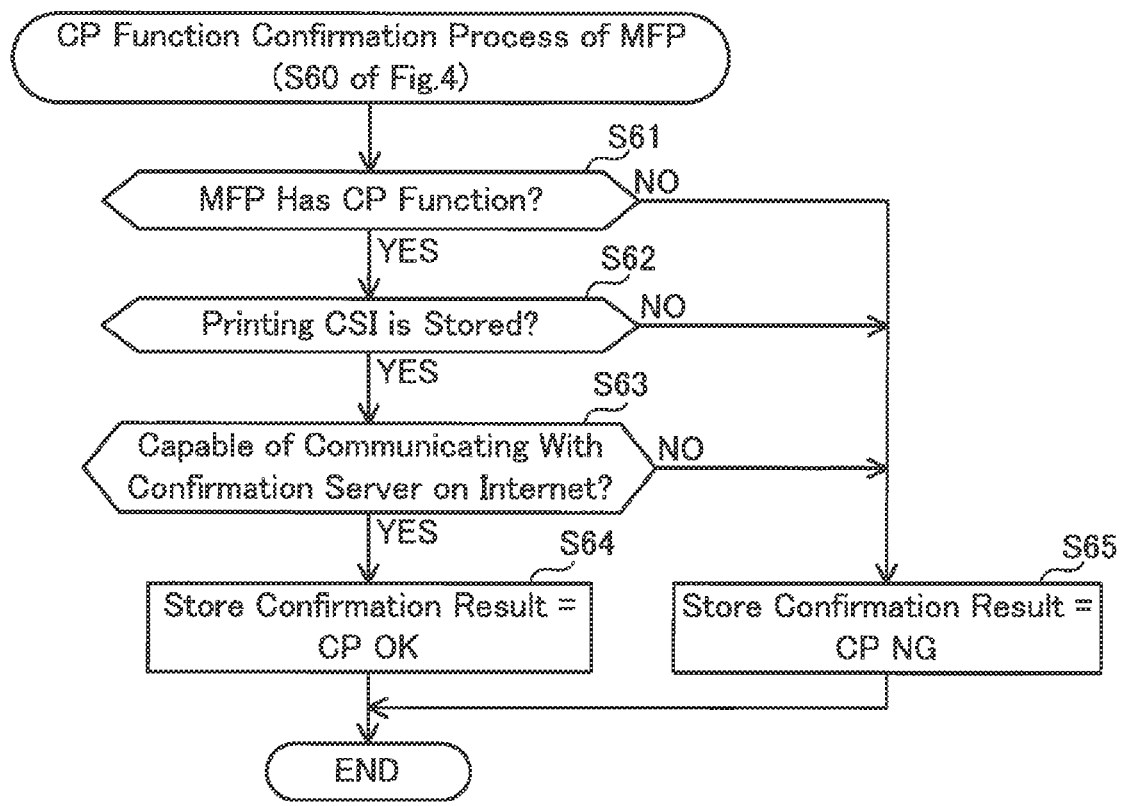
FIG. 7 shows a flowchart of a CP function confirmation process.

(CP Function Confirmation Process; FIG. 7)

The CP function confirmation process of S60 of FIG. 4 will be described with reference to FIG. 7. In S61, the CPU 32 determines whether the MFP 10 has the CP function (i.e., whether the print CL server 140 and a program for executing cloud communication are being stored in the memory 34). In a case where the MFP 10 has the CP function, the CPU 32 determines YES in S61, and proceeds to S62. On the other hand, in a case where the MFP 10 does not have the CP function, the CPU 32 determines NO in S61 and, in S65, stores information indicating CP NG in the memory 34.

In S62, the CPU 32 determines whether the printing CSI (i.e., a URL of the print CL server 140, account information, authentication information, etc.), which is the CSI for the MFP 10 to use the print CL server 140, is being stored in the memory 34. In a case where the printing CSI is being stored in the memory 34, the CPU 32 determines YES in S62, and proceeds to S63. On the other hand, in a case where the printing CSI is not being stored in the memory 34, the CPU 32 determines NO in S62 and, in S65, stores information indicating CP NG in the memory 34.

In S63, the CPU 32 determines whether the MFP 10 is capable of communicating with the confirmation server 130 on the Internet. Specifically, the CPU 32 sends a signal with a URL of the confirmation server 130 stored in advance in the memory 34 as a destination, and monitors whether a response signal is received from the confirmation server 130. In a case where the response signal is received from the confirmation server 130, the CPU 32 determines YES in S63 and, in S64, stores information indicating CP OK in the memory 34. On the other hand, in a case where a response signal is not received from the confirmation server 130, the CPU 32 determines NO in S63 and, in S65, stores information indicating CP NG in the memory 34. Moreover, NO may be determined in S63, e.g., in a case where a contract for Internet communication has not been made with a provider, in a case where a gateway for Internet communication is not functioning, etc.

(Specific Cases; FIG. 8)

Specific cases of the present embodiment will be described with reference to FIG. 8. Moreover, in FIG. 8, reference numbers different from the MFP 10 of FIG. 1 have been assigned, such as MFP 10A, 10B. If there are differences between the MFP of these cases (the MFP 10A, etc.) and the MFP 10 of FIG. 1, these differences will be described before the contents of each case are described.

(Case A; FIG. 8)

In case A, the MFP 10A is capable of executing all of normal Wi-Fi print, WFD print, BT print, EP, and CP. After giving an instruction for confirmation of the print function to the portable terminal 50, the user of the portable terminal 50 brings the portable terminal 50 closer to the MFP 10A. Consequently, an NFC connection between the portable terminal 50 and the MFP 10A is established. The portable terminal 50 sends a function request to the MFP 10A by using the NFC connection (S10 of FIG. 3).

Upon receiving the function request from the portable terminal 50 (830 of FIG. 4), the MFP 10A executes the confirmation processes (S40, S50, S60 of FIG. 4), and then generates response data that includes information indicating DP OK, information indicating EP OK, and information indicating CP OK (S70 of FIG. 4). The MFP 10A sends the response data to the portable terminal 50 by using the NFC connection (S72 of FIG. 4).

The portable terminal 50 receives the response data from the MFP 10A by using the NFC connection. At this juncture, the portable terminal 50 outputs an alarm sound indicating that the NFC communication has ended. According to this, the user can learn that the portable terminal 50 may be taken away from the MFP 10A, and the portable terminal 50 is taken away from the MFP 10A. Consequently, the NFC connection is disconnected.

The portable terminal 50 analyzes the response data, and generates display data (S14 of FIG. 3). Then, the portable terminal 50 causes the display mechanism 54 to display an image represented by the display data (S16 of FIG. 3). In the present case, an image is displayed that includes the characters indicating "direct print", the characters indicating "E-mail print", and the characters indicating "cloud print". According to this, the user can learn that the MFP 10A is capable of executing all the print functions DP, EP, and CP. That is, the user can learn that the MFP 10A is capable of using all the communication schemes to receive print data, i.e., direct scheme, E-mail scheme, and cloud scheme. According to this, in case of wanting to cause the MFP 10A to execute printing by using e.g., the portable terminal 50, the PC 110, etc., the user can appropriately select a communication scheme that the MFP 10A is capable of using. Thus, according to the present embodiment, user convenience is increased.

(Case B)

In case B, the MFP 10B is a device different from the MFP 10A, and is capable of executing normal Wi-Fi print and EP, but is not capable of executing WFD print, BT print, and CP. Processes until the MFP 10B receives the function request are the same as case A.

The MFP 10B generates response data which includes information indicating DP OK, information indicating EP OK, and information indicating CP NG (S70 of FIG. 4), and sends the response data to the portable terminal 50 by using the NFC connection (S72 of FIG. 4). Moreover, since the MFP 10B is not capable of executing WFD print and BT print, but is capable of executing normal Wi-Fi print, the response data includes information indicating DP OK.

As in case A, the portable terminal 50 generates display data (S14 of FIG. 3), and causes the display mechanism 54 to display an image (S16 of FIG. 3). In case B, an image is displayed that includes the characters indicating "direct print", and the characters indicating "E-mail print". The image does not include the characters indicating "cloud print".

Since the communication schemes that the MFP 10B of case B is capable of using are different from the communication schemes that the MFP 10A of case A is capable of using, the image displayed in case A and the image displayed in case B are different. Thus, the user can learn, for the plurality of MFPs 10A, 10B, the communication scheme that the MFP is capable of using.

(Corresponding Relationships)

In the case of FIG. 8, the portable terminal 50, the MFP 10A and the MFP 10B are respectively examples of the "terminal apparatus", the "first function executing apparatus", and the "second function executing apparatus". In case A, the three communication schemes DP, EP, and CP are an example of the "plurality of communication schemes" and the "M1 items of communication schemes". In case B, the three communication schemes DP, EP, and CP are an example of the "plurality of communication schemes", and DP and EP are an example of the "M2 items of communication schemes". The image displayed in case A, and the image displayed in case B are respectively examples of the "first image" and the "fourth image".

The response data of case A, and the response data of case B are respectively examples of the "first information" and the "second information". CP, the printing CSI, and the confirmation server 130 are respectively examples of the "first communication scheme", the "first communication setting information", and the "server". The information included in the response data of case A (i.e., DP OK, EP OK, CP OK) is an example of the "first data". Further, in case A of FIG. 8, if the printing CSI is not being stored in the MFP 10A (NO in S62 of FIG. 7), the response data indicates DP OK, EP OK, and CP NG. Further, in case A of FIG. 8, if the MFP 10A is not capable of communicating with the confirmation server 130 (NO in S63 of FIG. 7), the response data indicates DP OK, EP OK, and CP NG. The information (i.e., DP OK, EP OK, CP NG) included in the response data in these cases is an example of the "second data".

The process of S12 of FIG. 3 is an example of the "receiving first information". The processes of S14 and S16 are an example of the "causing a display mechanism of the terminal apparatus to display a first image". The processes of S40, S50, and S60 of FIG. 4 are an example of the "specifying". The processes of S70 and S72 are an example of the "sending first information".

(Second Embodiment)

Points different from the first embodiment will be described. In the first embodiment, the portable terminal 50 can cause the image indicating the print function which the MFP 10 is capable of executing (i.e., the communication scheme which the MFP 10 is capable of using to receive print data) to be displayed. In the present embodiment, the portable terminal 50, further, can cause an image indicating scan functions which the MFP 10 is capable of executing (i.e., communication schemes which the MFP 10 is capable of using for sending scan data) to be displayed.

Figure 9:
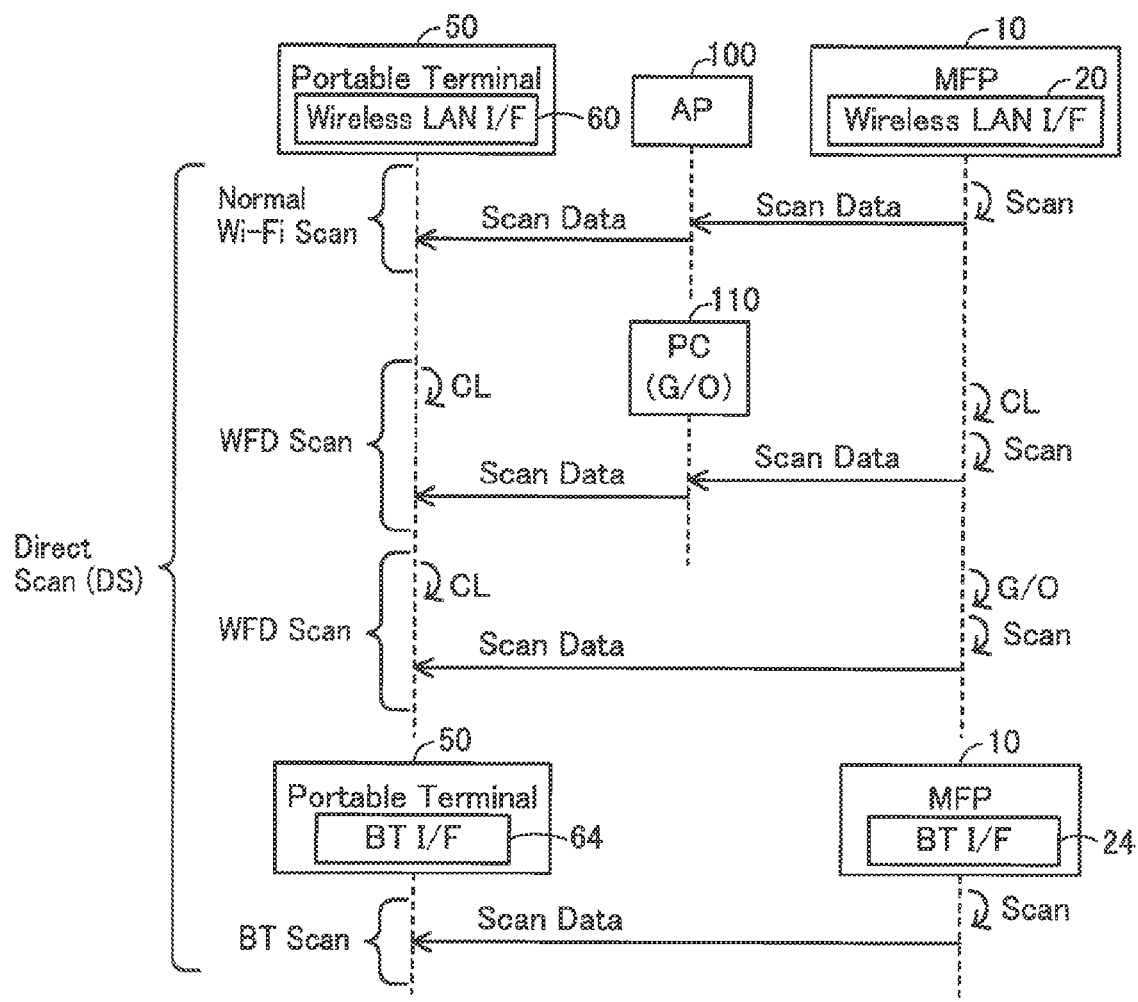
FIG. 9 shows a view for describing a scan function which the MFP is capable of executing.
Figure 10:
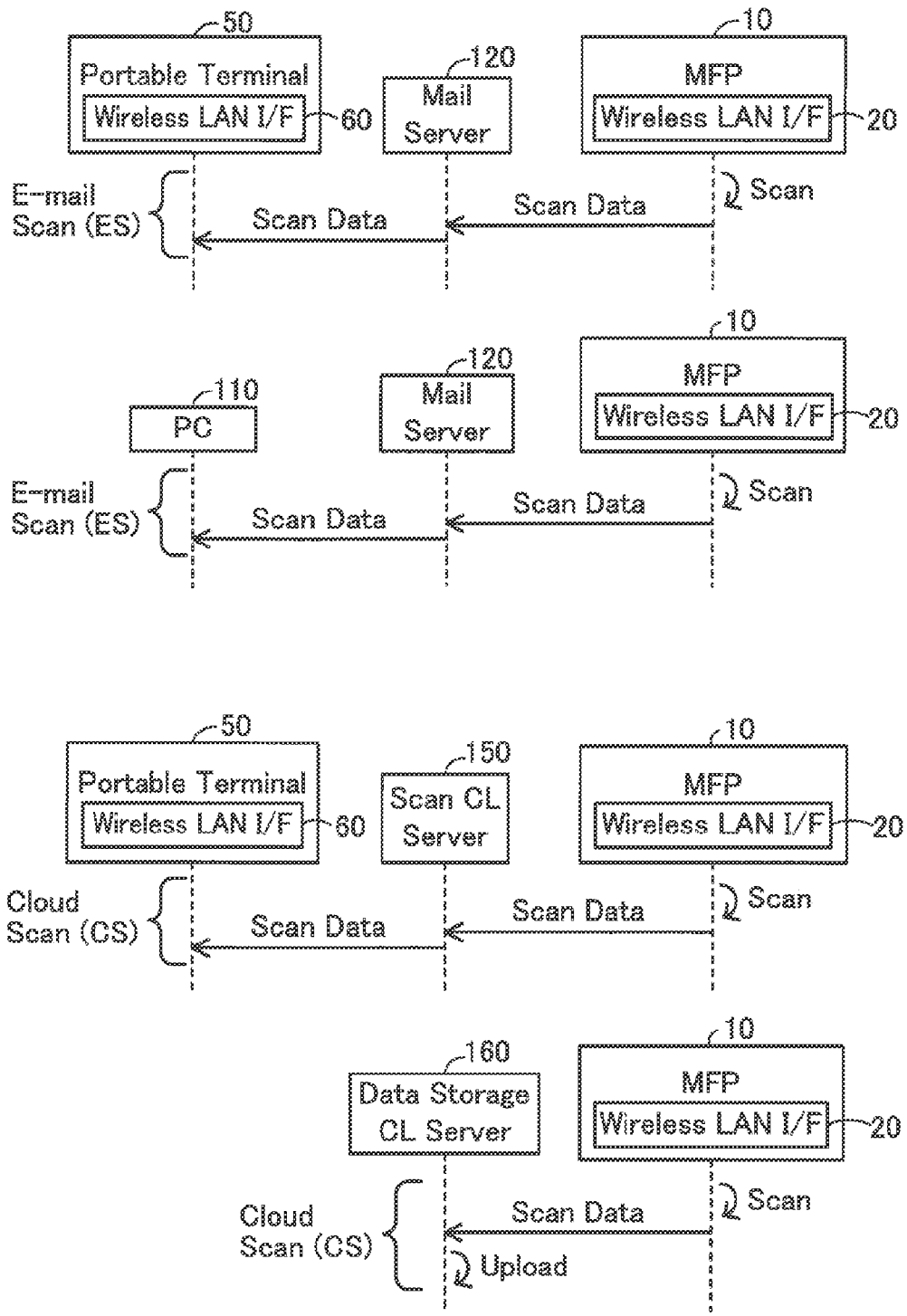
FIG. 10 shows a view for describing a scan function which the MFP is capable of executing.

(Scan Function which MFP 10 is Capable of Executing; FIGS. 9, 10)

Scan functions which the MFP 10 is capable of executing will be described with reference to FIG. 9 and FIG. 10. The scan functions are classified into direct scan (called "DS" below), E-mail scan (called "ES" below), and cloud scan (called "CS" below).

(DS)

In DS, the sending of scan data from the MFP 10 to the portable terminal 50 can be executed not via the Internet. DS is classified into normal Wi-Fi scan, WFD scan, and BT scan.

(Normal Wi-Fi Scan)

In normal Wi-Fi scan, a communication of scan data is executed by using a normal Wi-Fi NW. FIG. 9 shows a normal Wi-Fi NW that includes the MFP 10, the portable terminal 50, and the AP 100. In a state where this type of normal Wi-Fi NW has been formed, the wireless LAN I/F 20 of the MFP 10 can send scan data to the portable terminal 50 via the AP 100 by using the normal Wi-Fi NW. Moreover, in the normal Wi-Fi scan, the MFP 10 and the wireless LAN I/F 60 of the portable terminal 50 execute the communication of scan data by using, e.g., an FTP (abbreviation of File Transfer Protocol) communication protocol.

(WFD Scan)

In WFD scan, the communication of scan data is executed by using the WFD NW. FIG. 9 shows an example of a WFD NW in which the PC 110 is a G/O device and the portable terminal 50 and the MFP 10 are CL devices. In a state where this type of WFD NW has been formed, the wireless LAN I/F 20 of the MFP 10, which is a CL device, can use the WFD NW to send scan data via the PC 110, which is a G/O device, to the wireless LAN I/F 60 of the portable terminal 50, which is a CL device.

FIG. 9 further shows an example of a WFD NW in which the MFP 10 is a G/O device and the portable terminal 50 is a CL device. In a state where this type of WFD NW has been formed, the wireless LAN I/F 20 of the MFP 10, which is a G/O device, can use the WFD NW to send scan data not via another device to the wireless LAN I/F 60 of the portable terminal 50, which is a CL device. Moreover, in WFD scan, the MFP 10 and the portable terminal 50 execute the communication of scan data by using e.g., the FTP communication protocol.

(BT Scan)

In BT scan, the communication of scan data is executed by using a BT NW. FIG. 9 shows a BT NW that includes the MFP 10 and the portable terminal 50. In a state where this type of BT NW has been formed, the BT I/F 24 of the MFP 10 can send scan data to the BT I/F 64 of the portable terminal 50 not via another device by using the BT NW. Moreover, a communication protocol (e.g., BPP, etc.) used in BT scan is the same as the communication protocol used in BT print.

(ES)

In ES, the sending of scan data (i.e., E-mail communication) from the MFP 10 to another device (e.g., the portable terminal 50, the PC 110) is executed via the Internet. As shown in FIG. 10, the wireless LAN I/F 20 of the MFP 10 can send scan data to the wireless LAN I/F 60 of the portable terminal 50 via the mail server 120. In order to execute this type of ES, the MFP 10 stores at least the sending ESI (i.e., the SMTP setting information). Further, the portable terminal 50 stores at least the receiving ESI (i.e., the POP setting information). Further, as shown in FIG. 10, the wireless LAN I/F 20 of the MFP 10 can also send scan data to the PC 110 via the mail server 120. Moreover, in ES, as in the case of EP, the SMTP and POP communication protocols are used.

(CS)

In CS, the sending of scan data (i.e., cloud communication) from the MFP 10 to the portable terminal 50 is executed via the Internet. As shown in FIG. 10, the wireless LAN I/F 20 of the MFP 10 can send scan data to the wireless LAN I/F 60 of the portable terminal 50 via the scan CL server 150. In order to execute this type of cloud communication, the MFP 10 and the portable terminal 50 each store scanning CSI for communicating with the scan CL server 150. The scanning CSI includes a URL of the scan CL server 150, account information, authentication information (e.g., an access token), etc.

As shown in FIG. 10, the MFP 10 can further send scan data to the data storage CL server 160. According to this, the MFP 10 can upload scan data to the data storage CL server 160. In order to execute this type of cloud communication, the MFP 10 stores scanning CSI for communicating with the data storage CL server 160. The scanning CSI includes a URL of the data storage CL server 160, account information, authentication information, etc. Moreover, in CS, as in the case of CP, the HTTP communication protocol is used.

The DS, ES, CS are each a scan function which the MFP 10 is capable of executing. In other words, they each mean a communication scheme for the MFP 10 to send scan data. That is, DS, ES, CS mean communication schemes which are a direct scheme, an E-mail scheme and a cloud scheme respectively. That is, the MFP 10 can send scan data by using any of three communication schemes, namely direct scheme, E-mail scheme, and cloud scheme.

Figure 11:
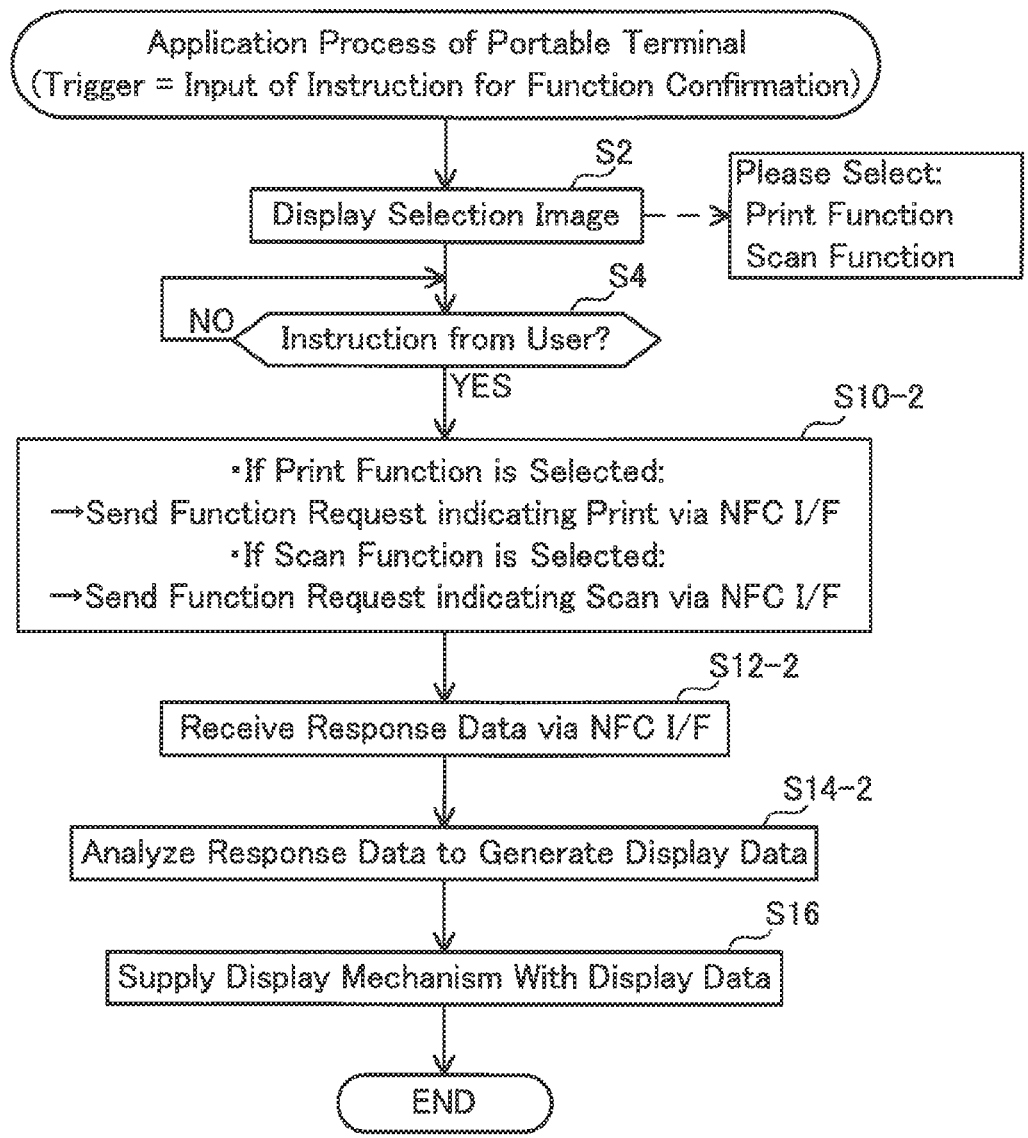
FIG. 11 shows a flowchart of an application process of a portable terminal of the second embodiment.

(Application Process of Portable Terminal 50; FIG. 11)

Next, the contents of a process realized by the MFP application of the present embodiment will be described with reference to FIG. 11. The user of the portable terminal 50 operates the operating key 52, activating the MFP application. In this case, in S2, the CPU 72 causes a selection image for selecting the print function or scan function to be displayed by the display mechanism 54.

Next, in S4, the CPU 72 monitors whether the print function or the scan function has been selected in a selection screen. The user can operate the operating key 52 to select the print function or the scan function. In other words, the CPU 72 can select the print function or the scan function by detecting the selection of the print function or the scan function by the user. In this case, the CPU 72 determines YES in S4, and proceeds to S10-2.

When the user brings the portable terminal 50 closer to the MFP 10, an NFC connection between the MFP 10 and the portable terminal 50 is established. In a case where the selection result of the user is the print function, in S10-2 the CPU 72 sends a function request indicating print to the MFP 10 via the NFC I/F 62. Further, in a case where the selection result of the user is the scan function, in S10-2 the CPU 72 sends a function request indicating scan to the MFP 10 via the NFC I/F 62.

In S12-2, the CPU 72 receives response data via the NFC I/F 62. In the case where the selection result of the user is the print function, the response data includes information relating to the print function (DP OK or NO, EP OK or NO, CP OK or NG), as in the response data received in S12 of FIG. 3. In the case where the selection result of the user is the scan function, the response data includes information relating to the scan function (DS OK or NG, ES OK or NG, CS OK or NG).

In the case where the selection result of the user is the print function, S14-2 is the same as S14 of FIG. 3. In the case where the selection result of the user is the scan function, in S14-2 the CPU 72 analyzes the response data and specifies OK or NG for each of DS, ES, and CS. In a case where DS OK is specified, the CPU 72 writes characters indicating "direct scan" in the template data, and in a case where DS NG is specified, the CPU 72 does not write the characters indicating "direct scan" in the template data. Similarly, in a case where ES OK (or CS OK) is specified, the CPU 72 writes characters indicating "E-mail scan (or cloud scan)" in the template data, and in a case where ES NG (or CS NG) is specified, the CPU 72 does not write the characters indicating "E-mail scan (or cloud scan)" in the template data. The above characters are not written in the template data. According to this, the display data is completed.

S16 is the same as S16 of FIG. 3. In the case where the selection result of the user is the scan function, a scan function which the MFP 10 is capable of executing is displayed by the display mechanism 54 in a state distinct from a scan function which the MFP 10 is not capable of executing. In other words, a communication scheme which the MFP 10 is capable of using to send scan data is displayed by the display mechanism 54 in a state distinct from a communication scheme which the MFP 10 is not capable of using to send scan data. By looking at the image displayed by the display mechanism 54, the user can learn the scan function which the MFP 10 is capable of executing, i.e., the communication scheme which the MFP 10 is capable of using to send scan data.

(Process of MFP 10; FIG. 4)

Contents of a process executed by the MFP 10 of the present embodiment will be described with reference to FIG. 4. In S30, the CPU 32 receives a function request indicating print or a function request indicating scan from the portable terminal 50 via the NFC I/F 22. In 832, the CPU 32 determines whether the function request indicating print was received or the function request indicating scan was received. In a case where the function request indicating print was received, the CPU 32 determines YES in S32, and proceeds to S40. In this case, the CPU 32 executes the processes of S40 to S72, as in the first embodiment. On the other hand, in a case where the function request indicating scan was received, the CPU 32 determines NO in S32, and proceeds to S140.

In S140, S150, S160, the CPU 32 executes a DS function confirmation process (see FIG. 12), an ES function confirmation process (see FIG. 13), and a CS function confirmation process (see FIG. 14). In these processes, the CPU 32 specifies which scan function the MFP 10 is capable of executing from among DS, ES, and CS. These processes will be described in detail later.

In the case where the function request indicating scan was received, in S70 the CPU 32 generates response data by using the confirmation results of S140, 5150, S160. The method of generating the response data is the same as the first embodiment, apart from the point that scan is substituted for print. That is, the CPU 32 generates response data that includes information indicating DS OK or NG, information indicating ES OK or NG, and information indicating CS OK or NG.

In S72, the CPU 32 sends the response data to the portable terminal 50 via the NFC I/F 22. In the case where the function request indicating scan was received, the response data includes information indicating the scan functions which the MFP 10 is capable of executing. According to this, by using the response data, the portable terminal 50 can cause the display mechanism 54 to display an image indicating the scan functions which the MFP 10 is capable of executing (see S12-2, S14-2, S16 of FIG. 11).

(DS Function Confirmation Process; FIG. 12)

The DS function confirmation process of S140 of FIG. 4 will be described with reference to FIG. 12. Determination processes of S141, S144, S147 are the same as those of S41, S44, S47 of FIG. 5. The processes of S142, S143, S145, S146, S148, S149 are the same as those of S42, S43, S45, S46, S48, S49 of FIG. 5, apart from the point that scan is substituted for print.

(ES Function Confirmation Process; FIG. 13)

The ES function confirmation process of S150 of FIG. 4 will be described with reference to FIG. 13. In S151, the CPU 32 determines whether the MFP 10 has the ES function (i.e., whether a program for sending an E-mail that includes scan data is being stored in the memory 34). In the case where the MFP 10 has the ES function, the CPU 32 determines YES in S151, and proceeds to S152. On the other hand, in the case where the MFP 10 does not have the ES function, the CPU 32 determines NO in S151, and proceeds to S154.

In S152, the CPU 32 determines whether sending ESI (i.e., the SMTP setting information), which is ESI for the MFP 10 to send E-mail, is being stored in the memory 34. In the case where the sending ESI is being stored in the memory 34, the CPU 32 determines YES in S152, and proceeds to S153. On the other hand, in the case where the sending ESI is not being stored in the memory 34, the CPU 32 determines NO in S152, and proceeds to S154. Processes of S153, S154 are the same as those of S53, S54 of FIG. 6, apart from the point that scan is substituted for print.

(CS Function Confirmation Process; FIG. 14)

The CS function confirmation process of S160 of FIG. 4 will be described with reference to FIG. 14. In S161, the CPU 32 determines whether the MFP 10 has the CS function (i.e., whether a program for executing cloud communication with the scan CL server 150 or the data storage CL server 160 is being stored in the memory 34). In the case where the MFP 10 has the CS function, the CPU 32 determines YES in S161, and proceeds to S162. On the other hand, in the case where the MFP 10 does not have the CS function, the CPU 32 determines NO in S161, and proceeds to S165.

In S162, the CPU 32 determines whether the scanning CSI (i.e., URL of the server 150 or 160, account information, authentication information, etc.), which is the CSI for the MFP 10 to use the scan CL server 150 or the data storage CL server 160, is being stored in the memory 34. In the case where the scanning CSI is being stored in the memory 34, the CPU 32 determines YES in S162, and proceeds to S163. On the other hand, in the case where the scanning CSI is not being stored in the memory 34, the CPU 32 determines NO in S162, and proceeds to S165. S163 is the same as S63 of FIG. 7. Processes of S164, S165 are the same as those of S64, S65 of FIG. 7, apart from the point that scan is substituted for print.

(Case C; FIG. 15)

A specific case realized by the processes of FIG. 4 and FIG. 11 will be described with reference to FIG. 15. In cases C and D, the MFP 10A is capable of executing all of normal Wi-Fi print, WFD print, BT print, EP, and CP. Further, the MFP 10A is capable of executing normal Wi-Fi scan, WFD scan, BT scan, but is not capable of executing ES and CS. For example, in a case where the receiving ESI and the printing CSI are being stored in the memory of the MFP 10A, but the sending ESI and the scanning CSI are not being stored in the memory of the MFP 10A, the MFP 10A is not capable of executing ES and CS despite being capable of executing EP and CP.

After having selected the print function in the selection image displayed by the MFP application, the user of the portable terminal 50 brings the portable terminal 50 closer to the MFP 10A. Consequently, an NFC connection between the portable terminal 50 and the MFP 10A is established. The portable terminal 50 sends a function request indicating print by using the NFC connection (S10-2 of FIG. 11).

Upon receiving the function request indicating print from the portable terminal 50 (S30, YES in S32 of FIG. 4), the MFP 10A executes the confirmation processes relating to print (S40, S50, 560 of FIG. 4), and then generates response data that includes information indicating DP OK, information indicating EP OK, and information indicating CP OK (S70 of FIG. 4). Subsequent processes are the same as case A of FIG. 8, and an image that includes the characters indicating "direct print", the characters indicating "E-mail print", and the characters indicating "cloud print" is displayed by the portable terminal 50.

(Case D)

After having selected the scan function in the selection image displayed by the MFP application, the user of the portable terminal 50 brings the portable terminal 50 closer to the MFP 10A. Consequently, an NFC connection between the portable terminal 50 and the MFP 10A is established. The portable terminal 50 sends a function request indicating scan by using the NFC connection (S10-2 of FIG. 11).

Upon receiving the function request indicating scan from the portable terminal 50 (S30, NO in S32 of FIG. 4), the MFP 10A executes the confirmation processes relating to scan (S140, S150, S160 of FIG. 4), and then generates response data that includes information indicating DS OK, information indicating ES NG, and information indicating CS NG (S70 of FIG. 4). Subsequent processes are the same as in the case of print (e.g., case C of FIG. 15, etc.), and an image that includes characters indicating "direct scan" is displayed by the portable terminal 50. The image does not include characters indicating "E-mail scan" and characters indicating "cloud scan".

The user can learn that the MFP 10A is capable of executing DS, and is not capable of executing ES and CS. That is, the user can learn that the MFP 10A is capable of using the direct scheme to receive scan data, and is not capable of using the E-mail scheme and cloud scheme. According to this, in case of, e.g., wanting to cause the MFP 10A to execute a scan, the user can appropriately select a communication scheme which the MFP 10 is capable of using. Thus, according to the present embodiment, user convenience is increased.

(Corresponding Relationships)

The function request indicating print and the function request indicating scan are respectively examples of the "first selection result" and the "second selection result". In case D of FIG. 15, DS is an example of the "N items of communication schemes", and the image displayed by the portable terminal 50 (i.e., the image that includes characters indicating "direct scan") is an example of the "particular image". S30 of FIG. 4 is an example of the "receiving a first" or "second selection result".

(Variant of Second Embodiment)

In the above second embodiment, the CPU 72 of the portable terminal 50 causes the display mechanism 54 to display the selection image for selecting the print function or the scan function (S2 of FIG. 11), sends the function request indicating the selection result to the MFP 10 (S10-2), and receives the response data corresponding to the selection result from the MFP 10 (S12-2). That is, the CPU 72 causes the display mechanism 54 to display the selection image before receiving the response data from the MFP 10.

Instead, the CPU 72 of the portable terminal 50 may send the function request to the MFP 10 before causing the display mechanism 54 to display the selection image (i.e., before the user selects the print function or the scan function). In this case, the CPU 32 of the MFP 10 may execute both the confirmation processes relating to print (S40 to 560 of FIG. 4) and the confirmation processes relating to scan (S140 to S160 of FIG. 4), and send response data including all the confirmation results thereof to the portable terminal 50.

The CPU 72 of the portable terminal 50 may cause the display mechanism 54 to display the selection image after having received the response data from the MFP 10. Then, in the case where the selection result of the user is the print function, the CPU 72 may cause the display mechanism 54 to display an image indicating the print function which the MFP 10 is capable of executing by using the information relating to print (DP OK or NG, etc.) included in the response data, without using the information relating to scan (DS OK or NG, etc.) included in the response data. Further, in the case where the selection result of the user is the scan function, the CPU 72 may cause the display mechanism 54 to display an image indicating the scan function which the MFP 10 is capable of executing by using the information relating to scan (DS OK or NG, etc.) included in the response data, without using the information relating to print (DP OK or NG, etc.) included in the response data.

As described above, the CPU 72 of the portable terminal 50 may cause the display mechanism 54 to display the selection image after having received the response data from the MFP 10, as in the present variant, or may cause the display mechanism 54 to display the selection image before receiving the response data from the MFP 10, as in the second embodiment. Moreover, in the second embodiment, it is sufficient for the MFP 10 to execute only one of the confirmation processes relating to print (S40 to S60 of FIG. 4) or the confirmation processes relating to scan (S140 to S160 of FIG. 4). Consequently, a processing load of the MFP 10 can be reduced.

Further, in the second embodiment, the CPU 72 of the portable terminal 50 causes the display mechanism 54 to display the selection image for selecting the print function or the scan function (S2 of FIG. 11). Instead, the CPU 72 of the portable terminal 50 may cause the display mechanism 54 to display an image indicating both the print function and the scan function which the MFP 10 is capable of executing, without causing the selection screen to be displayed.

That is, when the CPU 72 of the portable terminal 50 sends the function request to the MFP 10, the CPU 32 of the MFP 10 may execute both the confirmation process relating to print (S40 to S60 of FIG. 4) and the confirmation process relating to scan (S140 to S160 of FIG. 4), and send response data including all the confirmation results thereof to the portable terminal 50. After the response data has been received from the MFP 10, the CPU 72 of the portable terminal 50 may cause the display mechanism 54 to display an image indicating both the print function and the scan function which the MFP 10 is capable of executing by using the information relating to print (DP OK or NG) and the information relating to scan (DS OK or NG, etc.) included in the response data.

(Third Embodiment)

Points different from the first embodiment will be described. In the present embodiment, the portable terminal 50 sends print data to the MFP 10 in accordance with the communication scheme selected by the user after having caused an image to be displayed indicating a communication scheme that the MFP 10 is capable of using to receive print data.

(Application Process of Portable Terminal 50; FIG. 16)

Contents of a process realized by the MFP application of the present embodiment will be described with reference to FIG. 16. S10 to S16 are the same as S10 to S16 of FIG. 3. Moreover, after the process of S12 has been executed, a first NFC connection between the portable terminal 50 and the MFP 10 is disconnected.

By operating the operating key 52, the user can select one communication scheme from among the one or more communication schemes indicated in the image displayed in S16. In other words, by detecting an operation by the user, the CPU 72 can select one communication scheme from among the one or more communication schemes. Further, by operating the operating key 52, the user can select print target data (i.e., print data) from among the one or more data items (e.g., image file, document file, etc.) within the memory 74 of the portable terminal 50.

In S18, the CPU 72 monitors whether selection of the communication scheme and print data has been executed. In the case where the selection has been executed, the CPU 72 determines YES in S18, and proceeds to S20. The user brings the portable terminal 50 closer to the MFP 10 in order to establish a second NFC connection between the portable terminal 50 and the MFP 10. In S20, the CPU 72 sends a selection result of the user (i.e., DP, EP, or CP) to the MFP 10 via the NFC I/F 62 by using the second NFC connection.

Next, in S22, the CPU 72 receives destination information from the MFP 10 via the NFC I/F 62 by using the second NFC connection. The destination information indicates a destination for executing the sending of print data from the portable terminal 50 to the MFP 10, in accordance with the communication scheme corresponding to the selection result of the user. As will be described in detail later, in the case where the selection result of the user is EP, the destination information includes an E-mail address of the MFP 10 (see S89 of FIG. 18). Further, in the case where the selection result of the user is CP, the destination information includes the printing CSI (i.e., the URL of the print CL server 140, etc.) that is being stored in the memory 34 of the MFP 10 (see S90 of FIG. 18).

Further, in the case where the selection result of the user is DP, the destination information includes information relating to at least one WSI among the WSIs (i.e., the normal Wi-Fi WSI, the WFD WSI, and the BT WSI) that are being stored in the memory 34 of the MFP 10 (see S83, S85, S87 of FIG. 18). More specifically, in the case where the MFP 10 is capable of executing normal Wi-Fi print, the destination information includes the information (normal Wi-Fi SSID, normal Wi-Fi BSSID, and normal Wi-Fi IP address of the MFP 10) included in the normal Wi-Fi WSI of the MFP 10 (see S83 of FIG. 18). Further, in the case where the MFP 10 is capable of executing WFD print, the destination information includes the information (WFD SSID, WFD BSSID, and WFD IP address of the MFP 10) included in the WFD WSI of the MFP 10 (see S85 of FIG. 18). Moreover, in a case where the MFP 10 is a G/O device, the destination information further includes the password included in the WFD WSI of the MFP 10. However, in a case where the MFP 10 is a CL device, the destination information does not include the password included in the WFD WSI of the MFP 10. In the case where the MFP 10 is capable of executing BT print, the destination information includes the BT WSI (i.e., PIN code) of the MFP 10 (see S87 of FIG. 18).

Next, in S24, the CPU 72 sends print data to the MFP 10, by using the destination information, in accordance with the communication scheme corresponding to the selection result of the user. Specifically, e.g., in a case where the selection result of the user is EP, the CPU 72 generates an E-mail in which the mail address of the MFP 10 included in the destination information is designated as the destination address, and attaches the print data to the E-mail. Then, the CPU 72 sends the E-mail via the wireless LAN I/F 60, or via another I/F (e.g., a wired communication I/F (not shown) or an I/F (not shown) for connecting with a cellular network). Consequently, the portable terminal 50 can send the print data to the MFP 10 (see EP of FIG. 2) via the mail server 120 (i.e., via the Internet).

Further, e.g., in the case where the selection result of the user is CP, the CPU 72 connects to the print CL server 140 via the wireless LAN I/F 60 or the other I/F by using the printing CSI included in the destination information. Next, the CPU 72 generates a command in which the URL of the print CL server 140 included in the printing CSI is designated as the destination, and attaches the print data to the command. Then, the CPU 72 sends the command including the print data via the wireless LAN I/F 60 or the other I/F. Consequently, the portable terminal 50 can send the print data to the MFP 10 (see CP of FIG. 2) via the print CL server 140 (i.e., via the Internet).

Further, e.g., in the case where the selection result of the user is DP, the CPU 72 first determines whether the MFP 10 and the portable terminal 50 are belonging to the same NW by using the destination information. For example, in a case where a set of normal Wi-Fi SSID and normal Wi-Fi BSSID of the MFP 10 and a set of normal Wi-Fi SSID and normal Wi-Fi BSSID of the portable terminal 50 are identical, the CPU 72 determines that the MFP 10 and the portable terminal 50 are belonging to the same normal Wi-Fi NW. Further, e.g., in a case where a set of WFD SSID and WFD BSSID of the MFP 10 and a set of WFD SSID and WFD BSSID of the portable terminal 50 are identical, the CPU 72 determines that the MFP 10 and the portable terminal 50 are belonging to the same WFD NW. Further, e.g., in a case where a PIN code included in the BT WSI of the MFP 10 and a PIN code included in the BT WSI of the portable terminal 50 are identical, the CPU 72 determines that the MFP 10 and the portable terminal 50 are belonging to the same BT NW.

Moreover, in the present embodiment, the CPU 72 determines whether the MFP 10 and the portable terminal 50 are belonging to the same NW (the normal Wi-Fi NW or the WFD NW) by determining whether the sets of SSID and BSSID are identical. However, in a variant, the CPU 72 may determine whether the MFP 10 and the portable terminal 50 are belonging to the same NW by determining only whether the SSIDs are identical, or by determining only whether the BSSIDs are identical.

In a case where the CPU 72 determines that the MFP 10 and the portable terminal 50 are belonging to the same NW, the CPU 72 sends print data to the MFP 10 by using that same NW. For example, in a case where the same NW is a normal Wi-Fi NW, the CPU 72 sends the print data via the wireless LAN I/F 60 with, as the destination, the normal Wi-Fi IP address of the MFP 10 included in the destination information. According to this, the portable terminal 50 can send the print data to the MFP 10 via the AP 100 (see normal Wi-Fi print of FIG. 2).

Further, e.g., in a case where the same NW is a WFD NW, the CPU 72 sends the print data via the wireless LAN I/F 60 with, as the destination, the WFD IP address of the MFP 10 included in the destination information. According to this, the portable terminal 50 can send print data to the MFP 10 via the PC 110, which is a G/O device, or not via another device (see WFD print of FIG. 2).

Further, e.g., in a case where the same NW is a BT NW, the CPU 72 sends the print data via the BT I/F 64 by using the PIN code included in the BT WSI of the MFP 10 (i.e., the BT WSI of the portable terminal 50). According to this, the portable terminal 50 can send the print data to the MFP 10 not via another device (see BT print of FIG. 2).

As described above, in S24, in the case where the selection result of the user is DP, and the MFP 10 and the portable terminal 50 are belonging to the same NW, the portable terminal 50 sends the print data to the MFP 10 by prioritizing the same NW. According to this, the portable terminal 50 can quickly send the print data to the MFP 10 without needing to establish a wireless connection with the MFP 10.

Moreover, in a case where the MFP 10 and the portable terminal 50 are belonging to two or more same NWs, the CPU 72 prioritizes the NW having a faster communication speed. For example, in a case where the MFP 10 and the portable terminal 50 are belonging to the same WFD NW and to the same BT NW, the CPU 72 sends the print data to the MFP 10 by using the WFD NW.

Further, in a case where it is determined that the MFP 10 and the portable terminal 50 are not belonging to the same NW, the CPU 72 executes the following process. As described above, the destination information does not include the password used in the normal Wi-Fi NW to which the MFP 10 is belonging (see S83 of FIG. 18). Consequently, the CPU 72 cannot cause the portable terminal 50 to participate in the normal Wi-Fi NW.

The destination information can include the information (WFD SSID, WFD BSSID, password, and WFD IP address of the MFP 10) used in the WFD NW in which the MFP 10 is the G/O device (see S85 of FIG. 18). In this case, the CPU 72, establishes a wireless connection with the MFP 10, which is a G/O device, by using this information. According to this, the CPU 72 can cause the portable terminal 50 to participate, as a CL device, in the WFD NW in which the MFP 10 is the G/O device. Then, the CPU 72 sends the print data via the wireless LAN I/F 60 with, as the destination, the WFD IP address of the MFP 10 included in the destination information. According to this, the portable terminal 50, which is a CL device, can use the WFD NW to send the print data to the MFP 10, which is a G/O device, not via another device.

Further, the destination information can include the BT WSI (i.e., PIN code) of the MFP 10 (see S87 of FIG. 18). In this case, the CPU 72 establishes a wireless connection with the MFP 10 by using the BT WSI. Then, the CPU 72 sends the print data via the BT I/F 64 by using the PIN code. According to this, the portable terminal 50 can use the BT NW to send the print data to the MFP 10 not via another device.

Moreover, in a case where the destination information includes both the information used in the WFD NW in which the MFP 10 is the G/O device, and the BT WSI of the MFP 10, the CPU 72 prioritizes use of the WFD NW, which has the higher communication speed, and causes the portable terminal 50 to participate as a CL device in the WFD NW in which the MFP 10 is the G/O device.

(Process of MFP 10; FIG. 17)

Contents of a process executed by the MFP 10 will be described with reference to FIG. 17. S30 to S72 are the same as S30 to S72 of FIG. 4. In S74, the CPU 32 receives the selection result of the user (i.e., DP, EP, or CP) from the portable terminal 50 via the NFC I/F 22 (see S20 of FIG. 16). Next, in S80, the CPU 32 executes the preparing process of the destination information, preparing the destination information that is to be sent to the portable terminal 50. Contents of the preparing process of the destination information will be described in detail later.

In S94, the CPU 32 sends the destination information to the portable terminal 50 via the NFC I/F 22 (see S22 of FIG. 16). Next, in S96, the CPU 32 receives the print data from the portable terminal 50 (see S24 of FIG. 16). For example, in the case where the selection result of the user is EP, the CPU 32 receives E-mail including print data from the mail server 120 via the wireless LAN I/F 20 or another I/F (e.g., a wired communication I/F (not shown)). Consequently, the MFP 10 can receive print data from the portable terminal 50 via the mail server 120 (i.e., via the Internet). Further, e.g., in the case where the selection result of the user is CP, the CPU 32 receives the print data from the print CL server 140 via the wireless LAN I/F 20 or the other I/F. Consequently, the MFP 10 can receive print data from the portable terminal 50 via the print CL server 140 (i.e., via the Internet).

Further, e.g., in the case where the selection result of the user is DP, the CPU 32 receives the print data via the wireless LAN I/F 20 or the BT I/F 24 by using the normal Wi-Fi NW, the WFD NW, or the BT NW. Consequently, the portable terminal 50 can receive the print data from the MFP 10 via a LAN (i.e., not via the Internet).

In S98, the CPU 32 supplies the print data to the print mechanism 16. According to this, the print mechanism 16 prints an image represented by the print data onto a print medium. Due to being an image file or the like, print data has a comparatively large data size. The communication speed of an NFC communication via the NFC I/Fs 22, 62 is slower than the communication speed of a communication via another I/F (e.g., the wireless LAN I/Fs 20, 60). Consequently, if a configuration is adopted in which the communication of print data between the MFP 10 and the portable terminal 50 is executed by using an NFC communication, a long time is required for the communication of the print data. By contrast, in the present embodiment, the MFP 10 and the portable terminal 50 execute a communication of the print data by using a communication different from the NFC communication, and consequently can execute the communication of the print data rapidly.

(Preparing Process of Destination Information; FIG. 18)

Contents of a preparing process of the destination information of S80 of FIG. 17 will be described with reference to FIG. 18. In S81, the CPU 32 determines whether the selection result of the user is DP and, in the case where the selection result of the user is DP, determines YES in S81, and proceeds to S82. On the other hand, in the case where the selection result of the user is EP or CP, the CPU 32 determines NO in S81, and proceeds to S88.

In S82, the CPU 32 determines whether information indicating normal Wi-Fi print OK was stored in the memory 34 in S40 of FIG. 17 (see FIG. 5). In the case where information indicating normal Wi-Fi print OK is being stored in the memory 34, the CPU 32 determines YES in S82, and proceeds to S83. On the other hand, in the case where information indicating normal Wi-Fi print NG is being stored in the memory 34, the CPU 32 determines NO in S82, and proceeds to S86.

In S83, by specifying the information (normal Wi-Fi SSID, normal Wi-Fi BSSID, and normal Wi-Fi IP address of the MFP 10) included in the normal Wi-Fi WSI of the MFP 10 from the memory 34, the CPU 32 prepares this information as the destination information. In the present embodiment, a security policy has been adopted in the normal Wi-Fi NW whereby the AP 100 is authorized to cause another device to participate in the normal Wi-Fi NW, but a device (e.g., the MFP 10) different from the AP 100 is not authorized to cause another device to participate in the normal Wi-Fi NW. Consequently, in S83, the CPU 32 does not prepare a password included in the normal Wi-Fi WSI of the MFP 10 (i.e., does not send a password as the destination information). However, in a variant, the CPU 32 may prepare a password (i.e., may send a password as the destination information).

Next, in S84, the CPU 32 determines whether information indicating WFD print OK was stored in the memory 34 in S40 of FIG. 17 (see FIG. 5). In the case where information indicating WFD print OK is being stored in the memory 34, the CPU 32 determines YES in S84, and proceeds to S85. On the other hand, in the case where information indicating WFD print NG is being stored in the memory 34, the CPU 32 determines NO in S84, and proceeds to S86.

In S85, the CPU 32 executes the following processes in accordance with the current state of the MFP 10 (G/O state, CL state, or device state). In the case where the current state of the MFP 10 is the G/O state, by specifying the information included in the WFD WSI of the MFP 10 (WFD SSID, WFD BSSID, WFD IP address of the MFP 10, and password) from the memory 34, the CPU 32 prepares this information as the destination information. Further, in the case where the current state of the MFP 10 is the CL state, by specifying the information included in the WFD WSI of the MFP 10 (WFD SSID, WFD BSSID, and WFD IP address of the MFP 10) from the memory 34, the CPU 32 prepares this information as the destination information.

In the present embodiment, a security policy has been adopted in the WFD NW whereby the G/O device is authorized to cause another device to participate in the WFD NW, but a CL device is not authorized to cause another device to participate in the WFD NW. Consequently, the CPU 32 prepares a password in the case where the current state of the MFP 10 is the G/O state, but does not prepare a password in the case where the current state of the MFP 10 is the CL state (i.e., does not send a password as the destination information). However, in a variant, the CPU 32 may prepare a password (i.e., may send a password as the destination information) in the case where the current state of the MFP 10 is the CL state.

Further, in the case where the current state of the MFP 10 is the device state, the CPU 32 moves the state of the MFP 10 to the G/O state. Here, the CPU 32 spontaneously moves the state of the MFP 10 to the G/O state without executing G/O negotiation. Next, the CPU 32 further generates the WFD WSI of the MFP 10 (i.e., WFD SSID, WFD BSSID, authentication scheme, encryption scheme, password, and WFD IP address) within the memory 34. The CPU 32 further generates a management list, in which the MAC address of the CL device is to be described, within the memory 34. At this stage, no MAC address has been described in the management list. That is, the CPU 32 forms a WFD NW to which only the MFP 10, which is the G/O device, belongs. Then, by specifying the information (WFD SSID, WFD BSSID, WFD IP address of the MFP 10, and password) included in the WFD WSI of the MFP 10 from the memory 34, the CPU 32 prepares this information as the destination information.

In S86, the MFP 10 determines whether information indicating BT print OK was stored in the memory 34 in S40 of FIG. 17 (see FIG. 5). In the case where information indicating BT print OK is being stored in the memory 34, the CPU 32 determines YES in S86, and proceeds to S87. On the other hand, in the case where information indicating BT print NG is being stored in the memory 34, the CPU 32 determines NO in S86, and ends the preparing process of the destination information.

In S87, in a case where the MFP 10 is currently belonging to the BT NW (i.e., in a case where the MFP 10 has established a BT connection with another device) the CPU 32 prepares the BT WSI of the MFP 10 as the destination information by specifying the BT WSI of the MFP 10 from the memory 34. Further, in a case where the MFP 10 is not currently belonging to the BT NW, the CPU 32 generates a new BT WSI within the memory 34. Then, the CPU 32 prepares the BT WSI of the MFP 10 as the destination information by specifying the BT WSI of the MFP 10 from the memory 34.

In S88, the CPU 32 determines whether the selection result of the user is EP and, in a case where the selection result of the user is EP, determines YES in S88, and proceeds to S89. On the other hand, in a case where the selection result of the user is CP, the CPU 32 determines NO in S88, and proceeds to S90.

In S89, the CPU 32 prepares the E-mail address of the MFP 10 as the destination information by specifying the predetermined E-mail address of the MFP 10 from the memory 34. When S89 ends, the preparing process of the destination information ends.

In S90, the CPU 32 prepares the printing CSI as the destination information by specifying the printing CSI from the memory 34. When S90 ends, the preparing process of the destination information ends.

(Specific Case; FIG. 19)

A specific case realized by processes of FIG. 16 and FIG. 17 will be described with reference to FIG. 19. An MFP 10C is capable of executing normal Wi-Fi print, BT print, and EP, but is not capable of executing WFD print and CP. The MFP 10C and the portable terminal 50 are belonging to a normal Wi-Fi NW formed by the AP 100. In the normal Wi-Fi NW, "X1" is used as the SSID, and "Y1" is used as the BSSID.

In the present case, an image that includes the characters indicating "direct print" and the characters indicating "E-mail print" is displayed by the portable terminal 50. The user selects "direct print" from among "direct print" and "E-mail print" by operating the operating key 52 of the portable terminal 50 and, further, designates print data (YES in S18 of FIG. 16). The portable terminal 50 sends a selection result indicating DP to the MFP 10C by using the NFC communication (S20 of FIG. 16).

Upon receiving the selection result indicating DP (S74 of FIG. 17), the MFP 10C prepares the destination information (S80 of FIG. 17). Specifically, since information indicating normal Wi-Fi print OK is being stored in the memory 34 (YES in S82 of FIG. 18), the MFP 10C prepares, as the destination information, the information included in the normal Wi-Fi WSI of the MFP 10C (SSID "X1", BSSID "Y1", and an IP address "IP1" of the MFP 10C) (S83). Further, since information indicating BT print OK is being stored in the memory 34 (YES in S86), the MFP 10C prepares the BT WSI of the MFP 10C as the destination information (S87). The MFP 10C sends the destination information to the portable terminal 50 (S94 of FIG. 17).

Upon receiving the destination information from the MFP 10C (S22 of FIG. 16), the portable terminal 50 determines that the set SSID "X1" and BSSID "Y1" included in the destination information and the set SSID "X1" and BSSID "Y1" included in the normal Wi-Fi WSI of the portable terminal 50 are the same (i.e., the MFP 10C and the portable terminal 50 are belonging to the same normal Wi-Fi NW). Consequently, the portable terminal 50 prioritizes the normal Wi-Fi NW for sending the print data to the MFP 10C via the AP 100 (S24 of FIG. 16). According to this, the print process is executed in the MFP 10C (S98 of FIG. 17).

Moreover, "direct print" is selected by the user in the case of FIG. 19. However, if "E-mail print" is selected by the user (called "case 1" below), the portable terminal 50 sends a selection result indicating EP to the MFP 10C by using the NFC communication (S20 of FIG. 16). In this case, the MFP 10C sends destination information that includes an E-mail address of the MFP 10C to the portable terminal 50 (S94 of FIG. 17). Consequently, the portable terminal 50 sends an E-mail that includes the print data with the E-mail address of the MFP 10C as the destination (S24 of FIG. 16).

(Corresponding Relationships)

In the case of FIG. 19, DP is an example of the "particular communication scheme" and the "second communication scheme". Further, in case 1, EP is an example of the "particular communication scheme" and the "first communication scheme". The normal Wi-Fi NW formed by the AP 100 is an example of the "particular local area network". The "NFC I/F 62" and the "wireless LAN I/F 60" are respectively examples of the "first interface" and the "second interface". The process of S20, the process of S22, and the process of S24 of FIG. 16 are respectively examples of the "sending a selection result", the "receiving particular destination information", and the "sending particular print data". Further, the process of S74 and the process of S94 of FIG. 17 are respectively examples of the "receiving a particular selection result" and the "sending particular destination information".

(Variant of Third Embodiment)

Moreover, in a variant of FIG. 18, after having determined NO in S84 and after having prepared the information included in the WFD WSI of the MFP 10 as the destination information in S85, the CPU 32 ends the preparing process of the destination information without proceeding to S86, and may proceed to S86 only in a case of determining NO in S82. That is, in a case where at least the information included in the normal Wi-Fi WSI was prepared as the destination information, the CPU 32 may not prepare the BT WSI as the destination information and in a case where the information included in the normal Wi-Fi WSI cannot be prepared as the destination information, the CPU 32 may prepare the BT WSI as the destination information. According to this configuration, the destination information does not include both the information used in the WFD NW in which the MFP 10 is the G/O device, and the BT WSI of the MFP 10, and consequently it is not necessary to select which of the WFD NW and the BT NW is to be participated in when the CPU 72 of the portable terminal 50 is to execute S24 of the application process of FIG. 16.

(Fourth Embodiment)

Points different from the third embodiment will be described. In the present embodiment, also, the portable terminal 50 sends print data to the MFP 10 in accordance with the communication scheme selected by the user. In the third embodiment, two times NFC connections are established between the MFP 10 and the portable terminal 50. However, in the present embodiment, only one time of NFC connection is established between the MFP 10 and the portable terminal 50.

(Application Process of Portable Terminal 50; FIG. 20)

Contents of a process realized by an MFP application of the present embodiment will be described with reference to FIG. 20. S10, S14, S16, S18 are the same as S10, S14, S16, S18 of FIG. 16. In S12-4, the CPU 72 receives response data including destination information from the MFP 10 via the NFC I/F 62.

As described above, in the third embodiment, in S22 of FIG. 16, only one item of destination information corresponding to the print function (i.e., DP, EP, or CP) indicated by the selection result of the user is received. For example, in a case where the selection result of the user is EP, only the destination information corresponding to EP (i.e., E-mail address) is received, and destination information corresponding to DP (i.e., the normal Wi-Fi WSI, etc.) and destination information corresponding to CP (i.e., the printing CSI) are not received.

By contrast, in the present embodiment, the response data received in S12-4 includes all the one or more items of destination information corresponding to the one or more print functions (DP, EP, CP) which the MFP 10 is capable of executing. For example, in a case where the MFP 10 is DP OK, EP OK, and CP OK, the following three items of destination information are received: the destination information corresponding to DP (i.e., normal Wi-Fi WSI, etc.), the destination information corresponding to EP (i.e., E-mail address), and the destination information corresponding to CP (i.e., printing CSI). In S24, the CPU 72 sends the print data to the MFP 10 by using the destination information which, from among the one or more items of destination information received in S12-4, corresponds to the selection result of the user.

For example, in S12-4, a situation is assumed in which all three items of the destination information are received. In a case where the selection result of the user is EP, the CPU 72 sends an E-mail which includes the print data by using the destination information which, from among the three items of destination information, corresponds to EP (i.e., the E-mail address). Further, in a case where the selection result of the user is CP, the CPU 72 sends the print data to the print CL server 140 by using the destination information which, from among the three items of destination information, corresponds to CP (i.e., the printing CSI). Further, in a case where the selection result of the user is DP, the CPU 72 sends the print data to the MFP 10 by using the destination information which, from among the three items of destination information, corresponds to DP (i.e., the normal Wi-Fi WSI, etc.). Moreover, the point of prioritizing a NW to which both the MFP 10 and the portable terminal 50 are belonging in a case where the selection result of the user is DP, is the same as in the third embodiment.

As described above, in the present embodiment, since the portable terminal 50 can receive the response data including the destination information from the MFP 10 in the first time of NFC connection, the portable terminal 50 can send the print data to the MFP 10 by using the destination information. Consequently, a second time of NFC connection, as in the third embodiment, does not need to be established. Consequently, the sending of print data from the portable terminal 50 to the MFP 10 can be executed rapidly.

(Process of MFP 10; FIG. 21)

Contents of a process executed by the MFP 10 will be described with reference to FIG. 21. S30 to S60 are the same as S30 to S60 of FIG. 17. In S180, the CPU 32 executes a preparing process of the destination information. Contents of the preparing process of the destination information will be described in detail later. Next, in S70-4, the CPU 32 generates response data that includes the destination information prepared in S180. S72, S96, S98 are the same as S72, S96, S98 of FIG. 17.

(Preparing Process of Destination Information; FIG. 22)

Contents of the preparing process of the destination information of S180 of FIG. 21 will be described with reference to FIG. 22. S182 to S187 are the same as S82 to 87 of FIG. 18. In S188, the CPU 32 determines whether information indicating EP OK was stored in the memory 34 in S50 of FIG. 21 (see FIG. 6). In a case where information indicating EP OK is being stored in the memory 34, the CPU 32 determines YES in S188, and proceeds to S189, and in a case where information indicating EP NG is being stored in the memory 34, the CPU 32 determines NO in S188, and proceeds to S190. S189 is the same as S89 of FIG. 18.

In S190, the CPU 32 determines whether information indicating CP OK was stored in the memory 34 in S60 of FIG. 21 (see FIG. 7). In a case where information indicating CP OK is being stored in the memory 34, the CPU 32 determines YES in S190, and proceeds to S191, and in a case where information indicating CP NG is being stored in the memory 34, the CPU 32 determines NO in S190, and ends the preparing process of the destination information. S191 is the same as S90 of FIG. 18.

In the preparing process of the destination information of FIG. 22, all the one or more items of destination information corresponding to the one or more print functions (DP, EP, CP) which the MFP 10 is capable of executing are prepared. For example, in a case where the MFP 10 is DP OK, EP OK, and CP OK, the following three items of destination information are prepared: the destination information corresponding to DP (S183, S185, S187), the destination information corresponding to EP (S189), and the destination information corresponding to CP (S191).

(Specific Case; FIG. 23)

A specific case realized by the processes of FIG. 20 and FIG. 21 will be described with reference to FIG. 23. An MFP 10D is capable of executing normal Wi-Fi print, BT print, and EP, but is not capable of executing WFD print and CP. Further, the MFP 10D and the portable terminal 50 belong to a normal Wi-Fi NW (SSID "X1", BSSID "Y1") formed by the AP 100.

In the present case, the response data sent from the MFP 10D to the portable terminal 50 includes not only information indicating DP OK, information indicating EP OK, and information indicating CP NG, but also the destination information corresponding to DP (i.e., "X1, Y1, IP1", "BT WSI"), and the destination information corresponding to EP (i.e., mail address "1" of the MFP 10) (S180, S70-4, S72 of FIG. 21). That is, the response data includes two items of destination information.

Thereafter, in a case where "direct print" is selected by the user, the portable terminal 50 sends print data to the MFP 10D via the AP 100 (S24 of FIG. 20) by using the destination information corresponding to DP from among the two items of destination information included in the response data (i.e., by prioritizing the normal Wi-Fi NW). According to this, the print process is executed in the MFP 10D (S98 of FIG. 21). Moreover, in the case of FIG. 23, the two items of destination information are an example of the "M1 items of destination information".

(Fifth Embodiment)

Points different from the fourth embodiment will be described. In the present embodiment, the portable terminal 50 can execute a function confirmation process (to be described: S15 of FIG. 20) to limit the type of print functions to be displayed by the display mechanism 54.

(Application Process of Portable Terminal 50; FIG. 20)

In the present embodiment, the response data received in S12-4 further includes a device ID of the MFP 10. The device ID is a unique ID assigned to the MFP 10 by the vendor of the MFP 10. Upon generating the display data in S14, the CPU 72 executes the function confirmation process of S15. As will be described in detail later, in the function confirmation process, characters written in the display data can be deleted (see FIG. 24). Consequently, it is possible to limit the types of print functions displayed in S14, i.e., the types of print functions that can be selected by the user. Other processes are the same as the fourth embodiment.

(Function Confirmation Process of Portable Terminal 50; FIG. 24)

The function confirmation process of S15 of FIG. 20 will be described with reference to FIG. 24. In S200, the CPU 72 determines whether information indicating DP OK is included in the response data. In a case where information indicating DP OK is included in the response data, the CPU 72 determines YES in S200, and proceeds to S202. On the other hand, in a case where information indicating DP NG is included in the response data, the CPU 72 determines NO in S200, and proceeds to S210.

In S202, the CPU 72 determines whether the MFP 10 and the portable terminal 50 are belonging to the same normal Wi-Fi NW or the same WFD NW. In a case where either the normal Wi-Fi WSI or the WFD WSI of the portable terminal 50 is not being stored in the memory 74, the CPU 72 determines NO in S202, and proceeds to S204.

In a case where the normal Wi-Fi WSI of the portable terminal 50 is being stored in the memory 74, the CPU 72 determines whether a set of SSID and BSSID (called "first set" below) which is identical to the set of normal Wi-Fi SSID and normal Wi-Fi BSSID included in the normal Wi-Fi WSI, is included in the response data. In a case where the first set is included in the response data, the CPU 72 determines YES in S202, and proceeds to S210, and in a case where the first set is not included in the response data, the CPU 72 determines NO in S202, and proceeds to S204.

Further, in a case where the WFD WSI of the portable terminal 50 is being stored in the memory 74, the CPU 72 determines whether a set of SSID and BSSID (called "second set" below) which is identical to the set of WFD SSID and WFD BSSID of that WFD WSI, is included in the response data. In a case where the second set is included in the response data, the CPU 72 determines YES in S202, and proceeds to S210, and in a case where the second set is not included in the response data, the CPU 72 determines NO in S202, and proceeds to S204.

In S204, the CPU 72 determines whether the password of the WFD WSI of the MFP 10 is included in the response data. As described above, in a case where the MFP 10 is in the G/O state, the response data includes the password of the WFD WSI of the MFP 10 (see S185 of FIG. 22). In a case where the password is included in the response data, the CPU 72 determines YES in S204, and proceeds to S210, and in a case where the password is not included in the response data, the CPU 72 determines NO in S204, and proceeds to S206.

In S206, the CPU 72 determines whether the BT WSI of the MFP 10 is included in the response data. In a case where the BT WSI is included in the response data, the CPU 72 determines YES in S206, and proceeds to S210, and in a case where the BT WSI is not included in the response data, the CPU 72 determines NO in S206, and proceeds to S208.

In a case where NO is determined in any of S202, S204, and S206, a LAN to which both the MFP 10 and the portable terminal 50 are belonging is not realized, and consequently the MFP 10 and the portable terminal 50 cannot communicate print data by using the direct communication scheme. Consequently, in S208 the CPU 72 deletes the characters indicating "direct print" from the display data generated in S14 of FIG. 20. According to this, in S16 of FIG. 20, an image that does not include the characters indicating "direct print" is displayed by the display mechanism 54. That is, the user cannot select "direct print". When S208 ends, processing proceeds to S210.

In S210, the CPU 72 determines whether information indicating EP OK is included in the response data. In a case where information indicating EP OK is included in the response data, the CPU 72 determines YES in S210, and proceeds to S212. On the other hand, in a case where information indicating EP NG is included in the response data, the CPU 72 determines NO in S210, and proceeds to S216.

In S212, the CPU 72 determines whether the sending ESI, which is the ESI for sending E-mail, is being stored in the memory 74. In a case where the sending ESI is being stored in the memory 74, the CPU 72 determines YES in S212, and proceeds to S216, and in a case where the sending ESI is not being stored in the memory 74, the CPU 72 determines NO in S212, and proceeds to S214.

In a case where NO is determined in S212, the portable terminal 50 cannot send E-mail, and consequently the MFP 10 and the portable terminal 50 cannot communicate print data by using the E-mail communication scheme. Consequently, in S214, the CPU 72 deletes the characters indicating "E-mail print" from the display data generated in S14 of FIG. 20. According to this, in S16 of FIG. 20, an image that does not include the characters indicating "E-mail print" is displayed by the display mechanism 54. That is, the user cannot select "E-mail print". When S214 ends, processing proceeds to S216.

In S216, the CPU 72 determines whether information indicating CP OK is included in the response data. In a case where information indicating CP OK is included in the response data, the CPU 72 determines YES in S216, and proceeds to S218. On the other hand, in a case where information indicating CP NG is included in the response data, the CPU 72 determines NO in S216, and ends the function confirmation process.

As described above, the response data received in S12-4 of FIG. 20 includes the device ID of the MFP 10. In S216, the CPU 72 sends an inquiry signal that includes the device ID of the MFP 10 to the confirmation server 130 via the wireless LAN I/F 60 or another I/F (e.g., an I/F for executing communication using a cellular network).

Upon receiving the inquiry signal that includes the device ID of the MFP 10, the confirmation server 130 determines whether a connection between the MFP 10 and the print CL server 140 is established. For example, the confirmation server 130 supplies the device ID of the MFP 10 to the print CL server 140, and acquires information from the print CL server 140 indicating whether or not there is the connection. Then, the confirmation server 130 sends an inquiry result to the MFP 10 indicating connection or no-connection in accordance with the acquired information.

In S220, the CPU 72 determines whether the inquiry result received from the confirmation server 130 indicates connection. In a case where the inquiry result indicates connection, the CPU 72 determines YES in S220, and ends the function confirmation process, and in a case where the inquiry result indicates no-connection, the CPU 72 determines NO in S220, and proceeds to S222.

In the present embodiment, in order to receive print data from the print CL server 140, the MFP 10 must be constantly connected with the print CL server 140. Consequently, in a case where NO is determined in S220, the MFP 10 cannot receive the print data from the print CL server 140, and consequently the MFP 10 and the portable terminal 50 cannot communicate print data by using the cloud communication scheme. Consequently, in S222, the CPU 72 deletes the characters indicating "cloud print" from the display data generated in S14 of FIG. 20. According to this, in S16 of FIG. 20, an image that does not include the characters indicating "cloud print" is displayed by the display mechanism 54. That is, the user cannot select "cloud print". When S222 ends, the function confirmation process ends.

(Specific Case; FIG. 25) A specific case realized by processes of FIG. 20 (particularly S15) and FIG. 21 will be described with reference to FIG. 25. An MFP 10E is capable of executing normal Wi-Fi print, EP, and CP, and is not capable of executing WFD print and BT print. The MFP 10E belongs to a normal Wi-Fi NW (SSID "X1", BSSID "Y1") formed by the AP 100. However, the portable terminal 50 is not belonging to the normal Wi-Fi NW (and is also not belonging to the WFD NW).

In the present case, the response data sent to the portable terminal 50 from the MFP 10E includes device ID of the MFP 10E, information indicating DP OK, information indicating EP OK, information indicating CP OK, the destination information corresponding to DP (i.e., "X1, Y1, IP1"), the destination information corresponding to EP (i.e., mail address "E1" of the MFP 10E), and the destination information corresponding to CP (i.e., the printing CSI) (S180, S70-4, S72 of FIG. 21). The portable terminal 50 generates display data representing an image that includes the characters indicating "direct print", the characters indicating "E-mail print", and the characters indicating "cloud print" (S14 of FIG. 20).

Next, the portable terminal 50 executes the function confirmation process (S15 of FIG. 20). Since the portable terminal 50 is not belonging to the normal Wi-Fi NW and the WFD NW, the portable terminal 50 determines NO in S202 of FIG. 24, and since the response data does not include the password of the WFD WSI of the MFP 10E, the portable terminal 50 determines NO in S204, and since the response data does not include the BT WSI, the portable terminal 50 determines NO in S206. Consequently, the portable terminal 50 deletes the characters indicating "direct print" from the display data (S208).

In the present case, the sending ESI, for executing the sending of E-mail, is being stored in the memory 74 of the portable terminal 50. Consequently, the portable terminal 50 determines YES in S212 of FIG. 24, and does not delete the characters indicating "E-mail print" from the display data.

The portable terminal 50 sends an inquiry signal that includes the device ID of the MFP 10E to the confirmation server 130, and acquires an inquiry result from the confirmation server 130 (S218 of FIG. 24). In the present case, the printing CSI is being stored in the memory 34 of the MFP 10E, but the MFP 10E is not connected with the print CL server 140. For example, in a case where an expiration date of the authentication information included in the printing CSI has expired, it may occur that the MFP 10E cannot connect with the print CL server 140. In this case, the portable terminal 50 determines NO in S220 of FIG. 24, and deletes the characters indicating "cloud print" from the display data (S222).

Thus, the portable terminal 50 displays an image that includes only the characters indicating "E-mail print" (S16 of FIG. 20). Consequently, the user can only select "E-mail print". Consequently, the portable terminal 50 sends print data to the MFP 10E via the mail server 120.

According to the present embodiment, characters indicating a communication scheme which cannot be used for sending print data from the portable terminal 50 to the MFP 10E ("direct print" and "cloud print" in the case of FIG. 25) are not displayed by the portable terminal 50. Consequently, it is possible to prevent the user selecting a communication scheme which cannot be used for sending print data. In the present embodiment, the MFP 10E and the portable terminal 50 can appropriately execute the communication of print data by using the communication scheme selected by the user ("E-mail print" in the case of FIG. 25).

Moreover, in the case of FIG. 25, e.g., in a case where a connection between the MFP 10E and the print CL server 140 is established, and the MFP 10E is capable of executing BT print, the portable terminal 50 does not delete the characters indicating "direct print" and "cloud print" from the display data, thus causing an image to be displayed that includes the characters indicating "direct print", the characters indicating "E-mail print", and the characters indicating "cloud print" (called "case 2" below).

Further, in case 2, in a case where the MFP 10E is not capable of executing BT print, the portable terminal 50 deletes the characters indicating "direct print" from the display data, thus causing an image to be displayed that includes the characters indicating "E-mail print" and the characters indicating "cloud print" (called "case 3" below).

Further, in case 2, in a case where the memory 74 of the portable terminal 50 is not storing the sending ESI, the portable terminal 50 deletes the characters indicating "E-mail print" from the display data, thus causing an image to be displayed that includes the characters indicating "direct print" and the characters indicating "cloud print" (called "case 4" below).

Further, in case 2, in a case where a connection between the MFP 10E and the print CL server 140 has not been established, the portable terminal 50 deletes the characters indicating "cloud print" from the display data, thus causing an image to be displayed that includes the characters indicating "direct print" and the characters indicating "E-mail print" (called "case 5" below).

As shown in the case of FIG. 25 and case 2 to case 5, according to the present embodiment, the portable terminal 50 can cause an appropriate image to be displayed in accordance with the situation of the MFP 10E and the portable terminal 50.

(Corresponding Relationships)

In the case of FIG. 25, the SSID "X1" and the BSSID "Y1" included in the response data are an example of the "identification information". CP, DP, EP are respectively examples of the "first communication scheme", the "second communication scheme", and the "third communication scheme". The information included in the response data (i.e., DP OK, EP OK, CP OK) is an example of the "third data" and the "fourth data". The image displayed in the case 3 is an example of the "second image indicating the (M1−1) items of communication schemes not including the second communication scheme". Further, the image displayed in the above case 4 is an example of the "third image indicating the (M1−1) items of communication schemes not including the third communication scheme". The process of S202 and the process of S212 of FIG. 24 are respectively examples of the "determining . . . whether the terminal apparatus is belonging to the particular local network" and the "determining whether second communication setting information . . . is stored in a memory of the terminal apparatus". The sending ESI, which is the determination target of S212, is an example of the "second communication setting information".

(Variant of Fifth Embodiment)

Moreover, in a variant of FIG. 20, after having executed the function confirmation process of S15, the CPU 72 may generate the display data in S14. For example, in S208 of FIG. 24, the CPU 72 may execute a process for changing the information indicating DP OK to DP NO without deleting the characters "direct print" from the display data. Similarly, the CPU 72 may change EP OK to EP NG in S214, and may change CP OK to CP NG in S222. Then, the CPU 72 may generate the display data in S14 by using the changed information.

(Sixth Embodiment)

Points different from the fourth embodiment will be described. In the present embodiment, the MFP 10 executes the DP function confirmation process of S40 of FIG. 21 in accordance with a flowchart different from that of FIG. 5.

(DP Function Confirmation Process; FIG. 26)

The DP function confirmation process of S40 of FIG. 21 will be described with reference to FIG. 26. In the present embodiment, in a case where the portable terminal 50 is belonging to at least one NW among the normal Wi-Fi NW and the WFD NW, the function request received in S30 of FIG. 21 includes the set of SSID and BSSID of at least one NW.

S300, S302 are the same as S41, S43 of FIG. 5. Moreover, in a case where the determination of S300 is YES, processing proceeds to S304, and in a case where the determination of S300 is NO, processing proceeds to S302. Further, upon ending S302, processing proceeds to S320. In S304, the CPU 32 determines whether the MFP 10 and the portable terminal 50 are belonging to the same normal Wi-Fi NW. In a case where the normal Wi-Fi WSI of the MFP 10 is not being stored in the memory 34, the CPU 32 determines NO in S304, and proceeds to S308.

In a case where the normal Wi-Fi WSI of the MFP 10 is being stored in the memory 34, the CPU 32 determines whether a set of SSID and BSSID (called "third set" below) which is identical to the set of normal Wi-Fi SSID and normal Wi-Fi BSSID included in the normal Wi-Fi WSI, is included in the function request. In a case where the third set is included in the function request, the CPU 32 determines YES in S304, and proceeds to S306, and in a case where the third set is not included in the function request, the CPU 32 determines NO in S304, and proceeds to S308.

In S306, the CPU 32 stores information indicating normal Wi-Fi print OK in the memory 34. Further, in S308, the CPU 32 stores information indicating normal Wi-Fi print NG in the memory 34. When S306 or S308 ends, processing proceeds to S310.

S310, S318 are the same as S44, S46 of FIG. 5. Moreover, in a case where the determination of S310 is YES, processing proceeds to S312, and in a case where the determination of S310 is NO, processing proceeds to S318. Further, upon ending S318, processing proceeds to S320. In S312, the CPU 32 determines whether the current state of the MFP 10 is the CL state. In a case where the current state of the MFP 10 is the CL state, the CPU 32 determines YES in S312, and proceeds to S314, and in a case where the current state of the MFP 10 is the G/O state or device state, the CPU 32 determines NO in S312, and proceeds to S316.

In S314, the CPU 32 determines whether the MFP 10 and the portable terminal 50 are belonging to the same WFD NW. In a case where the WFD WSI of the MFP 10 is being stored in the memory 34, the CPU 32 determines whether a set of SSID and BSSID (called "fourth set" below) which is identical to the set of WFD SSID and WFD BSSID included in the WFD WSI is included in the function request. In a case where the fourth set is included in the function request, the CPU 32 determines YES in S314, and proceeds to S316, and in a case where the fourth set is not included in the function request, the CPU 32 determines NO in S314, and proceeds to S318. S316 to S324 are the same as S45 to S49 of FIG. 5.

In a case where the MFP 10 and the portable terminal 50 are not belonging to the same normal Wi-Fi NW, the MFP 10 and the portable terminal 50 cannot execute communication of print data by using the normal Wi-Fi scheme. This is because the password included in the normal Wi-Fi WSI of the MFP 10 is not sent to the portable terminal 50 from the MFP 10 (S183 of FIG. 22), and consequently the portable terminal 50 cannot participate in the normal Wi-Fi NW to which the MFP 10 is belonging. Consequently, in the present embodiment, even if the MFP 10 has the normal Wi-Fi print function, in a case where the MFP 10 and the portable terminal 50 are not belonging to the same normal Wi-Fi NW (NO in S304), the MFP 10 stores normal Wi-Fi print NG in the memory 34 (S308).

In a case where the MFP 10 is in the CL state and the MFP 10 and the portable terminal 50 are not belonging to the same WFD NW, the MFP 10 and the portable terminal 50 cannot execute communication of print data by using the WFD scheme. This is because the password included in the WFD WSI of the MFP 10 is not sent from the MFP 10 to the portable terminal 50 (see the case of "MFP=CL" of S185 of FIG. 22), and consequently the portable terminal 50 cannot participate in the WFD NW to which the MFP 10 is belonging. Consequently, in the present embodiment, even if the MFP 10 has the WFD print function, in a case where the MFP 10 is in the CL state and the MFP 10 and the portable terminal 50 are not belonging to the same WFD NW (NO in S314), the MFP 10 stores WFD print NO in the memory 34 (S318).

Thus, in the present embodiment, the MFP 10 can be caused to appropriately store information relating to the normal Wi-Fi print (OK or NO), and information relating to WFD print (OK or NG) in the memory 34 in accordance with the situation of the MFP 10 and the portable terminal 50.

Consequently, in S70-4 of FIG. 21 the MFP 10 can appropriately determine whether it is capable of executing DP. That is, the MFP 10 determines that the MFP 10 is not capable of executing DP despite having the normal Wi-Fi print function and the WFD print function, and can appropriately send response data that includes information indicating DP NG to the portable terminal 50.

(Specific Case; FIG. 27)

A specific case realized by the processes of FIG. 20 and FIG. 21 (particularly S40) will be described with reference to FIG. 27. An MFP 10F of FIG. 27 belongs to a normal Wi-Fi NW (SSID "X1", BSSID "Y1") formed by an AP 100A. Further, the MFP 10F belongs, as a CL device, to a WFD NW (SSID "X3", BSSID "Y3") formed by the PC 110. The MFP 10F is capable of executing EP and CP, but is not capable of executing BT print. The portable terminal 50 belongs to a normal Wi-Fi NW (SSID "X2", BSSID "Y2") formed by an AP 100B different from the AP 100A.

In the present case, a function request sent from the portable terminal 50 to the MFP 10F includes a set of the normal Wi-Fi SSID "X2" and the normal Wi-Fi BSSID "Y2" included in the normal Wi-Fi WSI of the portable terminal 50. Since a set identical to the set of the normal Wi-Fi SSID "X1" and the normal Wi-Fi BSSID "Y1" included in the normal Wi-Fi WSI of the MFP 10F is not included in the function request, the MFP 10F determines NO in S304 of FIG. 26, and stores information indicating normal Wi-Fi print NG in the memory 34 (S308). Further, since the MFP 10F has the CL state, the MFP 10F determines YES in S312 and, further, since a set identical to the set of WFD SSID "X3" and WFD BSSID "Y3" included in the WFD WSI of the MFP 10F is not included in the function request, the MFP 10F determines NO in S314, and stores information indicating WFD print NG in the memory 34 (S318).

Consequently, the MFP 10F sends response data that includes information indicating DP NG, information indicating EP OK, and information indicating CP OK, to the portable terminal 50 (S70-4, S72 of FIG. 21). Consequently, an image that does not include "direct print", i.e., an image that includes the characters indicating "E-mail print" and the characters indicating "cloud print" is displayed by the portable terminal 50. According to this, it is possible to prevent the user from selecting "direct print" despite the portable terminal 50 and the MFP 100F not being capable of executing the communication of print data in accordance with the direct scheme.

(Corresponding Relationships)

The SSID "X2" and the BSSID "Y2" included in the function request are an example of the "identification information". DP is an example of the "second communication scheme". The process of S30 of FIG. 21 is an example of the "receiving . . . identification information", and the processes of S304 and S314 of FIG. 26 are an example of the "determining . . . whether the function executing apparatus is belonging to the particular local area network".

(Variant 1)

In the above embodiments, e.g., in S14 of FIG. 3, the CPU 72 of the portable terminal 50 causes the display mechanism 54 to display communication schemes which the MFP 10 is capable of using to receive print data, and does not cause the display mechanism 54 to display communication schemes which the MFP 10 is not capable of using to receive print data. Instead, the CPU 72 may display the former communication schemes using a first color, and display the latter communication schemes using a second color different from the first color. In general terms, it is sufficient for the "first causing" of the "terminal apparatus" to display a first image indicating M1 items of communication schemes, e.g., to display the M1 items of communication schemes among the plurality of communication schemes separately from other communication schemes among the plurality of communication schemes.

(Variant 2)

In S63 of FIG. 7, the CPU 32 of the MFP 10 stores information indicating CP OK or information indicating CP NG in the memory 34 by determining whether the MFP 10 is capable of communicating with the confirmation server 130 on the Internet. Instead, the CPU 32 may determine YES in S63 in a case where the MFP 10 is connected with the AP 100 (i.e., in a case where the normal Wi-Fi WSI is being stored in the memory 34), and may determine NO in S63 in a case where the MFP 10 is not connected with the AP 100 (i.e., in a case where the normal Wi-Fi WSI is not being stored in the memory 34). The AP 100 usually comprises a function of relaying communication between the wireless LAN and the Internet. Consequently, in a case where the MFP 10 is connected with the AP 100, the MFP 10 is usually capable of executing Internet communication. Consequently, by determining whether the MFP 10 is connected with the AP 100, the CPU 32 can appropriately determine whether the MFP 10 is capable of executing Internet communication (i.e., whether the MFP 10 is capable of communicating with the print CL server 140).

(Variant 3)

In S12 of FIG. 3, instead of receiving response data that includes information indicating DP OK, etc., the CPU 72 of the portable terminal 50 may receive response data that includes the device ID or model name of the MFP 10. In this case, the CPU 72 sends an inquiry signal that includes the device ID or model name of the MFP 10 to the confirmation server 130, and receives an inquiry result from the confirmation server 130. The confirmation server 130 is storing, in association with the device ID or model name of the MFP 10, information indicating which print functions (DP, EP, CP) the MFP 10 is capable of executing. The information is stored in advance in the confirmation server 130 by the vendor of the MFP 10. For example, in a case where the MFP 10 does not have the EP function and the CP function, the vendor stores information indicating DP OK, EP NO, and CP NG in the confirmation server 130 in association with the device ID or model name of the MFP 10. In case of receiving an inquiry signal, from the portable terminal 50, that includes the device ID or model name of the MFP 10, the confirmation server 130 sends an inquiry result, to the portable terminal 50, that includes information indicating which print functions (DP, EP, CP) the MFP 10 is capable of executing. The CPU 72 of the portable terminal 50 generates the display data in S14 of FIG. 3 in accordance with the inquiry result. In the present variant, also, the CPU 72 can appropriately cause the display of an image indicating the print functions which the MFP 10 is capable of executing. In the present variant, the device ID or model name of the MFP 10 is an example of the "first information".

(Variant 4)

In variant 3, the confirmation server 130 may further store print conditions which the MFP 10 is capable of executing (e.g., a paper size which the MFP 10 is capable of using, a range of print resolutions which the MFP 10 is capable of using, etc.) in association with the device ID or model name of the MFP 10. Then, in case of receiving an inquiry signal that includes the device ID or model name of the MFP 10 from the portable terminal 50, the confirmation server 130 sends an inquiry result to the portable terminal 50 that includes information indicating which print functions (DP, EP, CP) the MFP 10 is capable of executing and information indicating the print conditions which the MFP 10 is capable of executing. In accordance with the inquiry result, the CPU 72 of the portable terminal 50 generates display data indicating the print conditions included in the inquiry result. According to the present variant, the user can learn not only the print functions which the MFP 10 is capable of executing, but also the print conditions which the MFP 10 is capable of using.

(Variant 5)

In variant 4, in S20 of FIG. 16, the CPU 72 may send a selection result to the MFP 10 which indicates not only the print function (e.g., "DP") selected by the user, but also user print conditions selected by the user (e.g., paper size "A4", print resolution "200 Dpi"). Then, in S98 of FIG. 17, the CPU 32 of the MFP 10 may execute the print process in accordance with the print conditions indicated by the selection result of the user.

(Variant 6)

The "first interface" is not limited to the NFC I/F 62, but may be e.g., a TJ I/F for executing a Transfer Jet wireless communication. Moreover, in case of intending to speed up a communication speed of Transfer Jet wireless communication, the communication speed of a wireless communication via the wireless LAN I/F 60 may be slower than the communication speed of a wireless communication via the TJ I/F. That is, the communication speed of a wireless communication via the "second interface" may be faster than, or slower than, the communication speed of a wireless communication via the "first interface". In general terms, it is sufficient for a communicable range of wireless communication via the "second interface" to be greater than a communicable range of wireless communication via the "first interface".

(Variant 7)

The "function executing apparatus" is not limited to the MFP 10, but may be another communication apparatus capable of executing the print function (printer, FAX apparatus, copier, etc.).

(Variant 8)

In the above embodiments, in S72 of FIG. 4, in case the MFP 10 is capable of executing all of normal Wi-Fi print, WFD print, and BT print, the CPU 32 of the MFP 10 sends response data that includes information indicating DP OK to the portable terminal 50. Instead, the CPU 32 may send response data to the portable terminal 50 that includes information indicating normal Wi-Fi print OK, information indicating WFD print OK, and information indicating BT print OK. In this case, in S14 of FIG. 3, the CPU 72 of the portable terminal 50 may cause the display mechanism 54 to display an image that includes the characters, "normal Wi-Fi print", "WFD print", and "BT print" instead of the characters indicating "direct print". In the present variant, "normal Wi-Fi print", "WFD print", and "BT print" are examples of the "communication schemes".

(Variant 9)

In the above embodiments, the wireless network is formed by the MFP 10 and the portable terminal 50 executing WFD communication. Instead, by activating a so-called Soft AP, the CPU 32 of the MFP 10 may form a wireless network in which the MFP 10 operates as an AP.

(Variant 10)

In the above embodiments, when a WFD NW is to be newly formed, the MFP 10 becomes the G/O device. Instead, the portable terminal 50 may become the G/O device. Further, by activating a so-called Soft AP, the CPU 72 of the portable terminal 50 may form a wireless network in which the portable terminal 50 operates as an AP.

(Variant 11)

In the third embodiment and onwards, the CPU 72 of the portable terminal 50 receives designation of the print data when the selection of a communication scheme is executed by the user. Instead, the CPU 72 may receive designation of the print data before sending the function request to the MFP 10 via the NFC I/F 62.

(Variant 12)

In the above embodiments, the processes of FIG. 3, FIG. 4, etc. are realized by the CPUs 32, 72 of the MFP 10 and the portable terminal 50 executing programs (i.e., software) within the memories 34, 74. Instead, at least one of the processes may be realized by hardware such as a logic circuit, etc.

What is claimed is:

1. A non-transitory computer-readable storage medium storing computer-readable instructions for a terminal apparatus, wherein the computer-readable instructions, when executed by a processor of the terminal apparatus, cause the terminal apparatus to perform:
   causing a display mechanism of the terminal apparatus to display a selection image in which one of a print function and a scan function is selected through the terminal apparatus for execution by a first function executing apparatus, wherein the first function executing apparatus is configured to execute a print function and a scan function;
   receiving, from the first function executing apparatus, first information relating to at least one of: (a) M1 items of communication schemes available for the first function executing apparatus to receive print data, the M1 being an integer of two or more, the M1 items of communication schemes including a first communication scheme and a second communication scheme being different from the first communication scheme or (b) N items of communication schemes available for the first function executing apparatus to send scan data, the N being an integer of two or more, the N items of communication schemes including a third communication scheme and a fourth communication scheme being different from the third communication scheme; and
   causing the display mechanism of the terminal apparatus to display, by using the first information, at least one of: (a) a first image including M1 items of character strings, each of the M1 items of character strings indicating each of the M1 items of communication schemes, the M1 items of character strings including a first character string indicating the first communication scheme and a second character string, which is different from the first character string, indicating the second communication scheme, and (b) a second image including N items of character strings indicating the N items of communication schemes, the N items of character strings including a third character string indicating the third communication scheme and a fourth character string, which is different from the third character string, indicating the fourth communication scheme.

2. The non-transitory computer-readable storage medium as in claim 1, wherein
   the first information includes data indicating that the first function executing apparatus is configured to use the M1 items of communication schemes, and
   the causing includes generating display data by using the first information and template data stored in a memory of the terminal apparatus, so as to cause the display mechanism to display the first image by supplying the display data representing the first image to the display mechanism.

3. The non-transitory computer-readable storage medium as in claim 1, wherein
   each of the M1 items of communication schemes is a communication scheme using a communication protocol different from each other.

4. The non-transitory computer-readable storage medium as in claim 1, wherein
   the first information includes:
      first data indicating that the first function executing apparatus is configured to use the M1 items of communication schemes including the first communication scheme in a case where first communication setting information for a communication via the internet is stored in a memory of the first function executing apparatus; and
      second data indicating that the first function executing apparatus is configured to use the M1 items of communication schemes not including the first communication scheme in a case where the first communication setting information is not stored in the memory of the first function executing apparatus,
   the first communication scheme is a communication scheme in which the first function executing apparatus receives print data via the internet, and
   the causing includes:
      causing the display mechanism to display the first image indicating the M1 items of communication schemes including the first communication scheme in a case where the first information includes the first data; and
      causing the display mechanism to display the first image indicating the M1 items of communication schemes not including the first communication scheme in a case where the first information includes the second data.

5. The non-transitory computer-readable storage medium as in claim 1, wherein
   the first information includes:
      first data indicating that the first function executing apparatus is configured to use the M1 items of communication schemes including the first communication scheme in a case where the first function executing apparatus receives a response by sending a signal to a server on the internet; and
      second data indicating that the first function executing apparatus is configured to use the M1 items of communication schemes not including the first communication scheme in a case where the first function executing apparatus does not receive the response despite sending the signal to the server,
   the first communication scheme is a communication scheme in which the first function executing apparatus receives print data via the internet, and
   the causing includes:
      causing the display mechanism to display the first image indicating the M1 items of communication schemes including the first communication scheme in a case where the first information includes the first data; and
      causing the display mechanism to display the first image indicating the M1 items of communication schemes not including the first communication scheme in a case where the first information includes the second data.

6. The non-transitory computer-readable storage medium as in claim 1, wherein in a case where the first information includes third data indicating that the first function executing apparatus is configured to use the M1 items of communication schemes including the second communication scheme, the first information further includes identification information to identify a particular local area network to which the first function executing apparatus is belonging, the second communication scheme is a communication scheme in which the first function executing apparatus receives print data not via the internet by using a local area network, the computer-readable instructions cause the terminal apparatus to further perform determining, by using the identification information, whether the terminal apparatus is belonging to the particular local network, and the causing includes:
  causing the display mechanism to display the first image indicating the M1 items of communication schemes including the second communication scheme in a case where it is determined that the terminal apparatus is belonging to the particular local area network; and
  causing the display mechanism to display a third image indicating (M1-1) items of communication schemes not including the second communication scheme in a case where it is determined that the terminal apparatus is not belonging to the particular local area network.

7. The non-transitory computer-readable storage medium as in claim 1, wherein the first information includes fourth data indicating that the first function executing apparatus is configured to use the M1 items of communication schemes including a fifth communication scheme,
  the fifth communication scheme is a communication scheme in which the first function executing apparatus receives print data via the internet,
  the computer-readable instructions cause the terminal apparatus to further perform determining whether second communication setting information for a communication via the internet is stored in a memory of the terminal apparatus, and
  the causing includes:
    causing the display mechanism to display the first image indicating the M1 items of communication schemes including the fifth communication scheme in a case where it is determined that the second communication setting information is stored in the memory of the terminal apparatus; and
    causing the display mechanism to display a third image indicating (M1-1) items of communication schemes not including the fifth communication scheme in a case where it is determined that the second communication setting information is not stored in the memory of the terminal apparatus.

8. The non-transitory computer-readable storage medium as in claim 1, wherein the computer-readable instructions cause the terminal apparatus to further perform: receiving, from a second function executing apparatus different from the first function executing apparatus, second information relating to M2 items of communication schemes available for the second function executing apparatus to receive print data, the second function executing apparatus being configured to execute a print function, M2 being an integer of two or more, M2 items of communication schemes including a fifth communication scheme and a sixth communication scheme being different from the fifth communication scheme,
  causing the display mechanism to display, by using the second information, a third image including M2 items of character strings, each of the M2 items of character strings indicating each of the M2 items of communication schemes, the M2 items of character strings including a fifth character string indicating the fifth communication scheme and a sixth character string, which is different from the fifth character string, indicating the sixth communication scheme, and
  wherein the M2 items of communication schemes are different from the M1 items of communication schemes.

9. The non-transitory computer-readable storage medium as in claim 1, wherein the causing includes:
  causing the display mechanism to display the first image in a case where the print function is selected in the selection image; and
  causing the display mechanism to display the second image in a case where the scan function is selected in the selection image.

10. The non-transitory computer-readable storage medium as in claim 1, wherein the computer-readable instructions cause the terminal apparatus to perform the causing the display mechanism to display the selection image before the first information is received.

11. The non-transitory computer-readable storage medium as in claim 1, wherein
  the computer-readable instructions cause the terminal apparatus to further perform sending particular print data to the first function executing apparatus in accordance with a particular communication scheme, in a case where the particular communication scheme is selected from among the M1 items of communication schemes indicated by the first image.

12. The non-transitory computer-readable storage medium as in claim 11, wherein
  the computer-readable instructions cause the terminal apparatus to further perform:
    sending a selection result indicating the particular communication scheme to the first function executing apparatus, in a case where the particular communication scheme is selected from among the M1 items of communication schemes indicated by the first image; and
    receiving particular destination information corresponding to the particular communication scheme from the first function executing apparatus after the selection result was sent to the first function executing apparatus, the particular destination information indicating a destination to send the particular print data from the terminal apparatus to the first function executing apparatus in accordance with the particular communication scheme, and
  the sending of the particular print data includes sending the particular print data to the first function executing apparatus by using the particular destination information in accordance with the particular communication scheme.

13. The non-transitory computer-readable storage medium as in claim 11, wherein
  the first information includes M1 items of destination information corresponding to the M1 items of communication schemes,
  each of the M1 items of destination information indicates a destination to send the particular print data from the terminal apparatus to the first function executing apparatus in accordance with a communication scheme corresponding to the destination information, and
  the sending includes sending the particular print data to the first function executing apparatus by using particular destination information among the M1 items of destination information in accordance with the particular communication scheme, the particular destination information corresponding to the particular communication scheme.

14. The non-transitory computer-readable storage medium as in claim 11, wherein
the sending includes:
sending the particular print data to the first function executing apparatus via the internet in a case where the particular communication scheme is the first communication scheme; and
sending the particular print data to the first function executing apparatus not via the internet in a case where the particular communication scheme is the second communication scheme.

15. The non-transitory computer-readable storage medium as in claim 11, wherein
the terminal apparatus further comprises:
a first interface configured to execute a wireless communication; and
a second interface configured to execute a wireless communication,
a communicable range of a wireless communication via the second interface is larger than a communicable range of a wireless communication via the first interface,
the receiving includes receiving the first information from the first function executing apparatus via the first interface, and
the sending includes sending the particular print data to the first function executing apparatus via the second interface.

16. The non-transitory computer-readable storage medium as in claim 1, wherein
the terminal apparatus further comprises:
a first interface configured to execute a wireless communication; and
a second interface configured to execute a wireless communication, the second interface being different from the first interface,
the receiving includes receiving the first information from the first function executing apparatus using the first interface,
each of the M1 items of communication schemes is a communication scheme not using the first interface, and
at least one of the M1 items of communication schemes is a communication scheme using the second interface.

17. A non-transitory computer-readable storage medium storing computer-readable instructions for a terminal apparatus, wherein the computer-readable instructions, when executed by a processor of the terminal apparatus, cause the terminal apparatus to perform:
causing a display mechanism of the terminal apparatus to display a selection image in which one of a print function and a scan function is selected through the terminal apparatus for execution by a first function executing apparatus;
receiving first information relating to a first function executing apparatus from the first function executing apparatus, the first function executing apparatus being configured to execute a print function and a scan function;
causing the display mechanism of the terminal apparatus to display at least one of: (a) a first image indicating M1 items of communication schemes by using the first information, the M1 being an integer of one or more, each of the M1 items of communication schemes being a communication scheme available for the first function executing apparatus to receive print data, and (b) a second image indicating N items of communication schemes by using the first information, the N being an integer of one or more, each of the N items of communication schemes being a communication scheme available for the first function executing apparatus to send scan data; and
sending particular print data to the first function executing apparatus in accordance with a particular communication scheme, in a case where the particular communication scheme is selected from among the M1 items of communication schemes indicated by the first image,
wherein the sending includes:
sending the particular print data to the first function executing apparatus by using a particular local area network, in a case where the first information is received in a state where the particular local area network is formed, the particular local area network being a network to which both the terminal apparatus and the first function executing apparatus are belonging; and
newly establishing a wireless connection between the terminal apparatus and the first function executing apparatus so as to send the particular print data to the first function executing apparatus by using another local area network which has been formed by newly establishing the wireless connection, in a case where the first information is received in a state where the particular local area network is not formed, the another local area network being a network to which both the terminal apparatus and the first function executing apparatus are belonging, and
the particular communication scheme is a communication scheme in which the first function executing apparatus receives print data not via the internet by using a local area network.

18. A function executing apparatus configured to execute a print function and a scan function, the function executing apparatus comprising:
a processor; and
a memory storing computer-readable instructions therein, the computer-readable instructions, when executed by the processor, causing the function executing apparatus to perform:
receiving a first selection result indicating the print function from a terminal apparatus in a case where the print function is selected from among the print function and the scan function on the terminal apparatus and receiving a second selection result indicating the scan function from the terminal apparatus in a case where the scan function is selected from among the print function and the scan function on the terminal apparatus;
specifying M1 items of communication schemes from among a plurality of communication schemes in a case where the first selection result is received from the terminal apparatus, the M1 being an integer of two or more, each of the M1 items of communication schemes being a communication scheme available for the function executing apparatus to receive print data, the M1 items of communication schemes including a first communication scheme and a second communication scheme being different from the first communication scheme;
specifying N items of communication schemes in a case where the second selection result is received from the terminal apparatus, the N being an integer of two or more, wherein each of the N items of communication schemes is a communication scheme available for the function executing apparatus to send scan data; and in a case where the M1 items of communication schemes including the first communication scheme and the second communication scheme are specified, sending, to a terminal apparatus, first information indicating the M1 items of communication schemes.

19. The function executing apparatus as in claim 18, wherein
the specifying includes:
specifying the M1 items of communication schemes including the first co1munication scheme in a case where first communication setting information for a communication via the internet is stored in a memory of the function executing apparatus; and
specifying the M1 items of communication schemes not including the first communication scheme in a case where the first communication setting information is not stored in the memory of the function executing apparatus, and
the first communication scheme is a communication scheme in which the function executing apparatus receives print data via the internet.

20. The function executing apparatus as in claim 18, wherein
the specifying includes:
specifying the M1 items of communication schemes including the first communication scheme in a case of sending a signal to a server on the internet and receiving a response; and
specifying the M1 items of communication schemes not including the first communication scheme in a case of not receiving the response despite sending the signal to the server, and
the first communication scheme is a communication scheme in which the function executing apparatus receives print data via the internet.

21. The function executing apparatus as in claim 18, wherein:
the computer-readable instructions cause the function executing apparatus to further perform:
receiving, from the terminal apparatus, identification information to identify a particular local area network to which the terminal apparatus is belonging; and
determining, by using the identification information, whether the function executing apparatus is belonging to the particular local area network,
wherein the specifying includes:
specifying the M1 items of communication schemes including the second communication scheme in a case where it is determined that the function executing apparatus is belonging to the particular local area network; and
specifying the M1 items of communication schemes not including the second communication scheme in a case where it is determined that the function executing apparatus is not belonging to the particular local area network, and
the second communication scheme is a communication scheme in which the function executing apparatus receives print data not via the internet by using a local area network.

22. The function executing apparatus as in claim 18, wherein,
the computer-readable instructions cause the function executing apparatus to further perform:
receiving a particular selection result indicating a particular communication scheme from the terminal apparatus in a case where the particular communication scheme is selected from among the M1 items of communication schemes on the terminal apparatus; and
sending particular destination information corresponding to the particular communication scheme to the terminal apparatus, the particular destination information indicating a destination to send particular print data from the terminal apparatus to the function executing apparatus in accordance with the particular communication scheme.

23. The function executing apparatus as in claim 18, wherein
the first information further includes M1 items of destination information corresponding to the M1 items of communication schemes,
each of the M1 items of destination information indicates a destination to send particular print data from the terminal apparatus to the function executing apparatus in accordance with a communication scheme corresponding to the destination information.

24. A function executing apparatus configured to execute a print function and a scan function, the function executing apparatus comprising:
a processor; and
a memory storing computer-readable instructions therein, the computer-readable instructions, when executed by the processor, causing the function executing apparatus to perform:
receiving a first selection result indicating the print function from a terminal apparatus in a case where the print function is selected from among the print function and the scan function on the terminal apparatus and receiving a second selection result indicating the scan function from the terminal apparatus in a case where the scan function is selected from among the print function and the scan function on the terminal apparatus;
specifying M1 items of communication schemes from among a plurality of communication schemes in a case where the first selection result is received from the terminal apparatus, the M1 being an integer of one or more, each of the M1 items of communication schemes being a communication scheme available for the function executing apparatus to receive print data;
specifying N items of communication schemes from among a plurality of communication schemes in a case where the second selection result is received from the terminal apparatus, the N being an integer of one or more, each of the N items of communication schemes being a communication scheme available for the function executing apparatus to send scan data;
sending first information indicating the M1 items of communication schemes to a terminal apparatus in the case where the first selection result is received from the terminal apparatus; and
receiving particular print data from the terminal apparatus in accordance with a particular communication scheme after sending of the first information,
wherein the receiving includes:
receiving the particular print data from the terminal apparatus by using a particular local area network, in a case where the particular local area network is formed, the particular local area network being a network to which both the terminal apparatus and the function executing apparatus are belonging; and
receiving the particular print data from the terminal apparatus by using another local area network which has been formed by a wireless connection newly established between the terminal apparatus and the function executing apparatus, in a case where the particular local area network is not formed, the another local area network being a network to which both the terminal apparatus and the function executing apparatus are belonging, and the particular communication scheme is a communication scheme in which the function executing apparatus receives print data not via the internet by using a local area network.

* * * * *